United States Patent
Nashiki

(10) Patent No.: US 8,120,215 B2
(45) Date of Patent: Feb. 21, 2012

(54) MOTOR AND CONTROL UNIT THEREOF

(75) Inventor: Masayuki Nashiki, Komaki (JP)

(73) Assignee: Denso Corporation, Kariya (JP)

(*) Notice: Subject to any disclaimer, the term of this patent is extended or adjusted under 35 U.S.C. 154(b) by 347 days.

(21) Appl. No.: 11/920,271

(22) PCT Filed: May 16, 2006

(86) PCT No.: PCT/JP2006/309748
§ 371 (c)(1),
(2), (4) Date: Dec. 7, 2007

(87) PCT Pub. No.: WO2006/123659
PCT Pub. Date: Nov. 23, 2006

(65) Prior Publication Data
US 2009/0021089 A1    Jan. 22, 2009

(30) Foreign Application Priority Data

May 17, 2005  (JP) ................. 2005-144293
May 24, 2005  (JP) ................. 2005-151257
Jul. 19, 2005  (JP) ................. 2005-208358

(51) Int. Cl.
*H02K 37/00*  (2006.01)
*H02K 37/02*  (2006.01)
*H02K 21/12*  (2006.01)

(52) U.S. Cl. ...... 310/49.45; 310/14; 310/44; 310/49.43; 310/49.44; 310/68 D; 310/90.5; 310/106; 310/156.55; 310/179; 310/180; 310/208; 318/254.1; 318/254.2; 318/701

(58) Field of Classification Search ............. 310/44, 310/49.39, 49.43, 106, 68 D, 156.55, 216.008, 310/268, 208, 185, 14, 179, 180, 49.44, 49.45; 318/701, 254.1, 254.2; *H02K 21/12, 37/02*
See application file for complete search history.

(56) References Cited

U.S. PATENT DOCUMENTS 3,549,918 A * 12/1970 Van Hout et al. .......... 310/49.17
4,127,802 A * 11/1978 Johnson ...................... 318/696

(Continued)

FOREIGN PATENT DOCUMENTS

DE     3821660 C *  8/1989

(Continued)

OTHER PUBLICATIONS

Narita, JP 57-22364, English abstract, 1982.*

(Continued)

*Primary Examiner* — Quyen Leung
*Assistant Examiner* — John K Kim
(74) *Attorney, Agent, or Firm* — Oliff & Berridge, PLC

(57) ABSTRACT

A motor and a control unit therefor comprise: salient rotor poles and salient stator poles, which are arranged along circumferences of phases A, B and C with an even interval therebetween; magnetic paths for passing magnetic fluxes, the paths permitting the magnetic fluxes passing through the salient rotor and stator poles of each phase to return to the rotor side; and substantially looped windings arranged between the salient stator poles of individual phases and the magnetic paths for passing magnetic fluxes, wherein currents are supplied to the windings in synchronization with the rotational position of the rotor to thereby output torque. Since the structures of the stator, the rotor and the windings are simple, productivity is enhanced, whereby high quality, small size and low cost can be realized.

10 Claims, 45 Drawing Sheets

U.S. PATENT DOCUMENTS

| | | | | |
|---|---|---|---|---|
| 4,206,374 | A * | 6/1980 | Goddijn | 310/49.04 |
| 4,306,164 | A * | 12/1981 | Itoh et al. | 310/49.32 |
| 4,385,251 | A * | 5/1983 | Mallick et al. | 310/178 |
| 4,672,247 | A * | 6/1987 | Madsen et al. | 310/49.46 |
| 4,837,474 | A * | 6/1989 | Petersen et al. | 310/216.021 |
| 4,883,999 | A * | 11/1989 | Hendershot | 310/216.071 |
| 4,920,294 | A * | 4/1990 | Christiaens et al. | 310/162 |
| 4,933,621 | A * | 6/1990 | MacMinn et al. | 318/696 |
| 5,053,662 | A * | 10/1991 | Richter | 310/90.5 |
| 5,105,141 | A * | 4/1992 | Ernest | 318/805 |
| 5,142,175 | A * | 8/1992 | Watanabe | 310/90.5 |
| 5,304,882 | A * | 4/1994 | Lipo et al. | 310/156.53 |
| 5,327,069 | A | 7/1994 | Radun et al. | |
| 5,406,157 | A * | 4/1995 | New | 310/90.5 |
| 5,446,361 | A * | 8/1995 | Van Der Broeck | 318/747 |
| 5,481,147 | A | 1/1996 | Kaplan et al. | |
| 5,485,046 | A * | 1/1996 | Kaplan et al. | 310/166 |
| 5,567,999 | A | 10/1996 | Baronosky et al. | |
| 5,694,015 | A * | 12/1997 | Luniewicz et al. | 318/611 |
| 5,729,065 | A * | 3/1998 | Fremery et al. | 310/90.5 |
| 5,731,645 | A * | 3/1998 | Clifton et al. | 310/74 |
| 5,747,958 | A * | 5/1998 | Van Der Broeck et al. | 318/747 |
| 5,760,503 | A * | 6/1998 | Tsuchida et al. | 310/49.19 |
| 5,973,431 | A * | 10/1999 | Li et al. | 310/168 |
| 5,982,117 | A * | 11/1999 | Taylor et al. | 318/400.01 |
| 6,051,942 | A * | 4/2000 | French | 318/254.1 |
| 6,194,800 | B1 | 2/2001 | Maruyama et al. | |
| 6,229,233 | B1 | 5/2001 | Torii et al. | |
| 6,262,508 | B1 * | 7/2001 | Shibayama et al. | 310/181 |
| 6,316,858 | B1 * | 11/2001 | Phillips | 310/114 |
| 6,323,572 | B1 | 11/2001 | Kinoshita | |
| 6,750,588 | B1 * | 6/2004 | Gabrys | 310/268 |
| 6,841,916 | B2 * | 1/2005 | Chiarenza | 310/254.1 |
| 6,897,595 | B1 * | 5/2005 | Chiarenza | 310/216.043 |
| 7,084,597 | B2 * | 8/2006 | Nakai et al. | 318/254.1 |
| 7,250,704 | B1 * | 7/2007 | Sortore et al. | 310/208 |
| 7,271,564 | B2 * | 9/2007 | Ramu | 318/254.1 |
| 7,821,221 | B2 * | 10/2010 | Kragh et al. | 318/774 |
| 2002/0135242 | A1 * | 9/2002 | Kawai | 310/49 R |
| 2003/0122440 | A1 * | 7/2003 | Horst | 310/181 |
| 2004/0085040 | A1 * | 5/2004 | Chen | 318/701 |
| 2004/0150285 | A1 * | 8/2004 | Decristofaro et al. | 310/216 |
| 2005/0062348 | A1 * | 3/2005 | Ohnishi et al. | 310/49 R |
| 2005/0099082 | A1 * | 5/2005 | Nashiki | 310/164 |
| 2006/0006744 | A1 * | 1/2006 | Nashiki | 310/49 R |
| 2006/0244337 | A1 * | 11/2006 | Makita et al. | 310/257 |
| 2007/0176505 | A1 * | 8/2007 | Trzynadlowski et al. | 310/114 |
| 2008/0136282 | A1 * | 6/2008 | Okazaki et al. | 310/156.36 |
| 2009/0021089 | A1 * | 1/2009 | Nashiki | 310/46 |

FOREIGN PATENT DOCUMENTS

| | | |
|---|---|---|
| DE | 39 31 484 A1 | 4/1991 |
| DE | 696 07 082 T2 | 12/2000 |
| DE | 698 08 994 T2 | 6/2003 |
| EP | 0 10 5 852 B1 | 5/1986 |
| EP | 0 527 593 A2 | 2/1993 |
| JP | A 48-092814 | 12/1973 |
| JP | A 51-033715 | 3/1976 |
| JP | A 53-073313 | 6/1978 |
| JP | 57022364 A * | 2/1982 |
| JP | A 05-199704 | 8/1993 |
| JP | A-05-199704 | 8/1993 |
| JP | 06-046549 | 2/1994 |
| JP | A 06-046549 | 2/1994 |
| JP | A 07-298593 | 11/1995 |
| JP | 08-182276 | 7/1996 |
| JP | A 11-206083 | 7/1999 |
| JP | A 11-252880 | 9/1999 |
| JP | 2000-156947 | 6/2000 |
| JP | A 2000-324755 | 11/2000 |
| JP | A-2000-324756 | 11/2000 |
| JP | A-2001-080375 | 3/2001 |
| JP | A 2003-199273 | 7/2003 |
| JP | A 2003-309957 | 10/2003 |
| WO | WO 03/100944 A1 | 12/2003 |

OTHER PUBLICATIONS

Verzicht, DE 3821660, English abstract, 1989.*

Dec. 14, 2010 Office Action issued in German Patent Application No. 11 2006 001 258.4-32 (with partial English Translation).

Mar. 15, 2011 Office action issued in Japanese Patent Application No. 2007-516299 (with English Translation).

Office Action issued Mar. 2, 2010 in corresponding Chinese Patent Application No. 200680026050.0.

* cited by examiner (a) EA—EA (b) EE—EE (c)

(a) EA—EA (b) EB—EB (c) EC—EC (b) ED—ED (a) EA—EA (b) EF—EF (a)

(b)

(a)

(b)

(a)

(b)

(a) EG-EG (b) EH-EH (a) (b) (c)

(a)

(b)

71B  71C  718

71D 730  731  733  735
737  738  739
732  734  736

MOTOR AND CONTROL UNIT THEREOF

TECHNICAL FIELD OF THE INVENTION

The present invention relates to a motor which is loaded, for example, on an automobile or a truck, and to a control unit therefor.

Motors utilizing reluctance force have been known (e.g., see Patent Document 1). FIG. 87 shows a cross section of an example of a motor called switched reluctance motor. As can be seen, the stator is provided with six salient poles along the circumference. Indicated by numerals 841 and 842 are A-phase salient poles, by 846 and 845 are B-phase salient poles, and by 844 and 843 are C-phase salient poles. A winding wire is wound about each of the salient poles, but the figure shows only A-phase windings 847 and 848. Indicated by numeral 849 is a rotor with four salient poles being provided along the circumference thereof. Indicated by 70A is a motor case.

In the operation of this switched reluctance motor, when the motor is rotated counterclockwise, for example, the windings of the individual A-, B- and C-phases are sequentially supplied with current in synchronization with the rotation of the rotor. As a result, attraction force is generated between the salient stator poles and the salient rotor poles of each phase to produce rotation. For example, in case of driving phase "A" of FIG. 87, current is supplied to the A-phase windings 847 and 848. Then, magnetic fluxes originating from the salient stator poles 842 reach the stator poles 841 through the salient rotor poles and returns to the original stator poles 842 through the back yoke. At this moment, an attraction force works between the salient stator poles and the salient rotor poles, by which rotation torque is obtained.

This motor is characterized by, for example, the low cost owing to the simple configuration without the use of expensive permanent magnets, the potential for high-speed rotation from the viewpoint of mechanical strength owing to the robust rotor, and the potential for high-speed rotation from electrical viewpoint owing to the possibility of magnetic flux control of the motor, for magnetic fluxes of the motor are all produced by electrical currents.

This motor has a drawback that the stator is entirely deformed by the radial attraction force that works between the stator and the rotor, and the action and inaction of the attraction force may cause strong vibration and loud noise. Also, there are problems that torque ripple tends to be large, and the degree of freedom is low in torque control because the structural constraint forces the driving range of one phase to about 120° in electrical angle. There are other problems of low power factor and tendency of large iron loss. Further problems include that this motor cannot be driven by three-phase AC inverters of wide industrial use.

[Patent Document 1] Japanese Patent Laid-Open No. 8-182276 (FIGS. 1 to 3)

DISCLOSURE OF THE INVENTION

Problems to be Solved by the Invention

An object of the present invention is to realize a high-quality motor with a simple configuration that can generate high torque. Realization of such a motor means that the problems involved in switched reluctance motors mentioned above can be solved. The problem of vibration and noise is caused by the deformation of the entire stator, which is induced by the radial attraction force that works between a portion of the stator and the rotor. Thus, issues to be addressed by the present invention include reduction of the vibration and noise mentioned above, reduction of torque ripple, expansion of a driving range of one phase to 120° or more, achievement of high torque and simplification of a drive unit.

Means for Solving the Problems

An outline of the configuration of the present invention is that: loop windings of individual phases are wound about a stator; the stator is provided with salient poles of the same phases along a circumference with substantially an even interval therebetween; and salient poles of a rotor are also provided along a circumference with substantially an even interval therebetween so as to be opposed to the salient poles of the stator. A relative phase difference between the salient stator poles and the salient rotor poles is 120° in electrical angle for three phases, and 90° for four phases. The salient poles can be fabricated so that each of them will have a circumferential width ranging from 120° to 240° in electrical angle for three phases.

It is so configured that a magnetic flux passing through the salient stator and rotor poles will make a circuit passing through magnetic paths for passing magnetic fluxes at a portion where the stator and the rotor face with each other. The magnetic paths for passing magnetic fluxes may also be usable for two or more magnetic fluxes. In particular, in case where two sets of salient stator and rotor poles are arranged in the same direction along the rotor shaft from the magnetic paths for passing magnetic fluxes, magnetomotive forces imposed on both of the phases are required to be independently handled. Let us take an example where the magnetic paths for passing fluxes, and phases B and C are arranged in this order along the rotor shaft. In this case, in order to generate torque by applying a magnetomotive force only to the B-phase salient stator and rotor poles, reverse currents are simultaneously supplied to two sets of windings WB and WC arranged sandwiching the B-phase salient stator and rotor poles in the rotor shaft direction. Under this condition, a magnetomotive force of the current passing through the winding WB works on the B-phase salient stator and rotor poles. On the other hand, the C-phase salient stator and rotor poles are effected by a sum of a magnetomotive force of the current passing through the winding WB and a magnetomotive force of the current passing through the winding WC. However, since both of the currents are reversed, almost no effect may be exerted to the phase C. In order to generate torque by applying a magnetomotive force only to the C-phase salient stator and rotor poles, a current may be passed through the winding WC.

Stator windings for each of the phases will have a large winding cross sectional area by providing a recess in a rotor and allowing the winding to bulge into the recess. Thus, copper loss of the motor can be reduced and motor torque can be enhanced.

A configuration may be provided in which two sets of salient stator and rotor poles are arranged in series in a fashion of a magnetic circuit. In this way, a maximum torque may be enhanced with approximately the same magnitude level of the magnetic fluxes.

The salient stator and rotor poles may be provided with slits, holes and the like to limit magnetic fluxes. This may have an effect of reducing magnetic saturation at other portions and thus may realize uniformization of the torque generation by the motor.

Leaked magnetic fluxes that pass through spaces other than the portions where the salient stator and rotor poles face with each other, may induce magnetic saturation at portions of the magnetic circuits in the motor, causing serious problem of deterioration in the power factor. In order to reduce the flux leakage, it may be effective to place permanent magnets around each salient pole, at side phases of each salient pole, or inside each salient pole. This effect is particularly prominent when large torque is permitted to generate by supplying high current through the windings.

Various modifications may be made to the shapes of the salient stator and rotor poles. Each of the salient poles may have a skewed, trapezoidal or sinusoidal shape, or indents may be provided in the rotor shaft direction to increase a facing area between each salient stator pole and salient rotor pole to thereby enhance torque. As to the motor structure, a motor may have a so-called outer-rotor structure in which a rotor is arranged at an outer periphery of a stator. Alternatively, a motor may have an incorporated motor structure in which a plurality of motors are incorporated.

The control unit of the motor may exert the same effect whether the direction of a current is positive or negative. This is based on the nature that reluctance torque makes use of an attraction force associated with the magnetic fluxes. Therefore, the control unit of the motor may have a configuration different from that of the generally used three-phase inverters. Specifically, it may be possible to control currents of three windings by using four power elements.

Advantages of the Invention

A motor of the present invention has simplified structures in a stator, rotor and windings. Therefore, productivity of motors and control units therefor can be enhanced. In addition, the present invention can provide a high-quality motor and a control unit therefor with reduced size and reduced cost.

DESCRIPTION OF SYMBOLS

Figure 1:
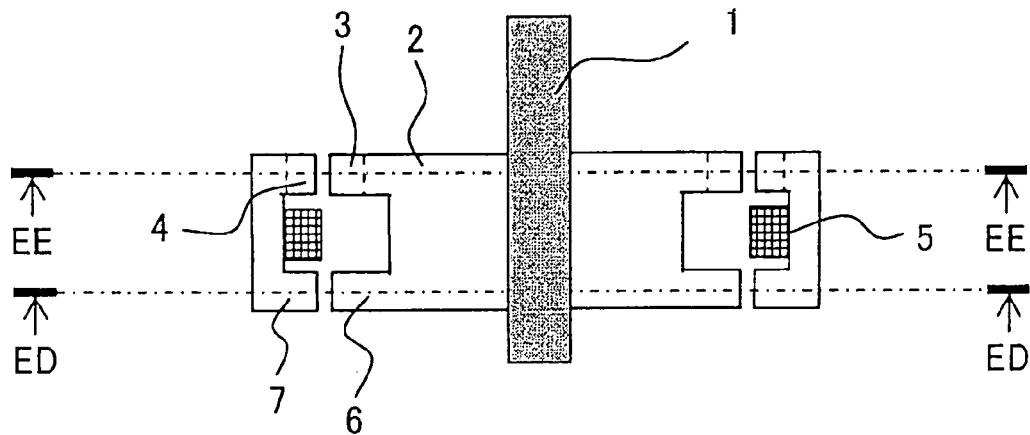
FIG. 1 is a schematic vertical cross section illustrating a single-phase motor having a loop winding.

1 rotor shaft
31 A-phase salient rotor poles
32 A-phase salient stator poles
33 Rotor-side magnetic path for passing magnetic fluxes
34 Stator-side magnetic path for passing magnetic fluxes 35 B-phase salient rotor poles
36 B-phase salient stator poles
37 C-phase salient rotor poles
38 C-phase salient stator poles
39 Winding for exciting phase A
40 Winding for exciting phases B and C
41 Winding for exciting phases B and C

BEST MODE FOR EMBODYING THE PRESENT INVENTION

With reference to the drawings, hereinafter will be described various embodiments of a motor related to the present invention and a control unit for the motor.

FIG. 1 shows an example of a reluctance motor. Indicated by numeral 2 is a rotor, by 3 are salient poles of the rotor and by 4 are salient stator poles. A cross section taken along a line EE-EE is shown by (a) of FIG. 3. This figure shows an example of twelve poles. Indicated by numerals 6 and 7 are magnetic paths for passing magnetic fluxes of the rotor and the stator, respectively. A cross section taken along a line ED-ED is shown by (b) of FIG. 3. As shown in the figure, cylindrically curved surfaces are opposed to each other to perform a function of passing magnetic fluxes with no generation of torque. Indicated by numeral 5 is a loop winding provided along the circumference with a plurality of turns. Since the shape is simple, the winding can be wound with a high space factor, taking on a good fabrication characteristic. The shape of the winding 5 does not necessarily have to be a complete circle, but may be modified into a wavy form in the rotor shaft direction or radial direction for the purpose of enlarging the stator and rotor magnetic paths as much as possible. Indicated by numeral 1 is a rotor shaft.

Figure 3:
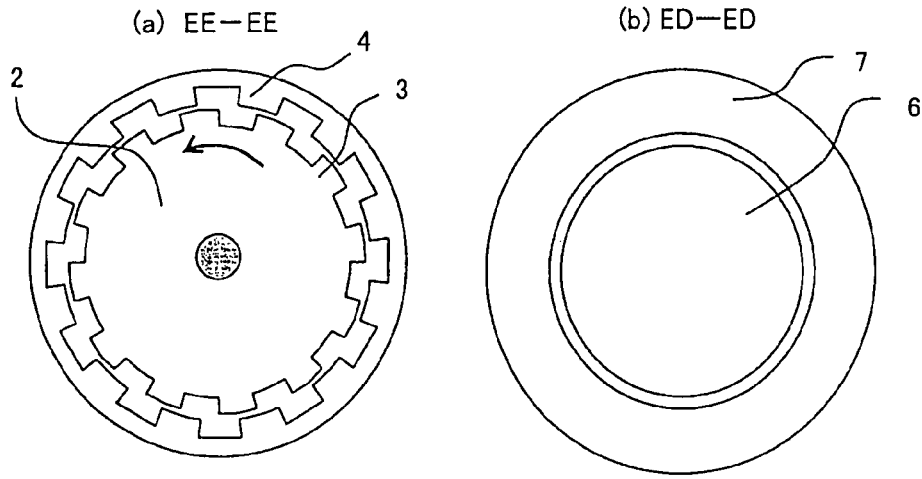
FIG. 3 illustrates schematic transverse cross sections of the configuration of the stator shown in FIG. 1.

As can be seen from the shape shown by (a) of FIG. 3, the motor shown in FIG. 1 is capable of generating an attraction force in a range of 180° in electrical angle, i.e. is capable of generating positive or negative torque in a range of 180° in electrical angle. In the remaining 180° range, however, torque cannot be generated in a desired direction. However, when used being juxtaposed to a vehicle engine, the motor can auxiliary generate torque at the time of driving, or can perform regeneration, or generation of electricity, at the time of braking. Thus, the motor can achieve the purpose, for example, of improving fuel efficiency of a so-called hybrid car where an engine and a motor are juxtaposed for driving. Such a single-phase reluctance motor is simple in the configuration comparing with a conventional three-phase AC motor, for example, and thus has a feature of having a small size and low cost. Also, a single-phase motor has a difficulty in continuously generating torque, but has a feature of having high availability of magnetic paths and windings as well as a feature of having high efficiency.

Figure 2:
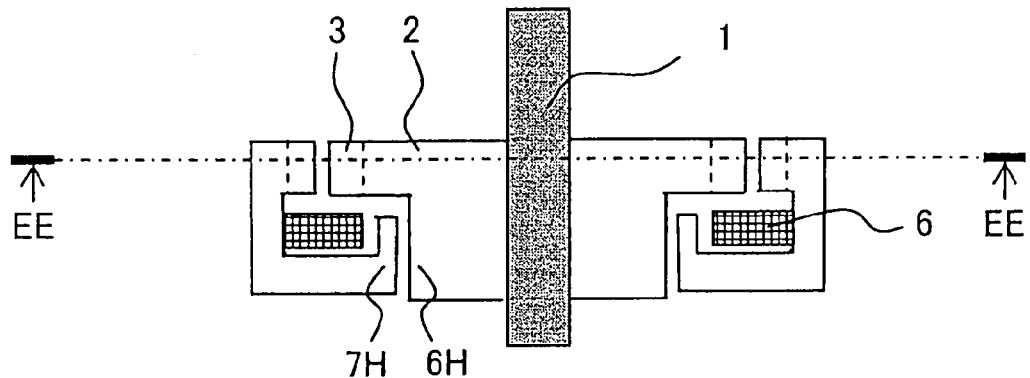
FIG. 2 is a schematic vertical cross section illustrating a single-phase motor having a loop winding.

FIG. 2 shows an example of the motor of the present invention. In this motor, a winding 6 comes into a recessed portion of the rotor for location, allowing the winding to have a large diameter. Thus, copper loss can be reduced, high efficiency can be achieved, and continuous rated torque can be increased. Each of salient rotor poles 6H and each of salient stator poles 7H have shapes different from those indicated by numerals 6 and 7 in FIG. 1. Thus, the same function can be exerted with modified shapes.

Figure 4:
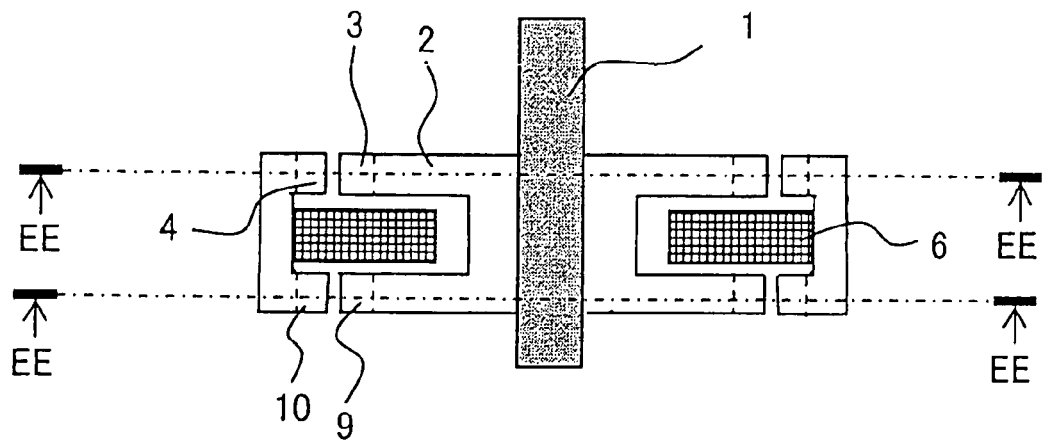
FIG. 4 is a schematic vertical cross section illustrating a single-phase motor having a loop winding.

FIG. 4 shows an example of the motor of the present invention with an addition of salient rotor poles 9 and salient stator poles 10. In this motor, magnetic resistance becomes larger than in the magnetic paths 6 and 7 for passing magnetic fluxes mentioned above. Therefore, although the torque constant is reduced, this motor has a feature that torque generating portions are increased to two to thereby increase the maximum torque.

Figure 5:
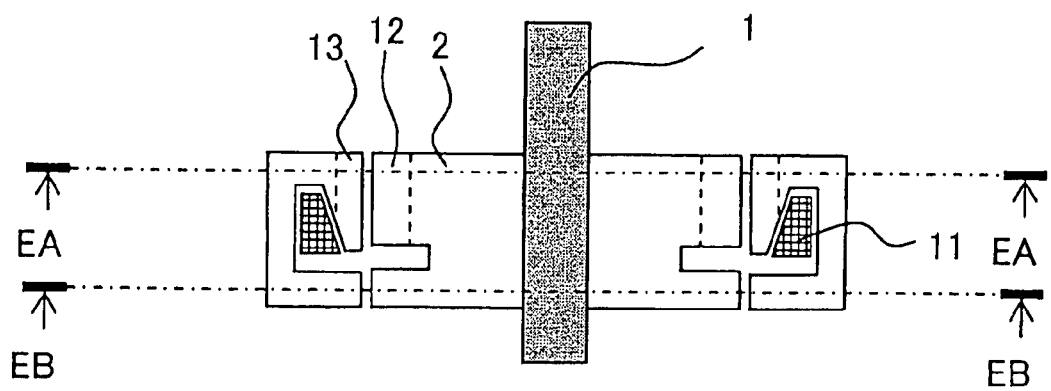
FIG. 5 is a schematic vertical cross section illustrating a single-phase motor having a loop winding.

FIG. 5 shows an example of the motor of the present invention. In this motor, salient rotor poles 12 and salient stator poles 13 are elongated in the rotor shaft direction to increase the rotation rate of induced magnetic flux MF, which rate is expressed by $d(MF)/d\theta$, and to increase the torque constant and the maximum torque. A winding 11 has a deformed shape in conformity with the above modification.

Figure 6:
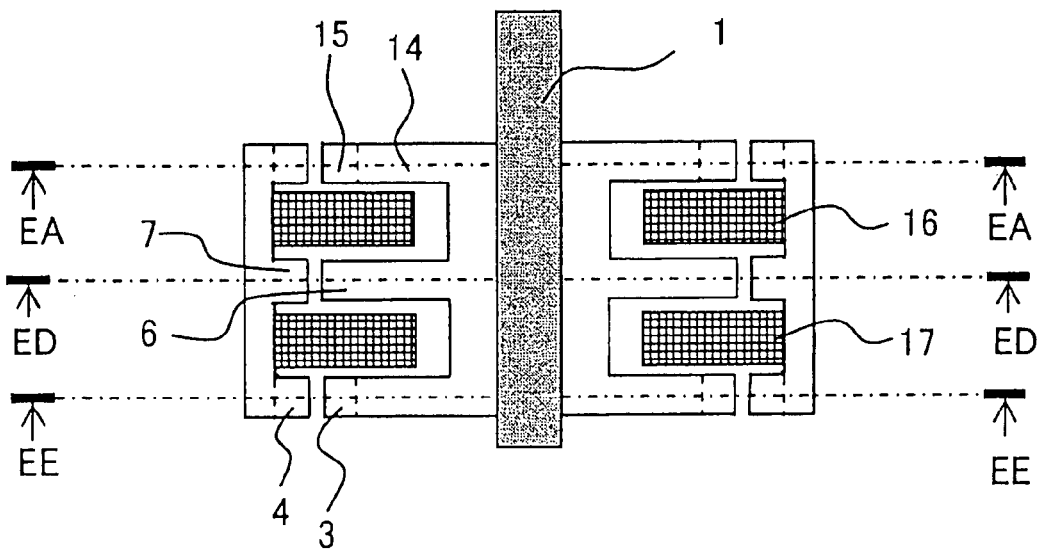
FIG. 6 is a schematic vertical cross section illustrating a two-phase motor having loop windings.

FIG. 6 shows a two-phase reluctance motor, an embodiment of the present invention. Indicated by 14 are A-phase salient rotor poles, by 15 are salient stator poles. A cross section taken along a line EA-EA has a configuration as shown by (a) of FIG. 7. Similar to the motor shown in FIG. 1, indicated by numerals 6 and 7 are magnetic paths for passing magnetic fluxes of the rotor and the stator, respectively. A cross section of the magnetic paths taken along a line ED-ED has a configuration as shown by (b) of FIG. 3. Indicated by 3 are B-phase salient rotor poles, by 4 are salient stator poles, a cross section of which taken along a line EE-EE has a configuration as shown by (b) of FIG. 7. A phase difference between the phases A and B is 180° in electrical angle.

In case of having a magnetomotive force of current worked on the salient rotor poles 14 and the salient stator poles 15, a winding 16 may be supplied with current. In this case, if the magnetic resistance between the magnetic paths 6 and 7 for passing magnetic fluxes of the rotor and the stator, respectively, is sufficiently small, almost no magnetomotive force works on the salient rotor poles 3 and the salient stator poles 4. In case having a magnetomotive force of current worked on the salient rotor poles 3 and the salient stator poles 4, a winding 17 may be supplied with current in the similar fashion.

By sequentially driving the phases in the order of A, B, A and B according to the rotational position of the rotor, torque can be generated over an area of 80% or more, although no torque can be generated at the very switching point of the phases A and B. It is difficult for the two-phase reluctance motor shown in FIG. 6 to continuously output torque because the motor has two phases, thus causing the torque to be pulsative. This motor shown in FIG. 6, however, has a feature of having less torque pulsation than the motor shown in FIG. 1.

When the motor shown in FIG. 6 is used with one-way rotation, either the shape of each salient stator pole or each salient rotor pole may be modified to obtain continuous rotating torque even with the two-phase motor. A specific example is shown by (c) of FIG. 7. As can be seen, the salient stator pole 15 has a shape with an addition of an auxiliary pole 15A shown by a broken line. The salient stator poles 15 and the salient rotor poles have a phase difference of just 180°. In this condition, no rotating torque can be obtained even with the magnetic excitation. However, the shape mentioned above having an addition of the auxiliary pole 15A enables application of large magnetomotive force, so that the rotor can generator rotating torque counterclockwise. In this case, torque pulsation can be drastically reduced.

Figures 7, 8:
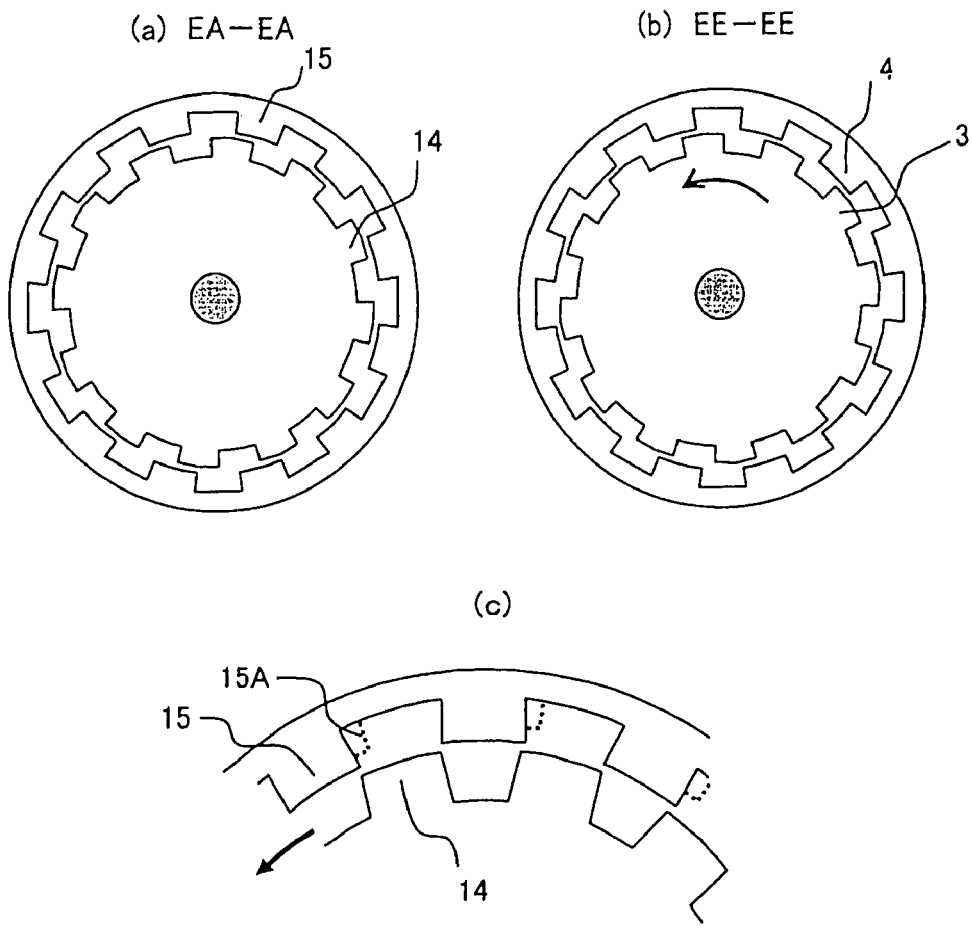
FIG. 7 illustrates schematic transverse cross sections of the stator shown in FIG. 6.
FIG. 8 is a schematic vertical cross section illustrating a three-phase motor having loop windings.
Figure 9:
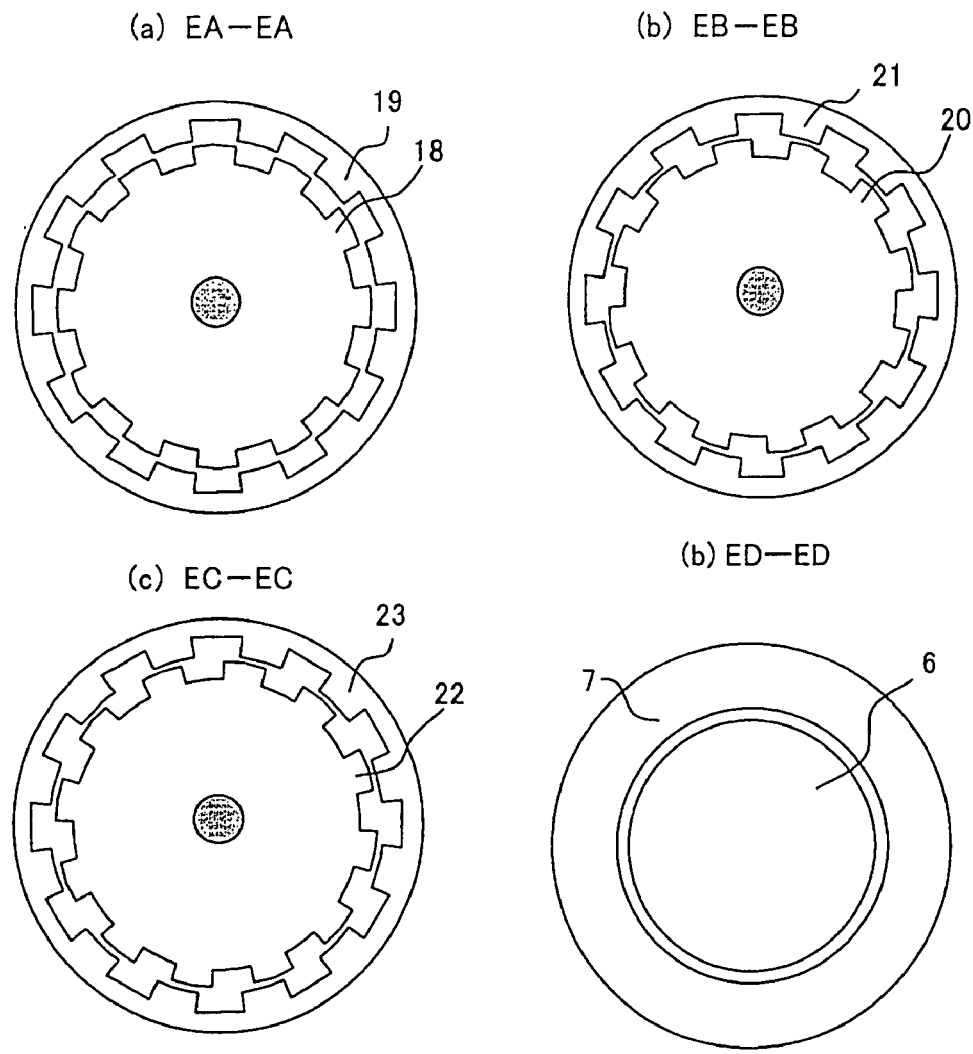
FIG. 9 illustrates schematic transverse cross sections of the stator shown in FIG. 8.

FIG. 8 shows a three-phase reluctance motor, another embodiment of the present invention. Indicated by numeral 18 are A-phase salient rotor poles and by 19 are salient stator poles. A cross section of these poles taken along a line EA-EA has a configuration as shown by (a) of FIG. 9. Indicated by numeral 20 are B-phase salient rotor poles and by 21 are salient stator poles. A cross section of these poles taken along a line EB-EB has a configuration as shown by (b) of FIG. 9. Indicated by numeral 22 are C-phase salient rotor poles and by 23 are salient stator poles. A cross section of these poles taken along a line EC-EC has a configuration as shown by (c) of FIG. 9. FIG. 9 shows by (d) a cross section taken along a line ED-ED. This cross section shows a configuration of the magnetic paths for passing magnetic fluxes. The structure shown in FIGS. 8 and 9 is obtained by combining the single-phase reluctance motor shown in FIG. 1 and the two-phase reluctance motor shown in FIG. 6, with the stator and the rotor being arranged with a phase difference of 120°. In this case, however, in order to remove the interaction between both of the motors, it is necessary to arrange these motors so as to be magnetically isolated from each other.

In this configuration, by sequentially driving the phases in the order of A, B and C according to the rotational position of the rotor, torque can be continuously generated and, depending on motor designs, torque ripple can be reduced. As to the direction of torque, positive and negative torque generation is possible, which is led to possible power operation and regenerative operation. As to the operation of this motor, a range of torque generation performed by one phase depends on a shape of each salient pole but, in case the width of a salient pole is 180° in electrical angle, this motor can be driven within 180°. Thus, in the motor shown in FIG. 8, the phases can be driven sequentially in the order of A, B and C to achieve smooth driving with small torque ripple. Also, in this case, since each of the phases can be driven within a range of 120° or more, there may be a region in the vicinity of a boundary between two phases, where two phases can be simultaneously driven.

Figure 10:
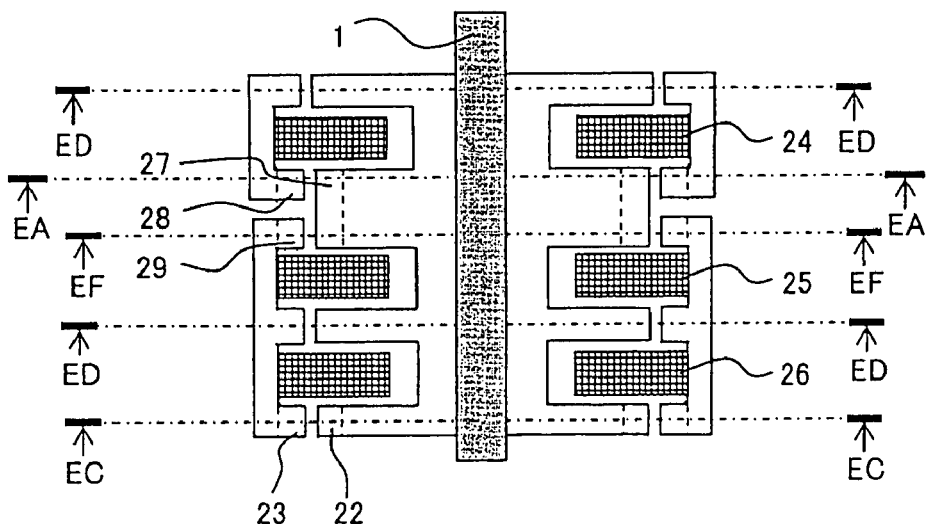
FIG. 10 is a schematic vertical cross section illustrating a three-phase motor having loop windings.
Figure 11:
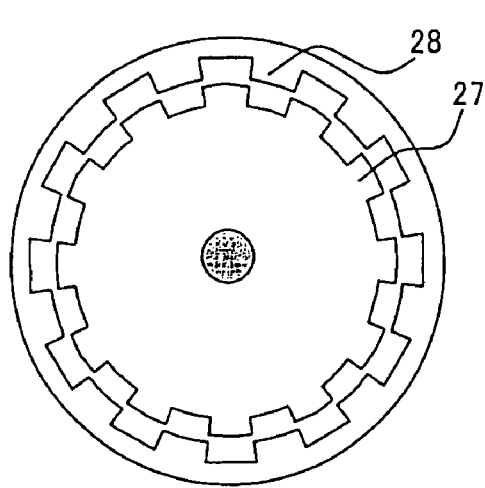
FIG. 11 illustrates schematic transverse cross sections of the stator shown in FIG. 10.
Figure 11:
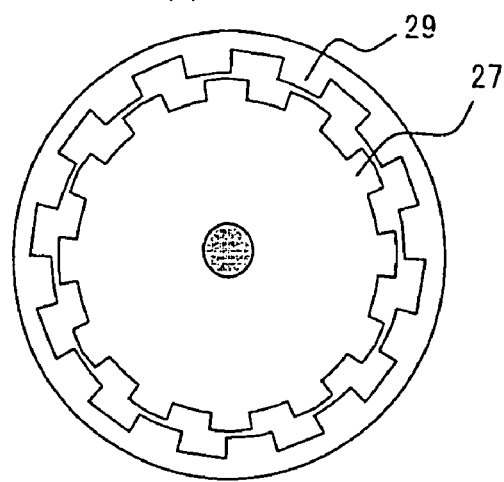

FIG. 10 shows an example of the motor of the present invention having different configuration. Comparing with the motor shown in FIG. 8, each of the A-phase salient rotor poles and each of the B-phase salient rotor poles having the same shape are abutted to each other in the motor shown in FIG. 10. Indicated by numeral 27 are salient rotor poles shared between the phases A and B. Indicated by numeral 28 are A-phase salient stator poles. A cross section including the A-phase salient stator poles taken along a line EA-EA has a configuration as shown by (a) of FIG. 11. Indicated by numeral 29 are B-phase salient stator poles, a cross section of which taken along a line EB-EB has a configuration as shown by (b) of FIG. 11.

It is principally possible to magnetically connect the stator-side separated back yoke in the arrangement and configuration of the motor shown in FIG. 8, with the rotor remaining the same as in FIG. 8, contrary to FIG. 10. In this case, however, the rotor is required to be magnetically separated into two, and thus the rotor shaft 1 is preferably made of a nonmagnetic material. In this way, the shape of each of the poles can be variously modified on an equivalent basis.

Figure 12:
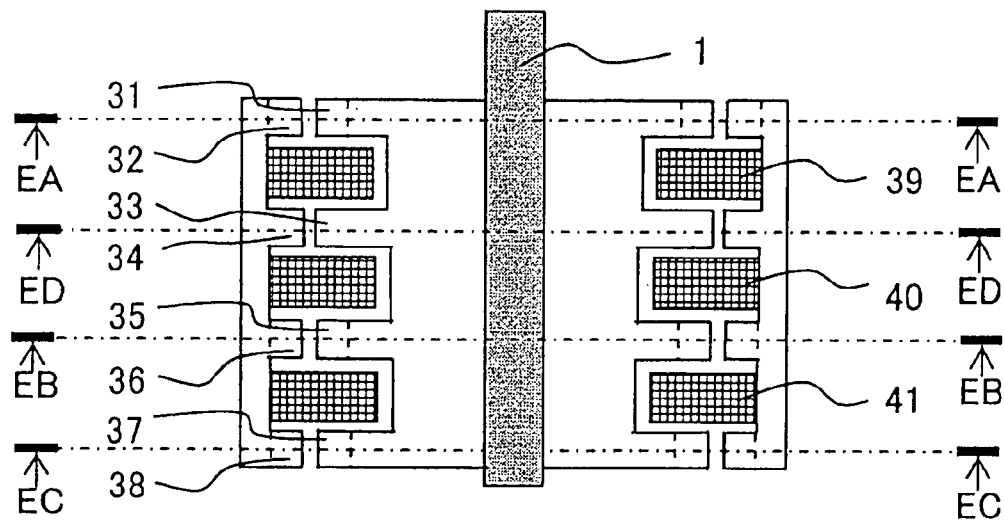
FIG. 12 illustrates schematic vertical cross sections of a three-phase motor having loop windings.
Figure 12:
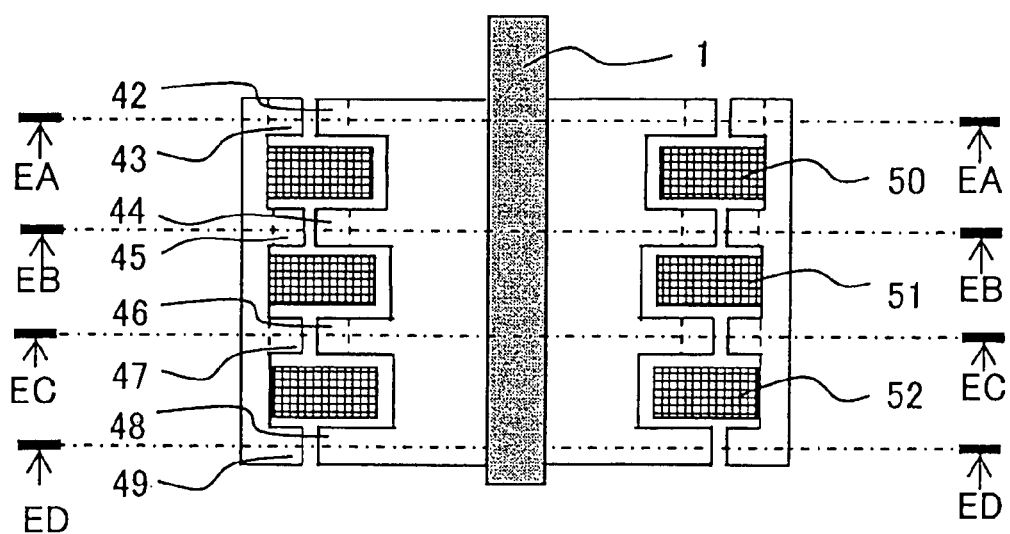

FIG. 12 shows by (a) a three-phase reluctance motor, another embodiment of the present invention. Indicated by numeral 31 are A-phase salient rotor poles and by 32 are salient stator poles, a cross section of which taken along a line EA-EA has a configuration as shown by (a) of FIG. 9. Indicated by numeral 35 are B-phase salient rotor poles and by 36 are salient stator poles, a cross section of which taken along a line EB-EB has a configuration as shown by (b) of FIG. 9. Indicated by numeral 37 are C-phase salient rotor poles and by 38 are salient stator poles, a cross section of which taken along a line EC-EC has a configuration as shown by (c) of FIG. 9. Indicated by numeral 33 is a magnetic path for passing magnetic fluxes of the rotor and by 34 is a magnetic path for passing magnetic fluxes of the stator, a cross section of which taken along a line ED-ED has a configuration as shown by (d) of FIG. 9. Phase difference between the phases A, B and C in the salient rotor poles and the salient stator poles is 120° in electrical angle. Indicated by 39 is an A-phase loop winding, by 40 is a B-phase loop winding and by 41 is a C- and B-phase loop winding.

In this configuration, by sequentially driving the phases in the order of A, B and C according to the rotational position of the rotor, torque can be continuously generated and, depending on motor designs, torque ripple can be reduced. Driving of the phase A can be realized by supplying current to the winding 39. That is, magnetic fluxes are induced and circuit through the salient rotor poles 31, the salient stator poles 32 and the magnetic paths 36 and 46 for passing fluxes, by which an attraction force is produced between the salient rotor poles 31 and the salient stator poles 32 to finally generate torque. Driving of the phase B can be realized by oppositely supplying currents to both of the windings 40 and 41. That is, magnetic fluxes are induced and circuit through the salient rotor poles 35, the salient stator poles 36 and the magnetic paths 33 and 34 for passing fluxes, by which an attraction force is produced between the salient rotor poles 35 and the salient stator poles 36 to finally generate torque. In this case, the C-phase salient rotor poles 37 and the salient stator poles 38 are applied with current, which is a sum of the currents oppositely supplied to the windings 40 and 41. As a result, no magnetomotive force is applied to the phase C and thus no torque is generated. Driving of the phase C can be realized by supplying current to the winding 41. That is, magnetic fluxes are induced and circuit through the salient rotor poles 37, the salient stator poles 38 and the magnetic paths 33 and 34 for passing fluxes, by which an attraction force is produced between the salient rotor poles 37 and the salient stator poles 38 to finally generate torque. The above description has been given on the assumption that a facing area between the magnetic paths for passing fluxes is constantly large and has small magnetic resistance.

In this way, by sequentially driving the phases in the order of A, B and C according to the rotational position of the rotor, positive and negative torque generation is possible, which is led to possible power operation and regenerative operation. As to the operation of this motor, a range of torque generation performed by one phase depends on a shape of each salient pole but, in case the width of a salient pole is 180° in electrical angle, this motor can be driven within 180°. Thus, in the motor shown in FIG. 8, the phases can be sequentially driven in the order of A, B and C to achieve smooth driving with small torque ripple. Also, in this case, since each of the phases can be driven within a range of 120° or more, there may be a region in the vicinity of a boundary between two phases, where two phases can be simultaneously driven. The example shown by (a) of FIG. 12 has salient poles, each of which has a comparatively small width in the rotor shaft direction. A larger width of each pole may generate larger torque.

Each of the windings 39, 40 and 41 for the phases A, B and C, respectively, shown by (a) of FIG. 12, has a simple circular shape. However, various modifications may be made on an equivalent basis. For example, each loop winding may have a serpentine shape in conformity with the contour of the stator poles, or a portion of each winding may be arranged external to the stator, or each winding may have a folded structure with semiperimeter turns being tailored to division, all of which are to be included in the present invention. The stator core and the rotor core may also be variously modified.

Figure 79:
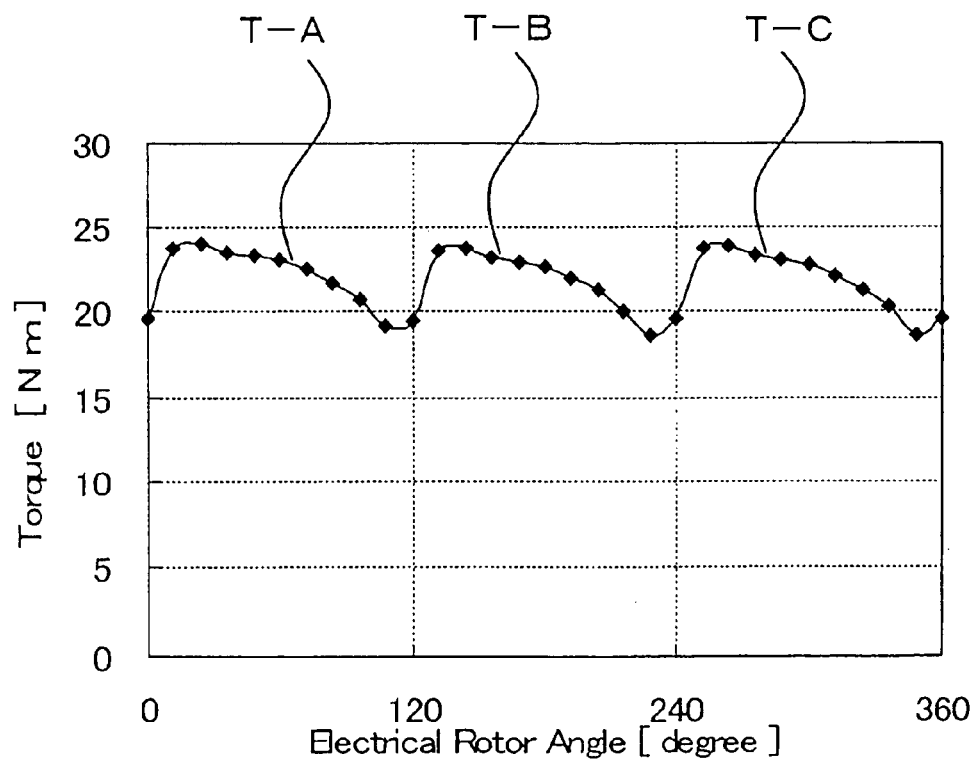
FIG. 79 is an illustration indicating torque of the motor shown by (a) of FIG. 12.

FIG. 79 shows an example of calculation of the output torque of the motor model shown by (a) of FIG. 12, in which motor model, phases are sequentially controlled in the order of A, B and C in synchronization with the rotational position of the rotor as described above. For the calculation shown in FIG. 79, nonlinear finite-element method has been used with the aid of a computer to carry out magnetic field analysis on the three-phase configuration of the motor. In the example, the motor has a diameter of 165 mm, each salient stator pole has a width of 15 mm in the rotor shaft direction, the number of salient stator poles along the circumference is twelve, and the air gap is 0.5 mm. The horizontal axis represents electrical angle, and the vertical axis represents output torque of the motor. T-A, T-B and T-C indicate torque generated by the salient rotor poles and the salient stator poles when currents are passed through the windings corresponding to the phases A, B and C, respectively, by a range of 120° in electrical angle. In particular, the torque T-B of the phase B resulting from the currents oppositely passed through the two windings 40 and 41 for differential operation, can be confirmed as being consistent with the theory. Although 120°-cycle torque ripple can be seen as being present, this level of torque ripple may allow for use of the motor in many ways. Lots of approaches can be taken for reducing this torque ripple, such as an approach for improving the shape of each pole of the motor, an approach for passing a phase current in a range of 120° to 180° in electrical angle, and an approach, on a control basis, for making correction based on current amplitude.

FIG. 12 shows by (b) another embodiment of the present invention. Comparing with (a) of FIG. 12, magnetic paths 48 and 49 for passing magnetic fluxes, are located at the end in the rotor shaft direction. In case of driving salient rotor poles 44 and 46, which are internally located in the motor, positive and negative currents may be supplied to windings 51 and 52, respectively, which are located adjacent to the relevant salient poles in the rotor shaft direction, similar to the case of driving the salient rotor poles 35 shown by (a) of FIG. 12. Then, torque can be generated only at the relevant salient poles. Thus, although the method of supplying current has been changed, smooth sequential driving is possible in the order of the phases A, B and C, as in the case of the motor shown by (a) of FIG. 12.

In the motor shown by (a) of FIG. 12, the winding 39, the salient rotor poles 31 and the salient stator poles 32 in the phase A may be removed, while changing the relative phase difference of the phases B and C from 120° to 180° to realize a two-phase reluctance motor made up of phases B and C. Comparing with the two-phase reluctance motor shown in FIG. 6, the positions of the magnetic paths 33 and 34 for passing magnetic fluxes have been moved from the center portion in the rotor shaft direction to the end in the rotor shaft direction. As explained referring to the three-phase motor shown by (a) of FIG. 12, currents are driven in such a way that the phase B is differentially driven.

Figure 13:
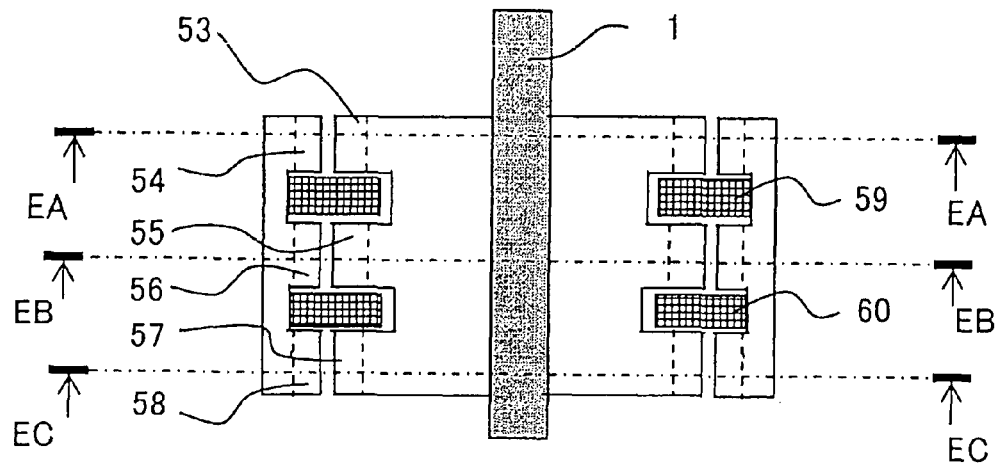
FIG. 13 is a schematic vertical cross section illustrating a three-phase motor having loop windings.

FIG. 13 shows a three-phase reluctance motor according to another embodiment of the present invention. Indicated by numeral 53 are A-phase salient rotor poles and by 54 are salient stator poles, a cross section of which taken along a line EA-EA has a configuration as shown by (a) of FIG. 9. Indicated by numeral 55 are B-phase salient rotor poles and by 56 are salient stator poles, a cross section of which taken along a line EB-EB has a configuration as shown by (b) of FIG. 9. Indicated by numeral 57 are C-phase rotor stator poles and by 58 are salient stator poles, a cross section of which taken along a line EC-EC has a configuration as shown by (c) of FIG. 9. Relative phase difference between the salient rotor poles and the salient stator poles in each of the phases A, B and C is 120° in electrical angle. Indicated by numeral 59 is an A-phase loop winding and by 60 is a C-phase loop winding. In case of driving the B-phase salient rotor poles 55, currents are oppositely passed through the A- and C-phase windings 59 and 60.

Torque can be generated in this configuration by sequentially driving the phases in the order of A, B and C according to the rotational position of the rotor. However, no magnetic path is provided in this motor like the magnetic paths 33 and 34 for passing magnetic fluxes in the motor shown by (a) of FIG. 12. Therefore, magnetic fluxes that pass through the salient poles to be driven will make a circuit through different salient poles. As a result, the different salient poles will generate torque in the inverse direction of that of the salient poles to be driven. Accordingly, there are some portions which may confront difficulty in generating torque. Also, torque pulsation may be caused.

Figure 14:
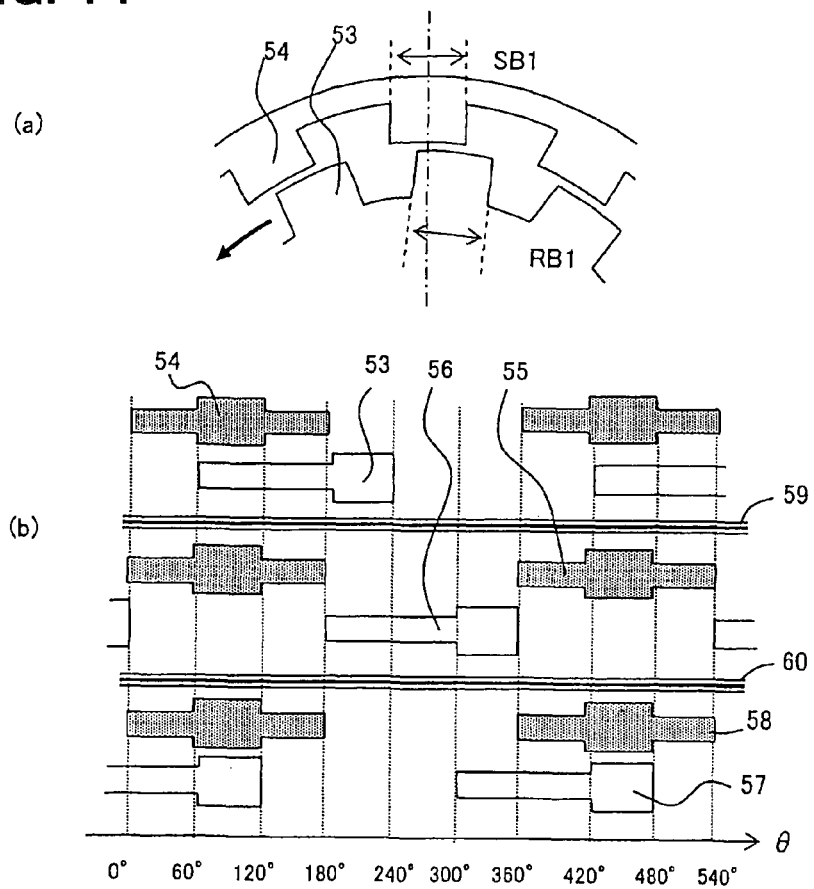
FIG. 14 illustrates schematic transverse cross sections of the stator shown in FIG. 13.

The torque pulsation changes depending on a circumferential width SB1 of each salient stator pole and a circumferential width RB1 of each salient rotor pole, which are shown in an enlarged transverse cross section at (a) of FIG. 14, as well as the shapes of these salient poles in the rotor shaft direction. Dimensions of these SB1 and RB1 may be selected depending on use and desired properties.

In particular, when importance is given to continuous one-way torque, as shown by an arrow at (a) of FIG. 14, for example, each of the salient poles may have a small-width portion and a large-width portion in the rotor direction, as shown in the linear development of the salient rotor poles 55 and the salient stator poles 56 at (b) of FIG. 14 as viewed from an air-gap plane. Specifically, a portion of the salient pole, which generates torque, may have a small width in the rotor shaft direction, and the remaining portion of the salient pole may have a large width in the rotor shaft direction. This configuration may impart the same magnitude to each of the magnetic fluxes that generate torque and make a circuit through the motor. Accordingly, a portion under driving may have high flux density and other portion may have low flux density to thereby reliably obtain torque in a desired rotation direction. In the state shown by (b) of FIG. 14, each A-phase salient rotor pole 53 faces each salient stator pole over an electrical angle of 120°. However, the facing area is smaller than that between each C-phase salient rotor pole 57 and each salient stator pole 58. Accordingly, by exciting the phase A, counterclockwise rotating torque can be obtained.

The method shown by (b) of FIG. 14 explains about one-way torque generation, however, the motor may be functioned with the rotation direction of both ways. For example, when the motor is used for driving a compressor of an air conditioner, counterclockwise power operation may chiefly be performed. When the motor is used as a generator being mechanically connected to an internal combustion engine, clockwise regenerative operation may be performed to generate substantially continuous torque.

The two-phase motor shown in FIG. 6 and the three-phase motor shown in FIGS. 13 and 14 can both be operated with two windings. Thus, as will be explained later referring to various types of drive circuits, the drive circuit for current and voltage can be simplified, which is led to the reduction in the number of electrical elements and to the most appealing points, that is, the reduction in the total cost of the motor and the drive circuit. Since a half of the portions can contribute to driving, the motor can be regarded as being an excellent motor from the aspect, as well, of torque per unit volume.

Figure 15:
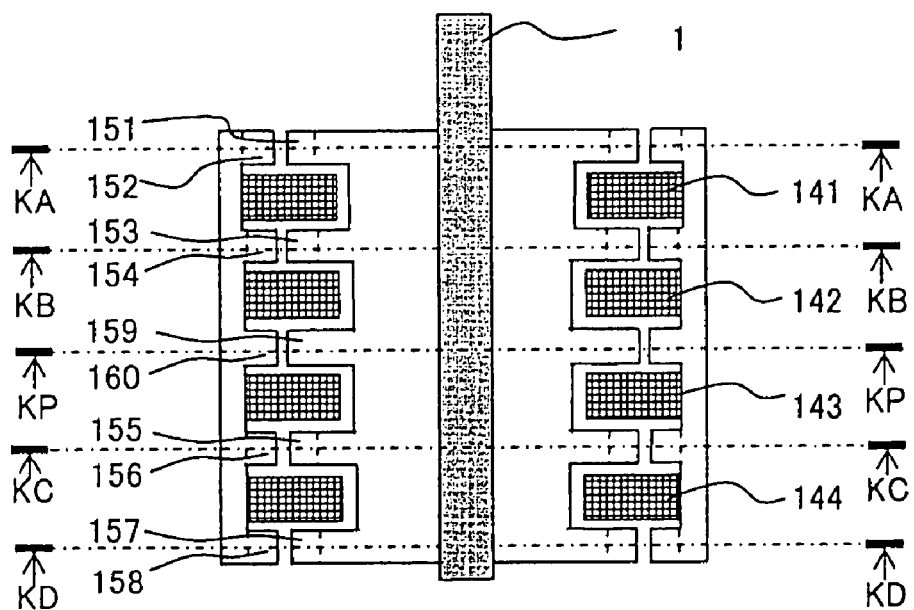
FIG. 15 illustrates schematic vertical cross sections of a four-phase motor having loop windings.
Figure 15:
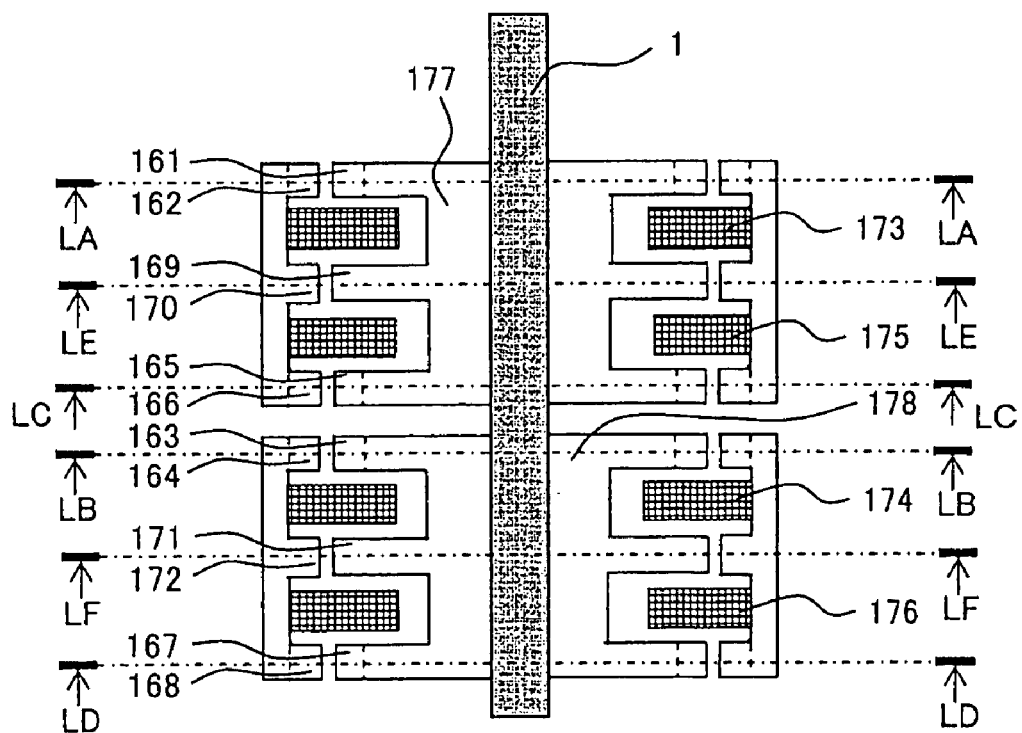

FIG. 15 shows by (a) a four-phase reluctance motor according to another embodiment of the present invention. Indicated by numeral 151 are A-phase salient rotor poles and by 152 are salient stator poles, a cross section of which taken along a line KA-KA has a configuration as shown by (a) of FIG. 9. Indicated by numeral 152 are B-phase salient rotor poles and by 154 are salient stator poles, a cross section of which taken along a line KB-KB shows the rotor and the stator having a relative phase difference of 90° in electrical angle with respect to those shown in the cross section taken along the line KA-KA. Indicated by numeral 155 are C-phase salient rotor poles and by 156 are salient stator poles, a cross section of which taken along a line KC-KC shows the rotor and the stator having a relative phase difference of 180° in electrical angle with respect to those shown in the cross section taken along the line KA-KA. Indicated by numeral 157 are D-phase salient rotor poles and by 158 are salient stator poles, a cross section of which taken along a line KD-KD shows the rotor and the stator having a relative phase difference of 270° in electrical angle with respect to those shown in the cross section taken along the line KA-KA. Indicated by numeral 159 is a magnetic path for passing magnetic fluxes of the stator and by 160 is a magnetic path for passing magnetic fluxes of the rotor, a cross section of which taken along a line KP-KP has a configuration as shown by (d) of FIG. 9. Indicated by numerals 141, 142, 143 and 144 are windings arranged between the stator poles. Currents passed through these windings will allow a magnetomotive force to work on a polar portion of each salient pole to generate rotating torque.

The phases A, B, C and D can be driven in this order in synchronization with the rotational position of the rotor to have the rotor generated torque. For example, when the A-phase salient rotor poles 151 and the salient stator poles 152 are in a relationship shown by (b) of FIG. 7, supplying current to the winding 141 may cause an electromagnetic attraction force, which in turn allows the rotor to generate counterclockwise torque. When the phase B is in a relationship shown by (b) of FIG. 7, supplying currents to the windings 141 and 142 in opposite directions may cause an attraction force between the salient rotor poles 153 and the salient stator poles 154, which in turn allows the rotor to generate counterclockwise torque. When the phase C is in a relationship shown by (b) of FIG. 7, supplying currents to the windings 143 and 144 in opposite directions may cause an attraction force between the salient rotor poles 155 and the salient stator poles 156, which in turn allows the rotor to generate counterclockwise torque. When the phase D is in a relationship shown by (b) of FIG. 7, supplying current to the winding 144 may cause an attraction force between the salient rotor poles 157 and the salient stator poles 158, which in turn allows the rotor to generate counterclockwise torque.

Each of the phases can generate torque over a range of near 180° in electrical angle. For this reason, it is possible to effect driving control in such a way that two out of four phases may generate torque in most sections. Further, as will be described later, a drive circuit for current and voltage may be simplified to present characteristics in the cost of both the motor and the drive unit. In the example shown by (a) of FIG. 15, the magnetic path 159 for passing magnetic fluxes of the stator and the magnetic path 160 for passing magnetic fluxes of the rotor are arranged at the center portion in the rotor shaft direction, however, these positions may be changed.

FIG. 15 shows by (b) an example of a four-phase reluctance motor of the present invention. This motor is configured by arranging two sets of the two-phase motor shown in FIG. 6 at the rotor shaft 1, with a phase difference of 90°.

Indicated by numeral 161 are A-phase salient rotor poles and by 162 are salient stator poles, a cross section of which taken along a line LA-LA has a configuration as shown by (a) of FIG. 9. Indicated by numeral 163 are B-phase salient rotor poles and by 164 are salient stator poles, a cross section of which taken along a line LB-LB shows the rotor and the stator having a relative phase difference of 90° in electrical angle with respect to those shown in the cross section taken along the line LA-LA. Indicated by numeral 165 are C-phase salient rotor poles and by 166 are salient stator poles, a cross section of which taken along a line LC-LC shows the rotor and the stator having a relative phase difference of 180° in electrical angle with respect to those shown in the cross section taken along the line LA-LA. Indicated by numeral 167 are D-phase salient rotor poles and by 168 are salient stator poles, a cross section of which taken along a line LD-LD shows the rotor and the stator having a relative phase difference of 270° in electrical angle with respect to those shown in the cross section taken along the line LA-LA. Indicated by numeral 169 is a magnetic path for passing magnetic fluxes of the stator and by 170 is a magnetic path for passing magnetic fluxes of the rotor, a cross section of which taken along each of lines LD-LD and LE-LE has a configuration as shown by (d) of FIG. 9. Indicated by numerals 173, 174, 175 and 176 are windings arranged between the stator poles. Currents passed through these windings will allow a magnetomotive force to work on a polar portion of each salient pole to generate rotating torque.

The phases A, B, C and D can be driven in this order in synchronization with the rotational position of the rotor to have the rotor generated torque. For example, when the A-phase salient rotor poles 161 and the salient stator poles 162 are in a relationship shown by (b) of FIG. 7, supplying current to the winding 173 may cause an electromagnetic attraction force, which in turn allows the rotor to generate counterclockwise torque. When the phase B is in a relationship shown by (b) of FIG. 7, supplying current to the winding 174 may cause an attraction force between the salient rotor poles 163 and the salient stator poles 164, which in turn allows the rotor to generate counterclockwise torque. When the phase C is in a relationship shown by (b) of FIG. 7, supplying current to the winding 175 may cause an attraction force between the salient rotor poles 165 and the salient stator poles 166, which in turn allows the rotor to generate counterclockwise torque. When the phase D is in a relationship shown by (b) of FIG. 7, supplying current to the winding 176 may cause an attraction force between the salient rotor poles 167 and the salient stator poles 168, which in turn allows the rotor to generate counterclockwise torque.

In this way, in the motor shown by (b) of FIG. 15, two- or one-phase torque is constantly generated to produce forward or reverse rotation with power operation or regenerative operation to thereby achieve continuous operation. The configuration shown by (b) of FIG. 15 can provide a motor, which can achieve driving of each phase by only supplying current for the phase to a relevant one winding to exert high driving rate and small copper loss. The arrangement of the phases A, B, C and D of the motor shown by (b) of FIG. 15 is not limited but may be changed. The arrangement/configuration of the motor shown by (b) of FIG. 1 has sections magnetically separated in the vertical direction in the paper plane. Principally, however, magnetic coupling may be attained either at a rotor side or at a stator side. If the upper and lower stator-side back yoke are to be coupled, the rotor is required to be magnetically separated, and thus the rotor shaft 1 may preferably be made of a nonmagnetic material.

The four-phase reluctance motor with magnetic paths for passing fluxes of the present invention may have other configurations than the ones shown by (a) and (b) of FIG. 15. Specifically, the motor may have configurations realized by combining the configurations shown in FIGS. 1 to 14 and modified configurations thereof, with a phase difference of about 90° between phases. Further, in case of a multiphase motor having more than four phases, phases may be added to the configurations shown by (a) and (b) of FIG. 15, with the impartment of a relative phase difference depending on the number of phases. Thus, a multiphase motor having five or more phases can be realized.

Figure 16:
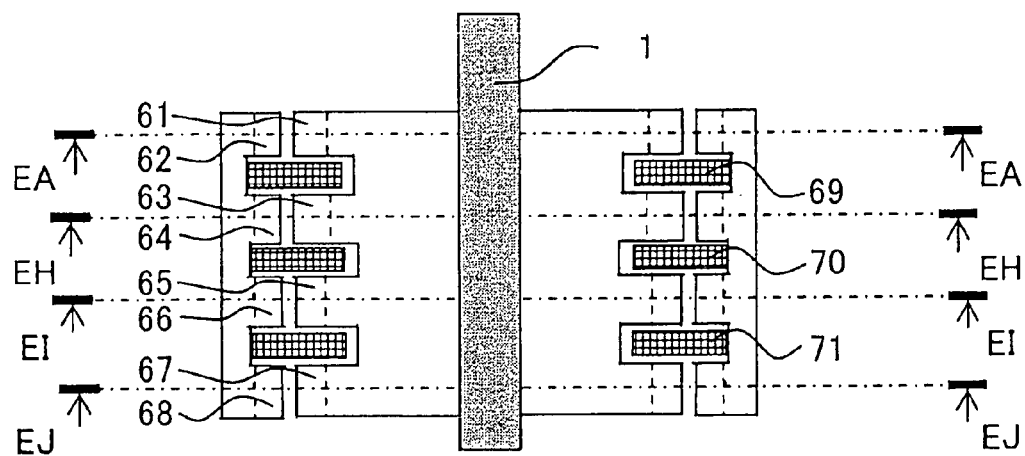
FIG. 16 is a schematic vertical cross section illustrating a four-phase motor having loop windings.

FIG. 16 shows a four-phase reluctance motor according to another embodiment of the present invention. Indicated by numeral 61 are A-phase salient rotor poles and by 62 are salient stator poles, a cross section of which taken along a line EA-EA has a configuration as shown by (a) of FIG. 9. Indicated by numeral 63 are B-phase salient rotor poles and by 64 are salient stator poles, a cross section of which taken along a line EH-EH shows the rotor and the stator having a relative phase difference of 90° in electrical angle with respect to those shown in the cross section taken along the line EA-EA. Indicated by numeral 65 are C-phase salient rotor poles and by 66 are salient stator poles, a cross section of which taken along a line EI-EI shows the rotor and the stator having a relative phase difference of 180° in electrical angle with respect to those shown in the cross section taken along the line EA-EA. Indicated by numeral 67 are D-phase salient rotor poles and by 68 are salient stator poles, a cross section of which taken along a line EJ-EJ shows the rotor and the stator having a relative phase difference of 270° in electrical angle with respect to those shown in the cross section taken along the line EA-EA.

Indicated by numerals 69, 70 and 71 are windings arranged between the stator poles. Currents passed through these windings will allow a magnetomotive force to work on a polar portion of each salient pole to generate rotating torque.

As shown by the enlarged transverse cross section at (a) of FIG. 14, a circumferential width of each salient pole can be selected. Theoretically, minimum widths SB1 and RB1 of the stator and the rotor poles, respectively, that can achieve continuous rotation are 120°. The stator and the rotor pole widths SB1 and RB1, respectively, for theoretically possible continuous torque generation range from 120° to 240°. An optimum value of pole width depends on a desired motor specification because output torque may vary depending on the magnetic impedance of a motor as a whole and currents of the individual windings.

Figure 17:
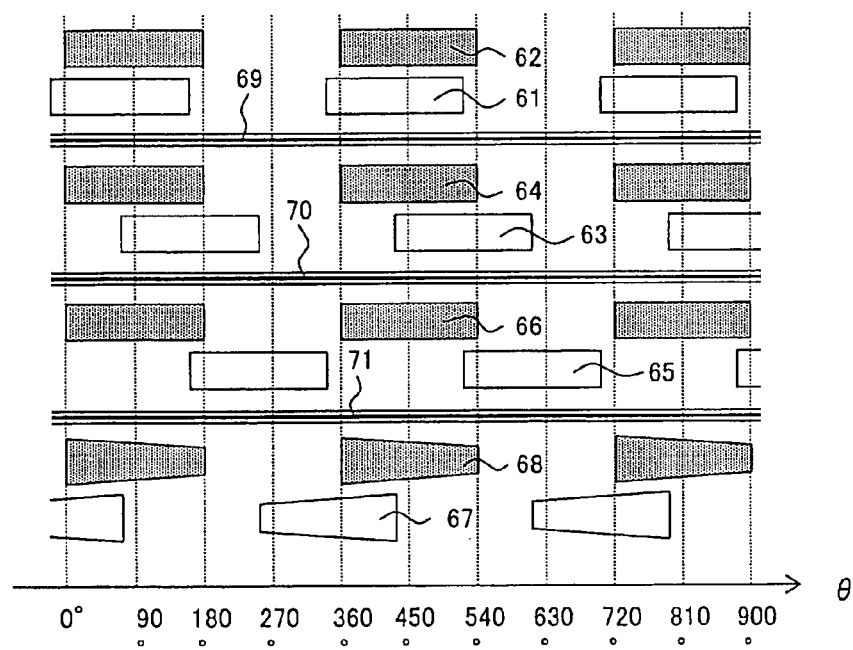
FIG. 17 illustrates a linear development of an inner peripheral surface configuration of the stator shown in FIG. 16 along the circumference with loop windings being arranged therein and with an outer peripheral surface configuration of the rotor linearly developed along the circumference being provided thereabove.

FIG. 17 is a linear development including a circumferential configuration of the salient stator poles in the vicinity of an air gap portion between the stator and the rotor of the motor shown in FIG. 16, and an adjacently illustrated linear development including a circumferential configuration of the salient rotor poles. For example, the configuration of the A-phase salient stator poles 62 shown in FIG. 17 is opposed to the adjacently illustrated configuration of the salient rotor poles 61. The horizontal axis of FIG. 17 indicates electrical angle. The salient stator and rotor poles of the individual phases are arranged in the order of A, B, C and D from the top of the paper plane of FIG. 17, with the loop windings 69, 70 and 71 being arranged therebetween. When the rotor is rotated, the salient rotor poles 61, 63, 65 and 67 move left and right in the paper plane.

In the state shown in FIG. 17, an explanation will now be given on a first method for the rotor to generate torque in a direction from right to left in the paper plane. In case an attraction force between the salient stator poles 66 and the salient rotor poles 65 is utilized in the state shown in the figure, supplying currents to the windings 70 and 71 in opposite directions may allow the magnetic fluxes passing through the stator poles 66 to pass through the back yoke of the stator, to pass through other salient stator poles and salient rotor poles, to pass through the back yoke of the rotor and to return to the salient rotor poles 65. In this state, flux density between the salient stator poles 66 and the salient rotor poles 65 exhibits a highest value of those at other portions. As a result, for the motor as a whole, the rotor generates torque in a direction from right to left in the paper plane.

Subsequently, an explanation will be given on a second method for generating torque in FIG. 17. In case an attraction force between the salient stator poles 64 and the salient rotor poles 63 is utilized in the state shown in the figure, supplying currents to the windings 69 and 70 in opposite directions may allow the magnetic fluxes passing through the stator poles 64 to pass through the back yoke of the stator, to pass through other salient stator poles and salient rotor poles, to pass through the back yoke of the rotor and to return to the salient rotor poles 63. In this state as well, flux density between the salient stator poles 64 and the salient rotor poles 63 exhibits a highest value. As a result, for the motor as a whole, the rotor generates torque in a direction from right to left in the paper plane.

An explanation will now be given on a third method for generating torque in FIG. 17. In the state shown in the figure, methods can be taken for utilizing an attraction force between the salient stator and rotor poles 66 and 65 and an attraction force between the salient stator and rotor poles 64 and 63. Based on these methods, current values of the windings may be determined, so that the magnetic fluxes passing through the stator poles 66 may pass through the back yoke of the stator, pass through the salient stator and rotor poles 64 and 63, pass through the back yoke of the rotor, and return to the salient rotor poles 65. In this case, the torque generated by the fluxes passing through the salient stator and rotor poles 66 and 65 is directed to the same direction as that of the torque generated by the fluxes passing through the salient stator and rotor poles 64 and 63. This is effective because the fluxes making circuit will generate torque in the same direction at two points.

Also, in this case, when the area of the portion where the salient stator and rotor poles 64 and 63 face with each other through the air gap is TK43 and the flux passing therethrough is MF43, and when the area of the portion where the salient stator and rotor poles 66 and 65 face with each other through the air gap is TK45 and the flux passing therethrough is MF45, the area TK43 is larger than the area TK65 and the flux MF43 is larger than the flux MF65. Accordingly, a difference of the fluxes, which is MFD135≈MF43-MF65, is adapted to work passing through different salient stator poles 62 and 68 and the back yoke of the rotor and returning to the salient rotor pole 63.

As a specific example for passing current at this time, current C70 may be supplied to the winding 70 and current C69 and current C71, which are reverse of the current C70 may be supplied to the windings 69 and 71, respectively. In a simple theory, the amplitude then of the currents C70, C69 and C71 may preferably be such that the amplitude of the current C70 equals to a sum of the amplitude of the currents C69 and C71. For example, when the amplitude of the current C69 is equal to that of the current C71, the amplitude of the current C70 will be twice as large as that of the current C69 as can be expressed by an equation C70=−C69-C71.

The current values of the individual phases are not limited to these values, but the currents C69, C70 and C71 may have some degree of freedom within the scope mentioned above. That is, each of the current values is determined depending on the magnetic resistance of the relevant polar portion and the magnetomotive force generated by the relevant current. Accordingly, the current value of each of the phases may be determined so that a large magnetomotive force will work on the poles which are desired to generate large torque.

In the motor shown in FIGS. 16 and 17, which utilizes four-phase reluctance torque, the salient rotor poles and the salient stator poles of each phase are opposed to each other, and four sets of a plurality of magnetic resistance portions are circumferentially arranged for four phases. In this case, each resistance varies with the rotation of the rotor and generation of torque is binarized in positive and negative directions. Three windings are arranged in the rotor shaft direction between the four sets salient stator poles. The motor shown in FIGS. 16 and 17 is a passive element and has a mechanism of generating torque by varying with the rotational position and by exerting electromagnetic effects in association with the polarized magnetic resistance portions mentioned above and the three sets of currents. Thus, the motor can be driven in several ways. Simply, however, three current values for the three windings may only have to be determined at certain rotational positions of the rotor. Determination of the three current values for the three windings at each of the rotational positions of the rotor, may enable rotation of this motor for utilizing the four-phase reluctance torque, throughout the circumference. In each of the first to third methods for generating torque, a typical example has been presented. In each of such examples, a slight change of the three current values may mostly enable generation of torque, which are also intended as being included in the present invention.

In case a salient stator pole SJX and an opposed salient rotor pole RJX are in a positional relationship where an attractive force is produced in a direction which is opposite to the direction torque is desired to be generated, some degree of magnetic flux is also generated between the salient poles SJX and RJX to generate torque in the opposite direction. The torque finally generated by the motor equals to the difference between the torque in the direction it is desired to be generated and the torque in the opposite direction.

There may be another method, or more effective method, for driving the motor shown in FIG. 16, in which control is effected by switching the first and the second methods depending on the rotational position of the rotor.

As to the directions for supplying currents to the loop windings 69, 70 and 71, currents may be alternately supplied in the forward direction, the opposite direction and the forward, respectively. This method may enable control with one-way current for each of the windings, while the one-way current is in conformity with the explanation provided above for the motor shown in FIGS. 16 and 17. Thus, this method may be convenient for current driving. In particular, the control unit may be simplified to realize a small and low-cost control unit. Methods for supplying currents will be provided later together with configuration examples of the control unit for motor and examples of the operation.

Hereinafter will be discussed a method for allowing two phases to generate torque in the same direction, based on the third method for generating torque, in the motor shown in FIG. 16, or in a relationship between the salient rotor and stator poles shown in FIG. 17. This may constitute a feature in which most of the regions have some regions where both of the two phases involved are disabled to generate torque. The degree of the presence of the disabled regions may be determined by the shape of each salient pole. In an application where one-way rotation is dominant, there may be a method for improving the feature. For example, when the salient stator poles are driven from the right to the left in the paper plane of FIG. 17, each of the salient stator poles may be enlarged toward the left side in the paper plane as the salient stator poles 68; and each of the salient rotor poles may be enlarged toward the right side in the paper plane as the salient rotor poles 67. In this way, in the regions where torque of one of the two phases becomes small, the facing area between the salient stator and rotor poles not to be driven becomes larger than the facing area between the remaining two sets of salient stator and rotor poles to be driven. The difference in the magnetic impedance may cause a difference in flux density, by which the difference between the positive torque and the negative torque is increased. As a result, the output torque of the motor can be increased.

Figure 18:
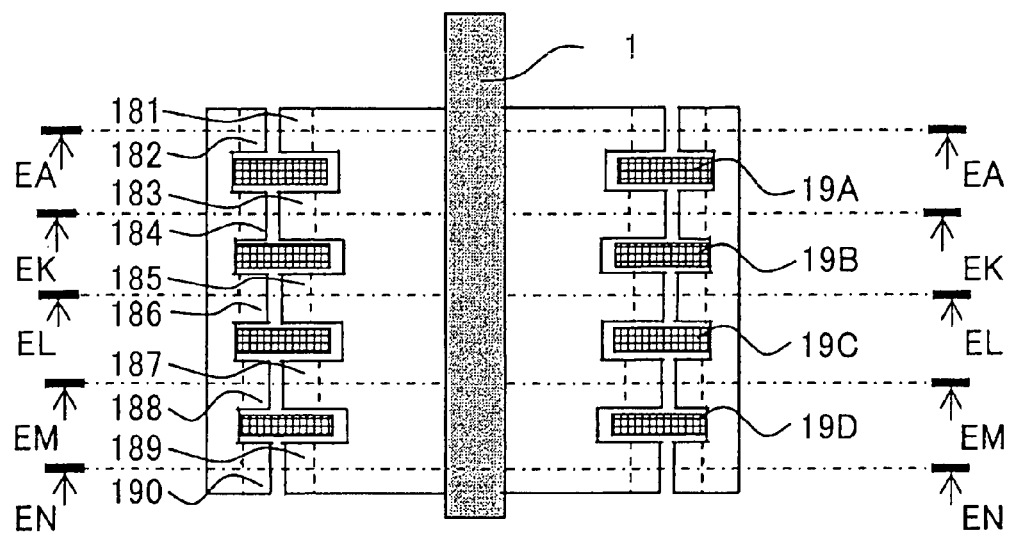
FIG. 18 is a schematic vertical cross section illustrating a five-phase motor having loop windings.

FIG. 18 shows an example of a five-phase motor of the present invention. Comparing with the motor shown in FIG. 16, the salient stator poles, the salient rotor poles and the windings are increased by one. Indicated by numeral 181 are A-phase salient rotor poles and by 182 are salient stator poles, a cross section of which taken along a line EA-EA has a configuration shown by (a) of FIG. 9. Indicated by numeral 183 are B-phase salient rotor poles and by 184 are salient stator poles, a cross section of which taken along a line EK-EK shows the rotor and the stator having a relative phase difference of 72° in electrical angle with respect to those shown in the cross section taken along the line EA-EA. Indicated by numeral 185 are C-phase salient rotor poles and by 186 are salient stator poles, a cross section of which taken along a line EL-EL shows the rotor and the stator having a relative phase difference of 144° in electrical angle with respect to those shown in the cross section taken along the line EA-EA. Indicated by numeral 187 are D-phase salient rotor poles and by 188 are salient stator poles, a cross section of which taken along a line EM-EM shows the rotor and the stator having a relative phase difference of 216° in electrical angle with respect to those shown in the cross section taken along the line EA-EA. Indicated by numeral 189 are E-phase salient rotor poles and by 190 are salient stator poles, a cross section of which taken along a line EN-EN shows the rotor and the stator having a relative phase difference of 288° in electrical angle with respect to those shown in the cross section taken along the line EA-EA.

Indicated by 19A, 19B, 19C and 19D are windings arranged between the stator poles. The currents passing through these windings cause magnetomotive force to work on the polar portions of the individual salient poles to thereby generate rotating torque.

As shown in the enlarged transverse cross section at (a) of FIG. 15, the circumferential width of each salient pole can be selected. Theoretically, minimum widths SB1 and RB1 of the stator and rotor poles, respectively, for enabling continuous rotation is 120°. The theoretical minimum widths SB1 and RB1 of the stator and rotor poles, respectively, may range from 120° up to 240°. The value of an optimal pole width may vary depending on a desired motor specification because the output torque may vary depending on the magnetic impedance of a motor as a whole and the currents of the individual windings.

Figure 19:
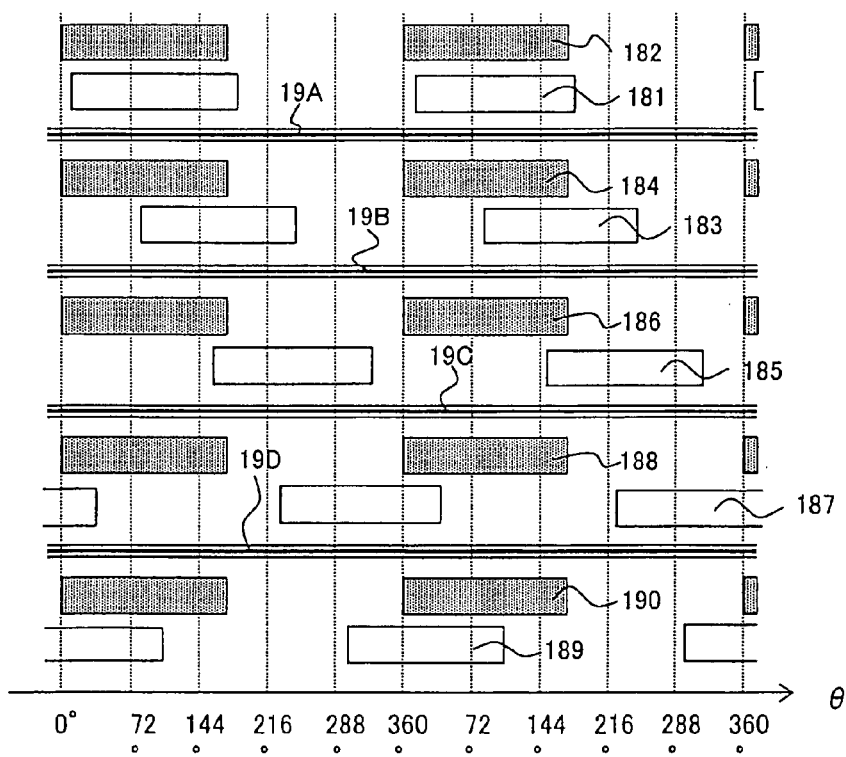
FIG. 19 illustrates a linear development of an inner peripheral surface configuration of the stator shown in FIG. 18 along the circumference with loop windings being arranged therein and with an outer peripheral surface configuration of the rotor linearly developed along the circumference being provided thereabove.

FIG. 19 is a linear development including a circumferential configuration of the salient stator poles in the vicinity of an air gap portion between the stator and the rotor of the motor shown in FIG. 18, and an adjacently illustrated linear development including a circumferential configuration of the salient rotor poles. For example, the configuration of the A-phase salient stator poles 182 shown in FIG. 19 is opposed to the adjacently illustrated configuration of the salient rotor poles 181. The horizontal axis of FIG. 19 indicates electrical angle. The salient stator and rotor poles of the individual phases are arranged in the order of A, B, C, D and E from the top of the paper plane of FIG. 19, with the loop windings 19A, 19B, 19C and 19D being arranged therebetween. When the rotor is rotated, the salient rotor poles 181, 183, 185, 187 and 189 move left and right in the paper plane.

In the state shown in FIG. 19, an explanation will now be given on a first method for the rotor to generate torque in a direction from right to left in the paper plane. In case an attraction force F185 between the salient stator poles 186 and the salient rotor poles 185 is utilized in the state shown in the figure, supplying currents to the windings 19B and 19C in opposite directions may allow the magnetic fluxes passing through the stator poles 186 to pass through the back yoke of the stator, to pass through other salient stator poles and salient rotor poles, to pass through the back yoke of the rotor and to return to the salient rotor poles 185. In this state, flux density between the salient stator poles 186 and the salient rotor poles 185 exhibits a highest value of those at other portions. As a result, for the motor as a whole, the rotor generates torque in a direction from right to left in the paper plane. Subsequently, an explanation will be given on a second method for generating torque in FIG. 19. In case an attraction force F183 between the salient stator poles 184 and the salient rotor poles 183 is utilized in the state shown in the figure, supplying currents to the windings 19A and 19B in opposite directions may allow the magnetic fluxes passing through the stator poles 184 to pass through the back yoke of the stator, to pass through other salient stator poles and salient rotor poles, to pass through the back yoke of the rotor and to return to the salient rotor poles 183. In this state as well, flux density between the salient stator poles 184 and the salient rotor poles 183 exhibits a highest value. As a result, for the motor as a whole, the rotor generates torque in a direction from right to left in the paper plane.

An explanation will now be given on a third method for generating torque in FIG. 19. In the state shown in the figure, methods can be taken for utilizing an attraction force between the salient stator and rotor poles 186 and 185 and an attraction force between the salient stator and rotor poles 184 and 183. Based on these methods, current values of the windings may be determined, so that the magnetic fluxes passing through the stator poles 186 may pass through the back yoke of the stator, pass through the salient stator and rotor poles 184 and 183, pass through the back yoke of the rotor, and return to the salient rotor poles 185. In this case, the torque generated by the fluxes passing through the salient stator and rotor poles 186 and 185 is directed to the same direction as that of the torque generated by the fluxes passing through the salient stator and rotor poles 184 and 183. This is effective because the fluxes making circuit will generate torque in the same direction at two points.

Also, in this case, when the area of the portion where the salient stator and rotor poles 184 and 183 face with each other through the air gap is TK183 and the flux passing therethrough is MF183, and when the area of the portion where the salient stator and rotor poles 186 and 185 face with each other through the air gap is TK185 and the flux passing therethrough is MF185, the area TK183 is larger than the area TK185 and the flux MF183 is larger than the flux MF185. Accordingly, a difference of the fluxes, which is MFD235≈IF183-MF185, is adapted to work passing through different salient stator poles 182, 188 and 190 and the back yoke of the rotor and returning to the salient rotor pole 183.

As a specific example for passing current at this time, current C19B may be supplied to the winding 19B and current C19A and current C19C, which are reverse of the current C19B may be supplied to the windings 19A and 19C, respectively. In a simple theory, the amplitude then of the currents C19A, C19B and C19C may preferably be such that the amplitude of the current C19B equals to a sum of the amplitude of the currents C19A and C19C. That is, an equation C19B=−C19A-C19C is established. For example, when the amplitude of the current C19A is equal to that of the current C19C, the amplitude of the current C19B will be twice as large as that of the current C19A.

The current values of the individual phases are not limited to these values, but the currents C19A, C19B and C19C may have some degree of freedom within the scope mentioned above. That is, each of the current values is determined depending on the magnetic resistance of the relevant polar portion and the magnetomotive force generated by the relevant current. Accordingly, the current value of each of the phases may be determined so that a large magnetomotive force will work on the poles which are desired to generate large torque.

In case a salient stator pole SJX and an opposed salient rotor pole TUX are in a positional relationship where an attractive force is produced in a direction which is opposite to the direction torque is desired to be generated, some degree of magnetic flux is also generated between the salient poles SIX and RIX to generate torque in the opposite direction. The torque finally generated by the motor equals to the difference between the torque in the direction it is desired to be generated and the torque in the opposite direction.

In the third method related to FIG. 19, as to the directions of the currents supplied to the loop windings 19A, 19B and 19C, currents may be alternately supplied in the opposite direction, the forward direction and the opposite, respectively. This method may enable control with one-way current for each of the windings, while the one-way current is in conformity with the explanation provided above for the motor shown in FIGS. 18 and 19. Thus this method may be convenient for current driving. In particular, the control unit may be simplified to realize a small and low-cost control unit. Methods for supplying currents will be provided later together with configuration examples of the control unit for motor and examples of the operation.

A fourth method for generating torque in FIG. 19 will now be explained. In the state shown in the figure, this method also utilizes an attraction forth F181 between the salient stator and rotor poles 182 and 181, in addition to the attraction force F185 between the salient stator and rotor poles 186 and 185 and the attraction force F183 between the salient stator and rotor poles 184 and 183.

An area of a portion where the salient stator poles 182 face the salient rotor poles 181 through the air gap is designated with a reference TK181, and magnetic fluxes passing therethrough are designated with a reference MF181. Since reluctance torque is generated irrespective of the directions of the magnetic fluxes that work on, there is a degree of freedom for selecting polarity of the fluxes MF181, MF183 and MF185. However, in the state of the rotational position shown in FIG. 19, if the flux direction of the fluxes MF181 and MF 183 are the same, the fluxes passing through the salient rotor poles 187 and 189 that generate negative torque will be increased. Accordingly, considering the paths of these fluxes, the uniformly directed fluxes may not be effective in terms of generation of desired torque, although not impossible. Thus, discussion made here, in the fourth method, is a way for directing the MF183 in the positive direction and for directing the fluxes MF181 and MF 185 in the negative direction. It should be appreciated that the balance of the fluxes resulting from the positive and negative values of these three fluxes may pass through different salient stator and rotor poles.

A specific example of the fourth method associated with FIG. 19 will be achieved by controlling phase currents in such a way that the difference of the fluxes, i.e. MFD235≈MF183-MF185, in the third method associated with FIG. 19 may return to the salient rotor poles 183 through the salient stator poles 182 and the back yoke of the rotor. This way of controlling may reduce the fluxes that pass through the salient stator poles 188 and 190 which generate torque in the opposite direction. Thus, torque generated by the motor as a whole is increased.

As a specific example of currents in this case, the current C19B may be supplied to the winding 19B, and the currents C19A and C19C, which are reverse of the current C19B, may be supplied to the windings 19A and 19C, respectively.

An absolute current value of the magnetomotive force desired to be applied to the salient rotor poles 181 and the salient stator poles 182 is now designated with HH12, an absolute current value of the magnetomotive force desired to be applied to the salient rotor poles 183 and the salient stator poles 184 is designated with HH34, and an absolute current value of the magnetomotive force desired to be applied to the salient rotor poles 185 and the salient stator poles 186 is designated with HH56. The currents are expressed as follows:

C19A=−HH12−HH34

C19B=HH34+HH56

C19C=−HH56

In FIG. 19, in case there is a different magnetic circuit MGC above the salient stator poles 182 in the paper plane, a current C19Z to be passed between the salient stator poles 182 and the magnetic circuit MGC is as follows:

C19Z=HH12

A relationship formed by these equations is that, in order to obtain a magnetomotive force which is desired to be applied between certain salient rotor poles and certain salient stator poles, currents of the same amplitude are passed in the opposite directions above and below, in the paper plane, of the salient rotor and stator poles in question. For example, since the absolute current value of the magnetomotive force desired to be applied to the salient rotor poles 183 and the salient stator poles 184 is HH34, currents −HH34 and +HH34 are supplied thereabove and therebelow in the paper plane. Also, since the absolute current value of the magnetomotive force desired to be applied to the salient rotor poles 185 and the salient stator poles 186 is HH56, currents −HH56 and +HH56 are supplied thereabove and therebelow in the paper plane. As a result, a current expressed by HH34+HH56, which is a combined value of these currents, is passed as the current C19B.

Considering the balance of the amounts of magnetic fluxes passing through the individual salient stator poles, the absolute current value HH12 may better be set relatively smaller than other absolute current values. In this way, the fluxes passing through the salient stator poles 188 and 190, which generate oppositely directed torque, may be reduced, so that the torque of the motor as a whole may be increased.

In the fourth method associated with FIG. 19, the directions of the current supplied to the loop windings 19A, 19B and 19 may alternately be reverse, forward and reverse. This method may enable control with one-way current for each of the windings, while the one-way current is in conformity with the explanation provided above for the motor shown in FIGS. 18 and 19. Thus, this method may be convenient for current driving. In particular, the control unit may be simplified to realize a small and low-cost control unit. Methods for supplying currents will be provided later together with configuration examples of the control unit for motor and examples of the operation.

Hereinafter will be explained a fifth method for generating torque in FIG. 19. In the state shown in the figure, the attraction force F 181 between the salient stator and rotor poles 182 and 181 is utilized in addition to the attraction force F 185 between the salient stator and rotor poles 186 and 185 and the attraction force F183 between the salient stator and rotor poles 184 and 183. This is the same as in the fourth method. In the fifth method however, the direction of the magnetic fluxes of the salient stator poles 182 is reversed. Owing to this, balance between the positive-direction fluxes and the negative-direction fluxes may be improved to increase the total torque of the motor. However, as far as the current control is concerned, the control unit may become a little complicated to increase the cost, because, as will be described later, both of the positive and negative currents are required to be controlled per single winding.

An area of the portion where the salient stator and rotor poles 182 and 181 face with each other through an air gap is designated with a reference TK181, and magnetic fluxes passing therethrough is designated with a reference MF181. Since reluctance torque is generated irrespective of the directions of the magnetic fluxes that work on, there is a degree of freedom for selecting polarity of the fluxes MF181, MF183 and MF185. Thus, discussion made here, in the fifth method, is a way for directing the fluxes MF183 and MF185 in the positive direction and for directing the MF181 in the negative direction. It should be appreciated that the balance of the fluxes resulting from the positive and negative values of these three fluxes may pass through different salient stator and rotor poles.

Phase currents are controlled in such a way that the fluxes MF183 and MF185 passing through the salient stator poles 184 and 186 according to a fifth method in FIG. 19 may return to the salient rotor poles 183 through the salient stator poles 182 and the back yoke of the rotor. This way of controlling may much more reduce the fluxes that pass through the salient stator poles 188 and 190, which generate torque in the opposite direction, than in the fourth method. Thus, torque generated by the motor as a whole is increased.

As a specific example of currents in this case, a current C19AA may be supplied to the winding 19A, and a current C19CC, which is reverse of the current CI9AA, may be supplied to the winding 19C. The winding 19B may not be supplied with current. An absolute current value of the magnetomotive force desired to be applied to the salient rotor poles 181 and the salient stator poles 182 is now designated with HHH12, an absolute current value of the magnetomotive force desired to be applied to the salient rotor poles 183 and the salient stator poles 184 is designated with HHH34, and an absolute current value of the magnetomotive force desired to be applied to the salient rotor poles 185 and the salient stator poles 186 is designated with HHH56. The currents are expressed as follows:

C19AA=HHI112+HHH56

C19B=0

C19C=−HHH56

In FIG. 19, in case there is other magnetic circuit MGC above the salient stator poles 182 in the paper plane, a current C19ZZ to be passed between the salient stator poles 182 and the magnetic circuit MGC is as follows:

C19ZZ=−HHH12

Considering the balance of the amounts of magnetic fluxes passing through the individual salient stator poles, the absolute current value HHH12 may better be set relatively smaller than other absolute current values. In this way, the fluxes passing through the salient stator poles 188 and 190, which generate oppositely directed torque, may be reduced, so that the torque of the motor as a whole may be increased.

In the fifth method associated with FIG. 19, the directions of the currents supplied to the loop windings 19A, 19B and 19C are varied in positive and negative directions as the rotor rotates, raising the necessity of passing bipolar current. Thus, some schemes may be required comparing with the fourth method. Methods for supplying currents will be provided later together with configuration examples of the control unit for motor and examples of the operation.

As another method for driving the motor shown in FIG. 18, control may be effected by switching the first, second, third and fourth methods depending on the rotational positions of the rotor. This method may be more effective.

When current can be supplied with complete control of the positive and negative values for the current directions of the windings 19A, 19B and 19C, control may be effected by switching the first, second, third, fourth and fifth methods depending on the rotational positions of the rotor. This method may be more effective.

In the motor shown in FIGS. 18 and 19, which utilizes five-phase reluctance torque, the salient stator poles and the salient stator poles of each phase are opposed to each other, and five sets of a plurality of magnetic resistance portions are circumferentially arranged for five phases. In this case, each resistance varies with the rotation of the rotor and generation of torque is binarized in positive and negative directions. Four windings are arranged in the rotor shaft direction between the five sets salient stator poles. The motor shown in FIGS. 18 and 19 is a passive element and has a mechanism of generating torque by varying with the rotational position and by giving electromagnetic effects in association with the polarized magnetic resistance portions mentioned above and the four sets of currents. Thus, the motor can be driven in several ways. Simply, however, four current values for the four windings only have to be determined at certain rotational positions of the rotor. Determination of the four current values for the four windings at each of the rotational positions of the rotor, may enable rotation of this motor that utilizes the five-phase reluctance torque, throughout the circumference. In each of the first to fifth methods for generating torque, a typical example has been presented. In each of such examples, a slight change of the four current values may mostly enable generation of torque, which are also be intended as being included in the present invention.

In the reluctance motor of the present invention, the circumferential pole width of each salient pole may be freely increased and decreased centering 180° in electrical angle, or can be selected according to the performance required for the motor. The circumferential pole widths of the individual salient poles are not required to be the same. For example, in a design intended to reduce copper loss, each of the salient poles of the phases driven with the currents of two windings may be configured to have a small circumferential pole width, while, contrarily, each of the salient poles of the phases driven with the current of a single winding may be configured to have a large circumferential pole width. A possible driving region for each phase with the generation of torque may mostly overlap with a region where the adjacent phase can generate torque. Thus, two or more phases can simultaneously generate unidirectional torque to realize parallel driving with two or more phases. These are also the points different from the conventional switched reluctance motor shown in FIG. 87.

The phases of odd numbers having large primes, such as "5", "7" and "11", may have a high probability, as a motor in its entirety, of canceling harmonic components of each phase to realize a motor having small torque ripple. For example, a three-phase motor is likely to produce 60°-cycle harmonic components. A six-phase motor is also likely to produce lots of harmonic components, although the degree is lower. A four-phase motor having a prime "2" is likely to produce a large number of harmonic components, thus requiring some scheme for reducing harmonic components when it is designed. In this regard, a five-phase motor has a high probability of canceling lower-order harmonic components, and thus reduces resonant oscillation due to natural frequency of motor parts, whereby vibration of the motor can be reduced. As a result, a high-quality motor of low noise and low vibration can be realized. Unlike the motors used in automated or unattended industrial machinery or production line, for motors which are used in a location close to man's acoustic or tactile sense, quietness is a very important feature.

Figure 20:
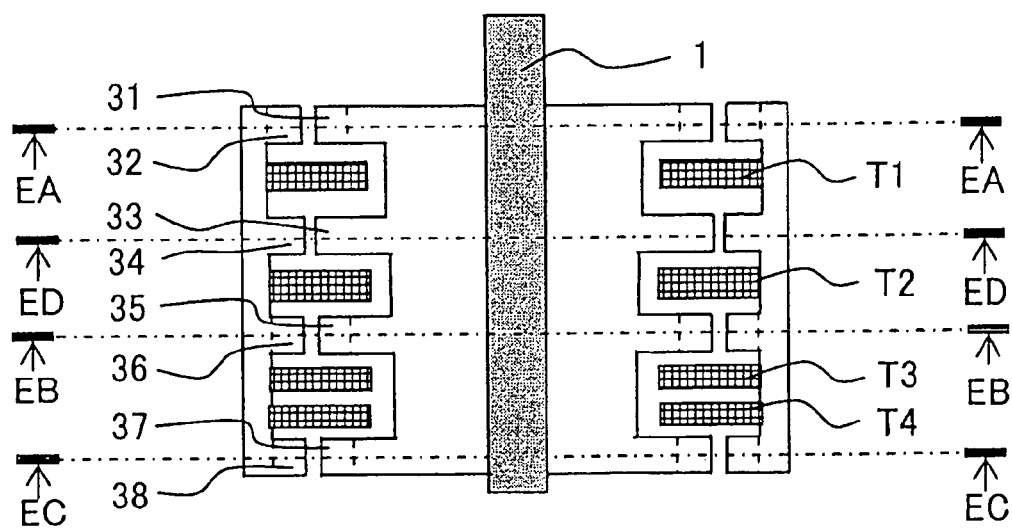
FIG. 20 illustrates schematic vertical cross sections of a three-phase motor having loop windings.
Figure 20:
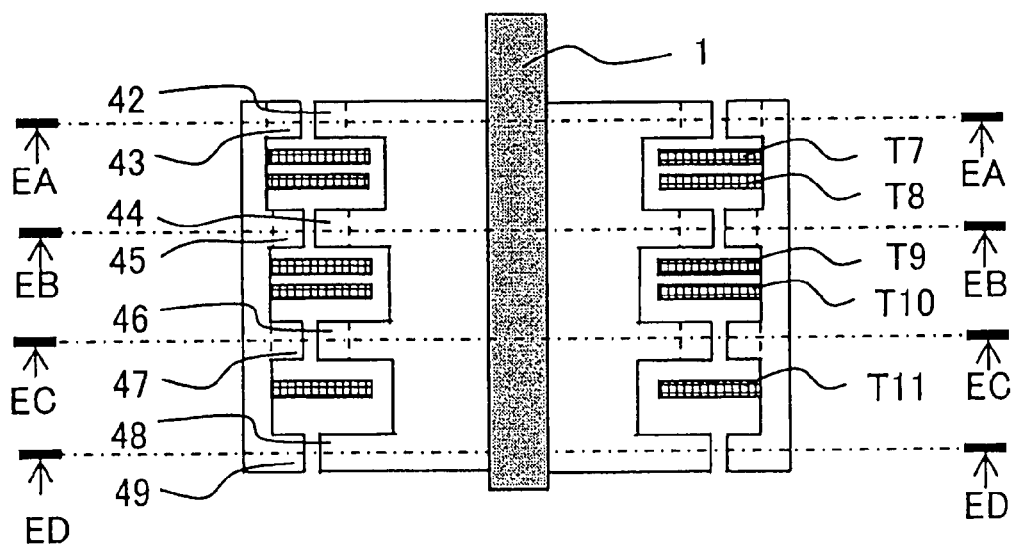

FIG. 20 shows by (a) a three-phase reluctance motor according to another embodiment of the present invention. The configuration of magnetic paths of this motor is completely the same as that of the motor shown by (a) of FIG. 12, but the winding configuration is different. Indicated by numeral 31 are A-phase salient rotor poles, by 32 are A-phase salient stator poles and by T1 is an A-phase winding. Indicated by numeral 33 is a magnetic path of the rotor for passing fluxes and by 34 is a magnetic path of the stator for passing fluxes. Indicated by numeral 35 are B-phase salient rotor poles and by 36 are B-phase salient stator poles. Indicated by numeral 37 are C-phase salient rotor poles and by 38 are C-phase salient stator poles. Indicated by T2 and T3 are substantially looped windings having turns reverse from each other and connected in series. Thus, when currents are passed through the windings T2 and T3, the B-phase salient rotor and stator poles 35 and 36 can be excited. Indicated by T4 is a C-phase winding. Sequential driving of the phases in the order of A, B and C according to the rotational positions of the rotor in this configuration may enable continuous generation of torque.

FIG. 20 shows by (b) a three-phase reluctance motor according to another embodiment of the present invention. The configuration of the magnetic paths of this motor is completely the same as the one shown by (b) of FIG. 12, or the configuration is a modification of the motor shown by (a) of FIG. 20. Indicated by numeral 42 are A-phase salient rotor poles, by 43 are A-phase salient stator poles, by 44 are B-phase salient rotor poles, by 45 are B-phase salient stator poles, by 46 are C-phase salient rotor poles, by 47 are C-phase salient stator poles, by 48 is a magnetic path of the rotor for passing fluxes, and by 49 is a magnetic path of the stator for passing fluxes. Indicated by T7 is an A-phase winding. Indicated by T8 and T9 are substantially looped windings having turns reverse from each other and connected in series. Thus, when currents are passed through the windings T8 and T9, the B-phase salient rotor and stator poles 44 and 45 can be excited. Indicated by T10 and T11 are substantially looped windings having turns reverse from each other and connected in series. Thus, when currents are passed through the windings T10 and T11, the C-phase salient rotor and stator poles 48 and 49 can be excited. Sequential driving of the phases in the order of A, B and C according to the rotational positions of the rotor in this configuration may enable continuous generation of torque.

The concept of the motor configurations shown by (a) and (b) of FIG. 20 is easily understandable because the torque generation operation with the excitation of the salient rotor and stator poles of each phase can be achieved by only supplying current to the single windings. As will be described later, these configurations may also simplify the drive circuit.

However, since the windings in a single slot are dividedly used, some windings may have large resistance. This is a little disadvantageous aspect as far as the motor efficiency is concerned.

Figure 21:
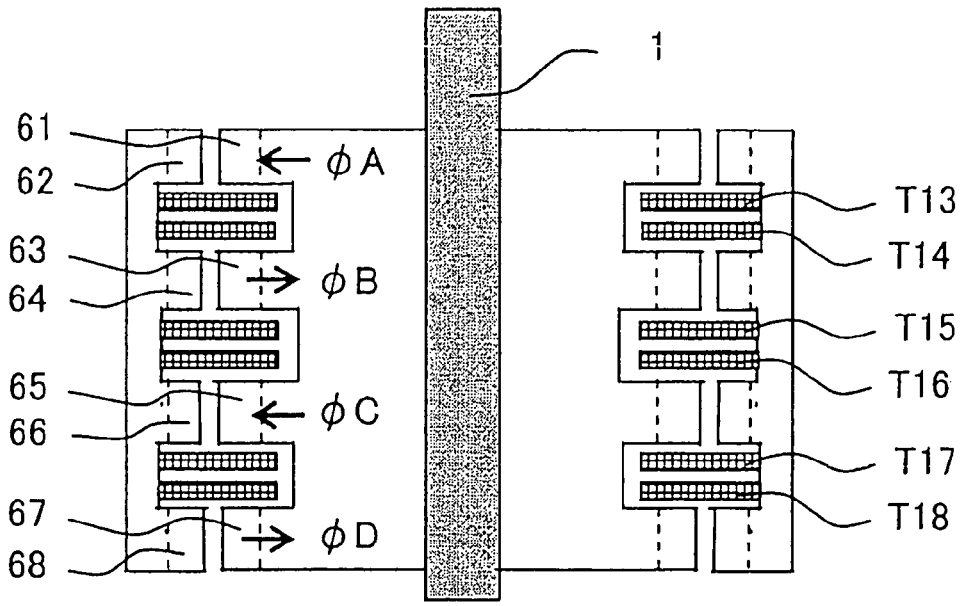
FIG. 21 is a schematic vertical cross section illustrating a four-phase motor having loop windings.

FIG. 21 shows another example of a four-phase motor of the present invention. This motor has been obtained by modifying the windings of the four-phase motor shown in FIG. 16. The salient stator poles 61, 63, 65 and 67 and the salient rotor poles 62, 64, 66 and 68 of the phases A, B, C and D are configured in the same fashion as the motor shown in FIG. 16. Indicated by T13 is a winding for exciting the A-phase salient rotor and stator poles 61 and 62. Indicated by T14 and T15 are windings having relatively reversed turns and connected in series. Current supply to these windings can excite the B-phase salient rotor and stator poles 63 and 64. Indicated by T16 and T17 are windings having relatively reversed turns and connected in series. Current supply to these windings can excite the C—phase salient rotor and stator poles 65 and 66. Indicated by T18 is a winding for exciting the D-phase salient rotor and stator poles 67 and 68.

In the motor shown in FIG. 21 configured in this way, the salient rotor and stator poles of each phase and the windings for exciting these poles are fixedly provided. When a set of the salient rotor and stator poles is to be solely excited, current may have to be supplied to only one winding. Thus, the concept of this configuration is easily understandable.

When the motor shown in FIG. 21 is sequentially driven one by one according to the rotational positions of the rotor, the order of arranging the phases in the rotor shaft direction is not limited. For example, even when the relative phases of the salient rotor and stator poles are in the order of A, B, C and D, the phases may be arranged in the order of A, D, B and C from the top in the paper plane of FIG. 21. In this arrangement, if only the current is supplied in the order of A, B, C and D synchronizing with the rotational positions of the rotor, the continuous torque output may be achieved. The directions of currents and the directions of fluxes of the individual stator poles may also not be limited, but may be directed to any directions.

In case where two sets of salient rotor and stator poles are excited using the motor shown in FIG. 21 to have both of the phases generated torque in the same direction, the directions of the fluxes of the salient stator poles may exert a great effect. When the relative phases of the salient rotor poles and the salient stator poles are in the order of A, B, C and D, combinations of two phases for generating unidirectional torque are A and B, B and C, C and D, and D and A. Thus, the directions of the fluxes may only have to be alternately directed in the positive and negative directions as shown in FIG. 21 in the order of the relative phases. According to this rule, the directions of currents in the individual windings are also necessarily determined. Further, in the example shown in FIG. 21, the phases are sequentially arranged in the rotor shaft direction from the top in the paper plane, but other arrangement may also constitute the motor.

In the method of sequentially driving two sets of phases using the motor shown in FIG. 21, some regions in the two sets of phases may not be able to generate torque. This simply means that torque ripple may be caused. However, by taking a measure of correcting current amplitude, for example, the torque ripple may be reduced. The drive algorithm in the motor shown in FIG. 21 is simple. However, as far as the motor efficiency is concerned, the motor shown in FIG. 16 is better, because the winding resistance may be made smaller in the motor shown in FIG. 16.

The configuration and methods associated with the motor shown in FIG. 21 may enable various applications and may be modified variously. For example, the scheme of the motor of FIG. 21 may be applied to the motor of FIG. 15, or other motors. The scheme may also be applied to a multiphase motor having five or more phases, such as the motor shown in FIG. 18.

Figure 22:
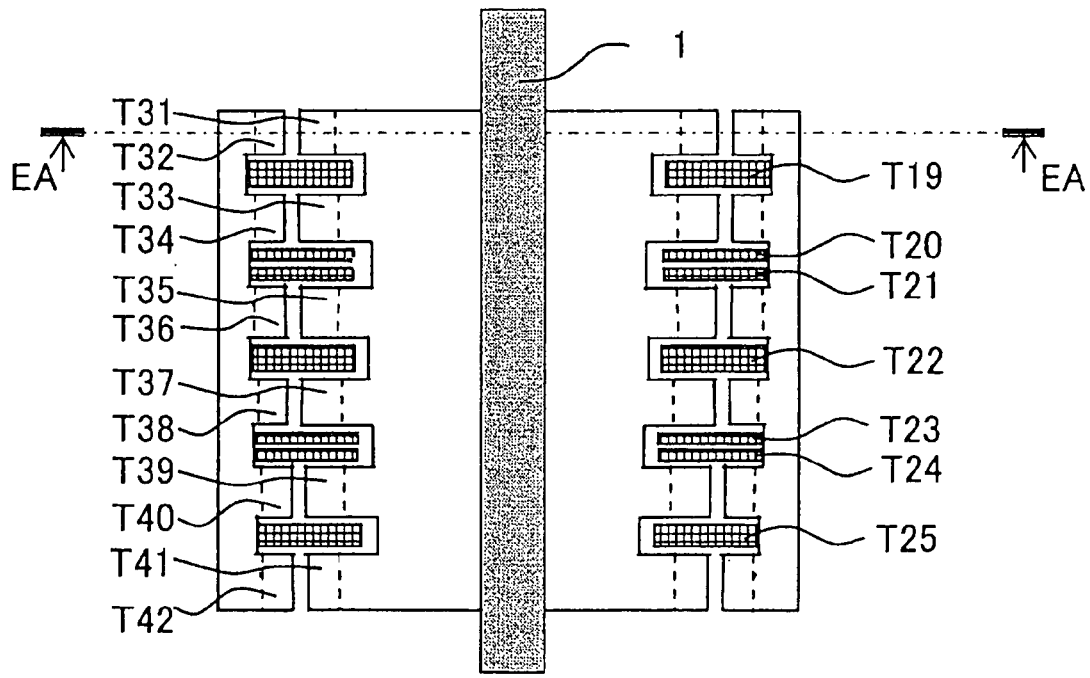
FIG. 22 is a schematic vertical cross section illustrating a six-phase motor having loop windings.
Figure 23:
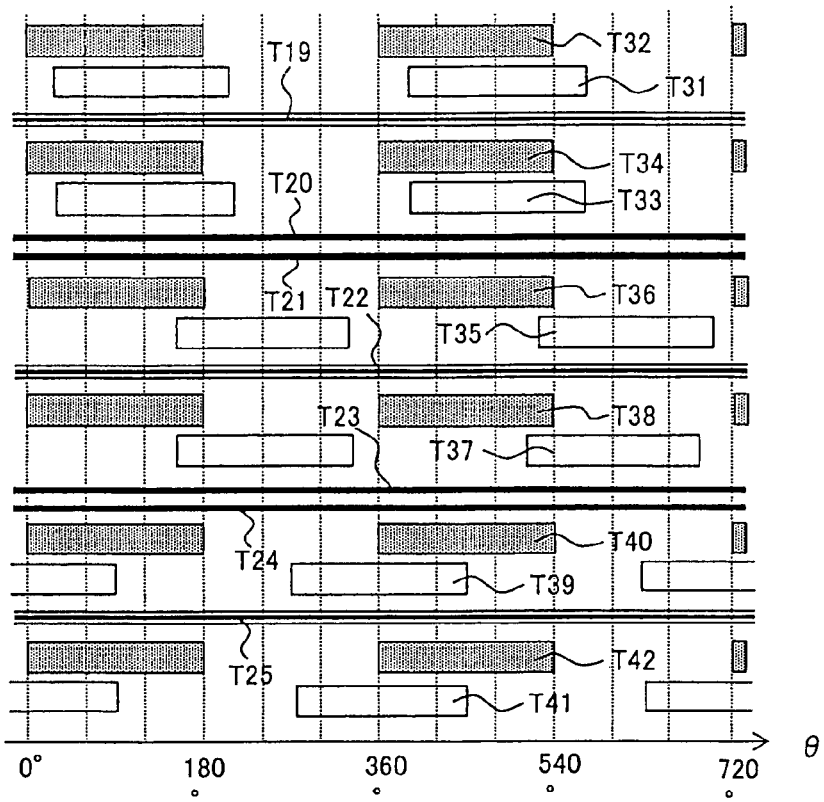
FIG. 23 illustrates a linear development of an inner peripheral surface configuration of the stator shown in FIG. 23 along the circumference with loop windings being arranged therein and with an outer peripheral surface configuration of the rotor linearly developed along the circumference being provided thereunder.

FIGS. 22 and 23 show another example of the motor of the present invention. FIG. 23 is a linear development of the motor shown in FIG. 22, including the configuration of the salient rotor and stator poles and the windings along the circumference. The horizontal axis indicates electrical angle. Salient stator poles T32, T34, T36, T38, T40 and T42 are circumferentially arranged with the same angular positioning. First-phase salient rotor poles T31 and second-phase salient rotor poles T33 are arranged to have the same phase. A winding T19 is serially connected to a winding T20 having a half number of turns of the winding T19 with the direction of the turns being reversed. Thus, when currents are supplied to the windings T19 and T20, the fluxes formed from the first phase to the second phase through the back yoke are excited. In this case, no electromagnetic effect is exerted to other phases. A cross section taken along a line EA-EA of FIG. 22 has a configuration as shown by (a) of FIG. 9.

Third-phase salient rotor poles T35 and fourth-phase salient rotor poles T37 are arranged to have the same phase, with a phase difference of 120° in electrical angle from the first-phase rotor poles T31. A winding T22 is serially connected to a winding T21 having a half number of turns of the winding T22 with the direction of the turns being reversed. The winding T21 is also serially connected to winding T23. Thus, when currents are supplied to the windings T22, T21 and T23, the fluxes formed from the third phase to the fourth phase through the back yoke are excited. In this case, no electromagnetic effect is exerted to other phases.

Fifth-phase salient rotor poles T39 and sixth-phase salient rotor poles T41 are arranged to have the same phase, with a phase difference of 240° in electrical angle from the first-phase rotor poles T31. A winding T25 is serially connected to a winding T24 having a half number of turns of the winding T25 with the direction of the turns being reversed. Thus, when currents are supplied to the windings T25 and T24, the fluxes formed from the fifth phase to the sixth phase through the back yoke are excited. In this case, no electromagnetic effect is exerted to other phases.

Motors of this configuration may continuously output torque with the supply of currents in the order of first, second, third, fourth, fifth and sixth phases in synchronization with the rotational positions of the motor. Types of currents are three, which number is small and thus takes on the characteristics of simplifying the drive circuits of currents. In this case, the relative directions of the three types of currents and the directions of the fluxes of the three sets of stator poles in the motor are not limited, but may be directed to any directions.

With the above method for supplying currents using the motor shown in FIGS. 22 and 23 as a first method, hereinafter will be explained a second method for connecting windings and supplying currents in different ways. Specifically, currents are unidirectionally supplied to the windings T20 and T21. Also, the windings are combined into a single winding T45 to reduce winding resistance, and a current, which is a sum of the currents to be passed through the windings T20 and T21, is passed therethrough. Thus, comparing with the first method, copper loss of the winding T45 corresponding to the copper loss of the windings T20 and T21 can be reduced to ⅔. Similar configuration may be imparted to the windings T23 and T24 to obtain a winding T46 having copper loss reduced to ⅔. However, the types of currents have to be increased to five, and thus the drive circuits are increased. It should be appreciated that, in this case, the directions of the turns of the windings T19, T22 and T25 and the directions of the currents are the same.

Hereinafter will be explained a third method for connecting windings and supplying currents in different ways in association with the motor shown in FIGS. 22 and 23. In particular, the directions of currents supplied to the windings 119 and T22 are reversed so that the currents passing through the windings T20 and T21 are reversed. The windings T20 and T21 are combined into a single winding T47, and a current, which is a sum of the currents to be supplied to the windings T20 and T21, is passed therethrough. In this configuration, during a period when the currents of the windings T20 and T21 are to be simultaneously passed, both of these currents are cancelled and zeroed because these currents are reversely directed. As a result, copper loss of the winding T47 is reduced. Thus, comparing with the first method, copper loss of the winding T45 corresponding to the copper loss of the windings T20 and T21 can be reduced to 1/1.732. Similar configuration may be imparted to the windings T23 and T24 to obtain a winding T48 having copper loss reduced to 1/1.732. However, the types of currents have to be increased to five, and coupled with the necessity of passing positive and negative currents to the windings T47 and T48, respectively, the drive circuits are increased. It should be appreciated that, in this case, the directions of the turns of the windings T19, T22 and T25 and the directions of the currents are alternated as positive, negative and positive.

Figure 24:
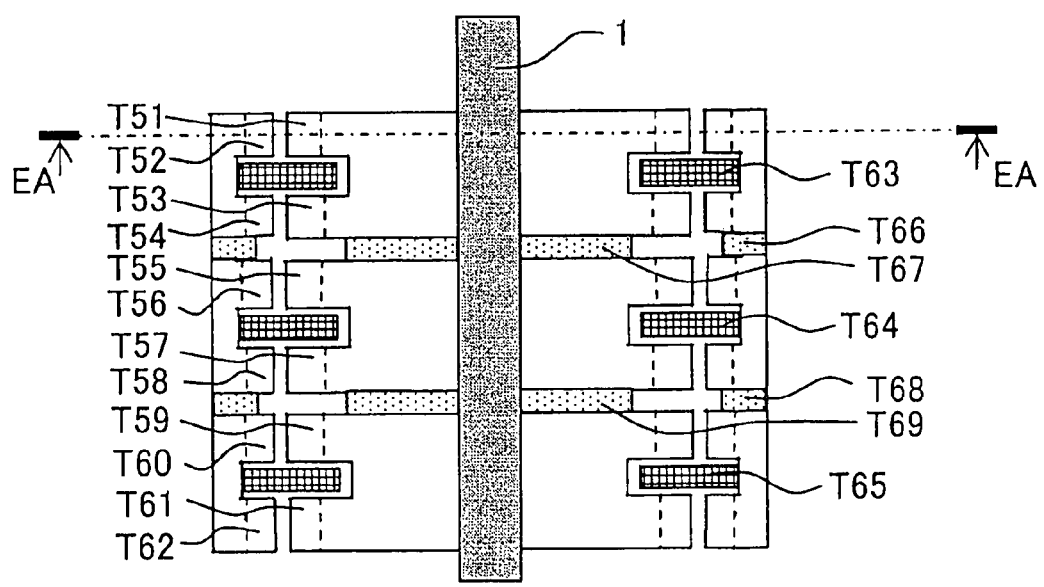
FIG. 24 is a schematic vertical cross section illustrating a six-phase motor having loop windings.

FIG. 24 shows an example of a three-phase motor of the present invention. This motor has three sets of the single-phase motor shown in FIG. 4, which are arranged in the rotor shaft direction to provide three phases. In this motor, the relative phase difference of the salient rotor and stator poles between the phases A, B and C is adapted to be 120° in electrical angle. A-phase salient rotor poles T51 and the salient rotor poles T53 are arranged to have the same rotational positions, while salient stator poles T52 and salient stator poles T54, which are opposed to the salient rotor poles T51 and T53, are arranged to have the same rotational positions. When current is passed through winding T63, these magnetic circuits can be excited. B-phase salient rotor poles T55 and the salient rotor poles T57 are arranged to have the same rotational positions, while salient stator poles T56 and salient stator poles T58, which are opposed to the salient rotor poles T55 and T57, are arranged to have the same rotational positions. When current is passed through winding T64, these magnetic circuits can be excited. C-phase salient rotor poles T59 and the salient rotor poles T61 are arranged to have the same rotational positions, while salient stator poles T60 and salient stator poles T62, which are opposed to the salient rotor poles T59 and T61, are arranged to have the same rotational positions. When current is passed through winding T65, these magnetic circuits can be excited. Between the phases A, B and C, there are arranged spaces or intermediate members T66 and T68 as well as rotor-side intermediate members T67 and T69 made of a material having large magnetic resistance. A cross section taken along a line EA-EA of FIG. 24 has a configuration as shown by (a) of FIG. 9. Cross sections of the phases B and C have the configurations shown by (b) and (c) of FIG. 9, respectively. A linear development of the circumferential configuration of the salient rotor and stator poles of the motor shown in FIG. 24 corresponds to the relationship between the salient rotor and stator poles shown in FIG. 23.

Figure 25:
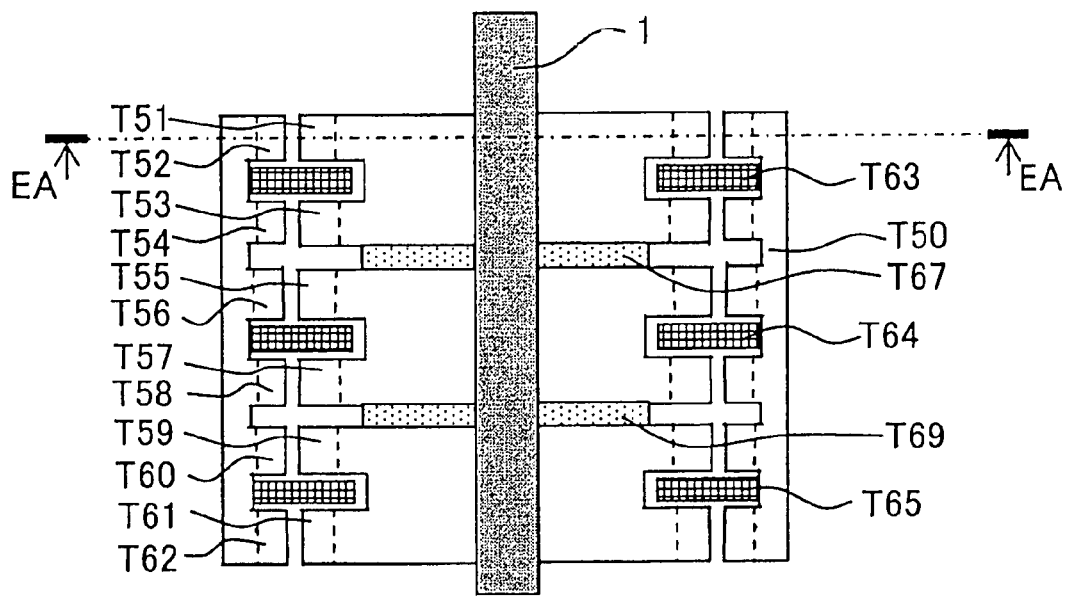
FIG. 25 is a schematic vertical cross section illustrating a six-phase motor having loop windings.

In the operation of the motor shown in FIG. 24, continuous torque can be obtained by sequentially supplying currents to the A-phase winding T63, the B-phase winding T64 and the C-phase winding T65 in synchronization with the rotation of the rotor. Since the intermediate members T66 and T68 as well as the rotor-side intermediate members T67 and T69 having large magnetic resistance are arranged between the phases, the electromagnetic interference between the phases is small and thus clean movement can be realized. However, since the intermediate members T66, T68, T67 and T69 are required, there may be some disadvantages in tem.'s of the size and the cost FIG. 25 shows a motor having a configuration, in which the intermediate members T66 and T68 of the motor shown in FIG. 24 are removed, and the back yoke portions of the stator of the individual phases are linked using the same soft magnetic material. In the motor of this configuration as well, the arrangement of the rotor-side intermediate members T67 and T69 can make small the magnetic interference between the phases, and thus the same operation as the motor shown in FIG. 24 can be achieved. In case the rotor-side intermediate members T67 and T69 are removed from the motor shown in FIG. 24 without removing the intermediate members T66 and T68 the, the same operation as in the motor shown in FIG. 25 can also be achieved.

Let us discuss now the feasibility of reducing the winding resistance in the motor of the present invention, by not only permitting each stator winding to locate inside the stator, but also by permitting a portion of each stator winding to project to the rotor side utilizing the rotor-side space. In the reluctance motor of the present invention, each magnetic circuit is made up of a soft magnetic material portion having small magnetic resistance and a material portion having low relative permeability or a space. Accordingly, a space is required between the rotor-side salient poles of each phase, for limiting the direction of the magnetic fluxes. This rotor-side space in particular is utilized to locate each stator winding.

In each of the motors shown in FIGS. 1 and 5, the winding 5 is arranged at the outer-diameter side where the salient stator poles 4 and 7 are provided, without being permitted to project toward the rotor 2. On the other hand, in each of the motors shown in FIGS. 2, 4, 6, 8, 10, 12 and 13, each winding is permitted to project toward the rotor side to arrange the winding also utilizing the rotor space. This configuration can ensure a large winding space, so that the diameter of each winding can be increased for the reduction of winding resistance. As a result, copper loss can be reduced and motor efficiency can be improved. As a matter of course, owing to the improvement in the motor efficiency, the size and the cost can be reduced.

Figure 28:
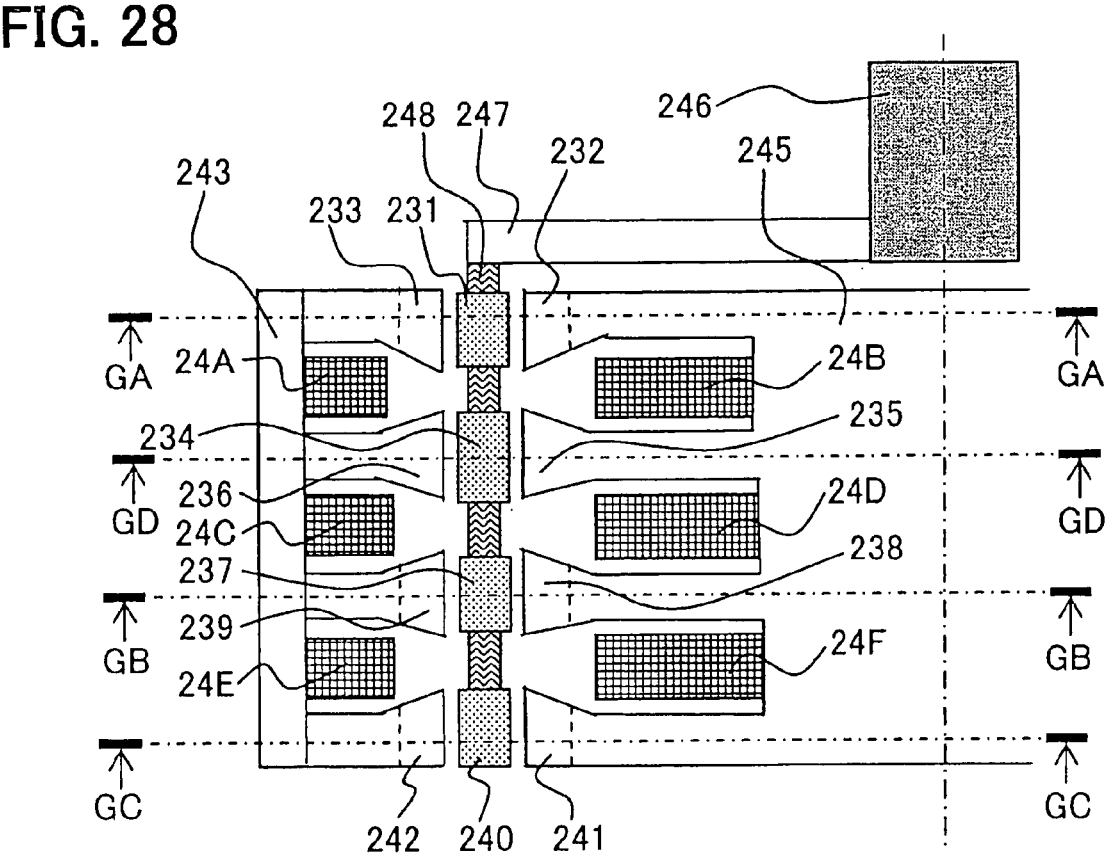
FIG. 28 is a schematic vertical cross section illustrating a three-phase motor provided with torque generating portions both at inner- and outer-diameter sides thereof.
Figure 29:
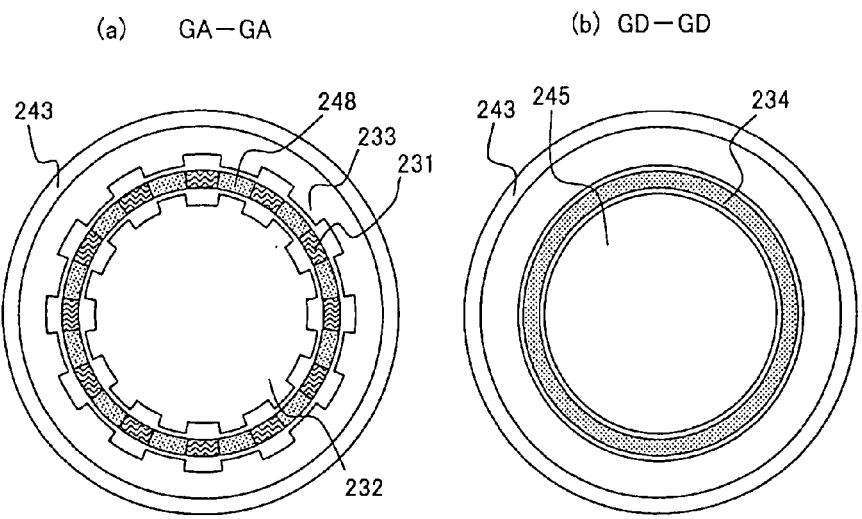
FIG. 29 illustrates schematic transverse cross sections of the stator shown in FIG. 28.

FIG. 28 shows another example of the present invention. Indicated by numeral 246 is a rotor shaft, by 247 is a fixation plate, and by 248 is a nonmagnetic cylindrical member for holding the magnetic poles of the individual phases. Bearing is omitted from the illustration. Stators are arranged at the inner- and the outer-diameter sides with a rotor being arranged at an intermediate portion between the two stators. Indicated by numerals 232 and 233 are A-phase salient stator poles and by 231 are A-phase salient rotor poles. A cross section taken along a line GA-GA of the figure has a configuration as shown by (a) of FIG. 29. Indicated by numerals 238 and 239 are B-phase salient stator poles and by 237 are B-phase salient rotor poles. A cross section taken along a line GB-GB of the figure has a configuration which is relatively different, by 120° in electrical angle, from a positional relationship between the rotor and the stator in the rotation direction shown in the GA-GA cross section. Indicated by numerals 241 and 242 are C-phase salient stator poles and by 240 are C-phase salient rotor poles. A cross section taken along a line GC-GC of the figure has a configuration which is relatively different, by 240° in electrical angle, from a positional relationship between the rotor and the stator in the rotation direction shown in the GA-GA cross section. Indicated by numerals 235 and 236 are stator magnetic paths shared between the individual phases, for passing magnetic fluxes, and by 234 is a rotor magnetic path for passing magnetic fluxes. A cross section taken along a line GD-GD of the figure has a configuration as shown by (b) of FIG. 29. Indicated by 24A and 24B are windings of the same phase, by 24C and 24D are windings of the same phase, and by 24E and 24F are windings of the same phase.

This example can perform driving with the windings on one side, but two windings are arranged in a single phase, i.e. the windings are arranged on both sides utilizing the spaces of both of the stators. In particular, when the outer-peripheral-side stator windings 24A and 24B are omitted, the outer-peripheral-side stator may constitute a magnetic path of a simple configuration, and may also serve as a motor case.

The basic electromagnetic effects of the motor shown in FIG. 28 are almost the same as those of the motor shown by (a) of FIG. 12. The most different point from the motor shown in FIG. 12, from an aspect of performance, is that the electromagnetically maximum limited torque that can be generated is larger by a factor of two in a simple theory than the motor shown in FIG. 12. This is because each phase has torque generating portions both at the inner- and the outer-diameter sides of the salient rotor poles.

By providing the salient poles 234, 235 and 236 of the motor shown in FIG. 28 with the same configuration as the salient poles 237, 238 and 239, respectively, a four-phase motor can be configured, in which the technique shown in FIG. 28 is applied to the motor shown in FIG. 16. In this case as well, maximum limited torque that can be generated by each phase is larger by a factor of two in a simple theory than the motor shown in FIG. 16. This is because each phase has two torque generating portions at the inner- and the outer-diameter sides of the rotor. Thus, the motor technique of FIG. 28 can be applied to other motors of the present invention, whereby a motor having large maximum limited torque can be realized. Various modifications can be made in the motors shown in FIGS. 28 and 30 by, for example, reversing the relationship between the rotor and the stator, or by changing the method for supporting the rotor.

Figure 30:
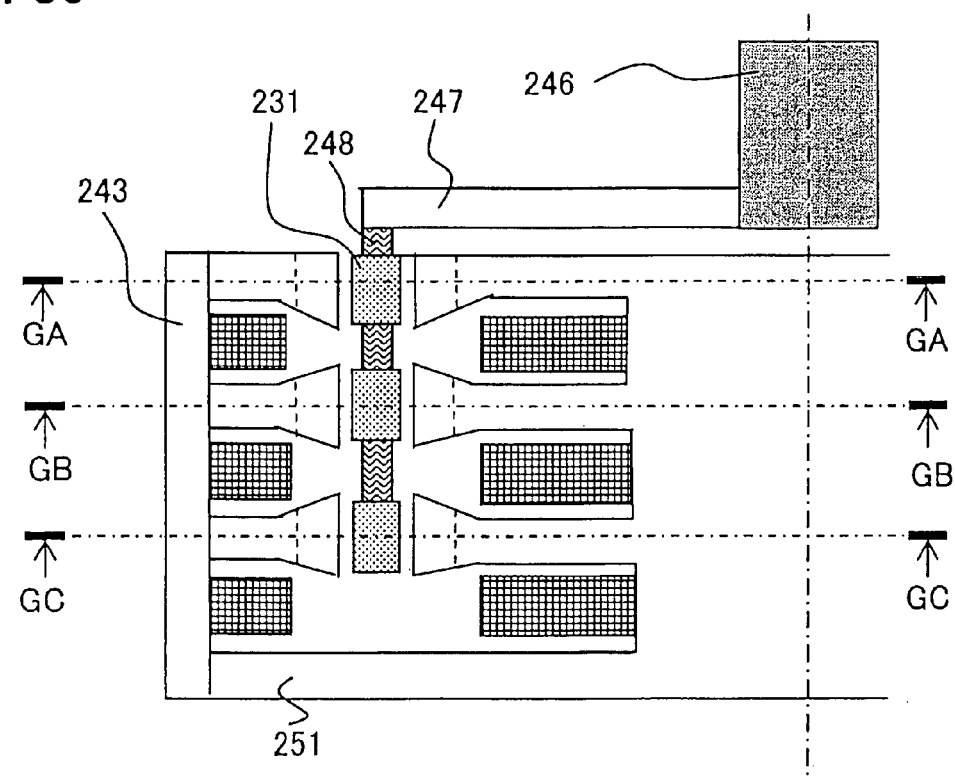
FIG. 30 is a schematic vertical cross section illustrating a three-phase motor provided with torque generating portions both at inner- and outer-diameter sides thereof.

A motor shown in FIG. 30 has a configuration where the magnetic paths of the stator and the rotor, which paths are shared between the individual phases, for passing magnetic fluxes of the salient poles 234, 235 and 236, are shifted to an end in the rotor shaft direction, as in the case of the modification of the motor shown by (a) of FIG. 12 into the motor shown by (b) of FIG. 12. The air gaps of the magnetic paths of FIG. 28, which paths are shared between the individual phases, for passing the fluxes of the salient poles 234, 235 and 236 are eliminated here, and thus magnetic resistance can be reduced, thereby increasing torque. Also, the stators are simplified, so that a portion indicated by numeral 251 can serve both as a magnetic path and as a motor case to thereby also simplify the motor configuration. Similar to the motor shown in FIG. 28, either the outer- or the inner-diameter side windings may be omitted to simplify the stator configurations.

Figure 32:
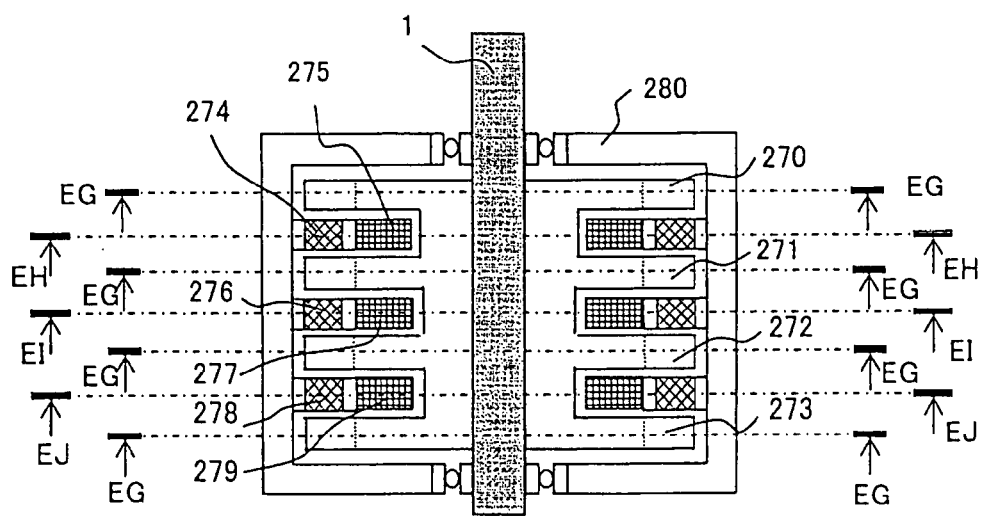
FIG. 32 is a schematic vertical cross section illustrating a motor, in which windings and poles of the stator are located inside the rotor rather than at the outer periphery thereof.
Figure 33:
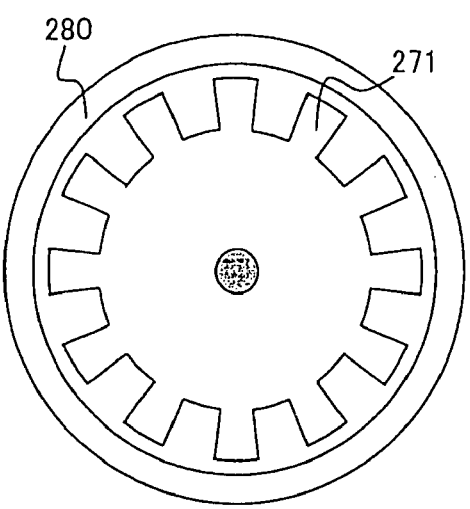
FIG. 33 illustrates schematic transverse cross sections of the stator shown in FIG. 32.
Figure 33:
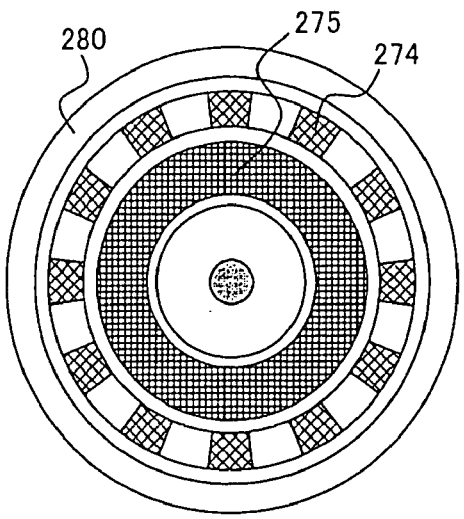

FIG. 32 shows a three-phase motor according to another embodiment of the present invention. The magnetic fluxes that give effect to torque of the motor pass along the rotor shaft. This is a different point from the motors described above. Indicated by numerals 270, 271, 272 and 273 are salient rotor poles. A cross section of each of the phases taken along a line EG-EG has a structure as shown by (a) of FIG. 33, where soft magnetic portions and spaces are alternately arrange along the circumference. The salient rotor poles 270, 271, 272 and 273 made of a soft magnetic material are all arranged at the same circumferential positions. Indicated by numeral 274 are A-phase salient stator poles, by 276 are B-phase salient stator poles and by 278 are C-phase salient stator poles. The salient stator poles are structured so that soft magnetic portions and spaces are alternately arranged along the circumference as shown by (b) of FIG. 33. The circumferential positions of the salient stator poles 274, 276 and 278 made of a soft magnetic material are permitted to have a phase difference of 120° in electrical angle. Indicated by numeral 275 is an A-phase loop winding, by 277 is a B-phase loop winding and by 279 is a C-phase loop winding. Indicated by numeral 280 is a motor case which is preferably made of a nonmagnetic material in terms of the electromagnetic operation.

In the operation of the motor shown in FIG. 32, A-, B- and C-phase currents are sequentially supplied at every width corresponding to 120° in electrical angle in synchronization with the rotational position of the rotor, so that torque can be continuously outputted. Since the motor shown in FIG. 32 enables independent operation of each of the phases, the torque generation mechanism is more simplified compared with, for example, the motor shown in FIG. 12.

The features of the motor shown in FIG. 32 include that the magnetic fluxes from the torque generating portions are directed along the rotor shaft to ensure a large facing area between a salient rotor pole and a salient stator pole, and thus that the rotation rate of the magnetic fluxes can be made large so as to have a large torque constant. Further, each of the salient rotor poles of one phase is provided with two portions for generating torque in the rotor shaft direction, whereby the electromagnetic maximum limited torque can be increased.

Although the above description has been focused on a three-phase motor, motors of single phase, two phases or four or more phases may be realized in the same way.

Figure 34:
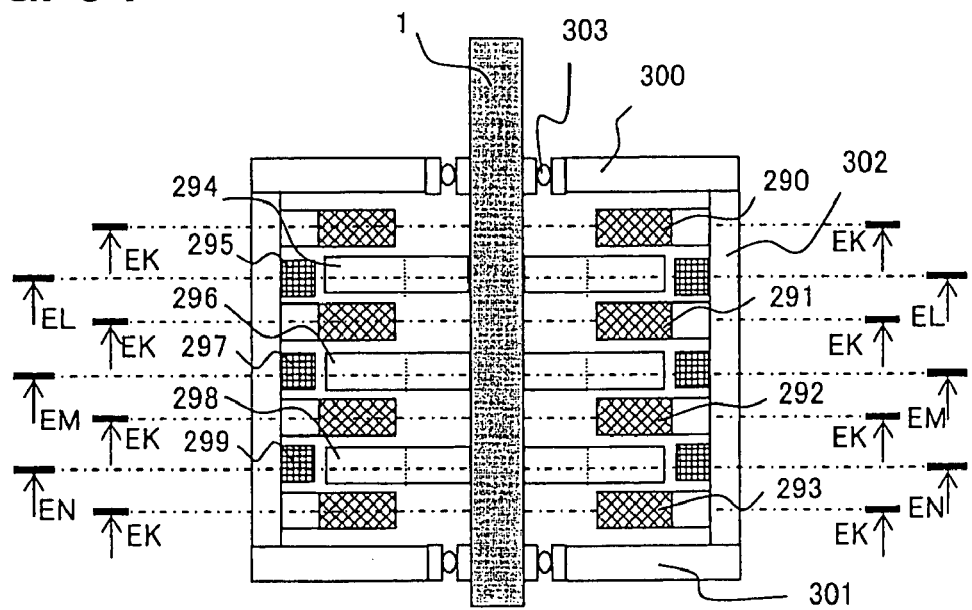
FIG. 34 is a schematic vertical cross section illustrating a motor, in which the salient stator poles and the salient rotor poles are mutually projected to the inner-diameter side and the outer-diameter side.
Figure 35:
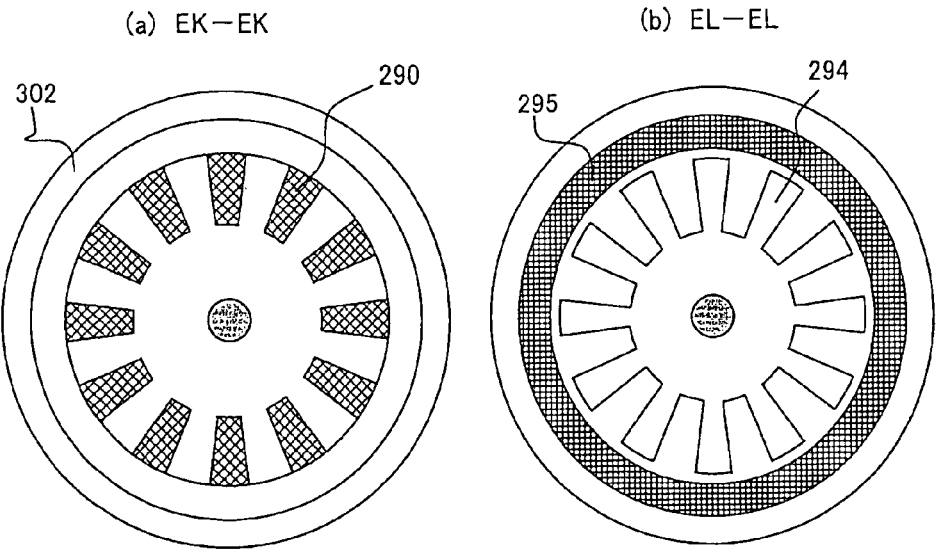
FIG. 35 illustrates schematic transverse cross sections of the stator shown in FIG. 34.

FIG. 34 shows a three-phase motor according to another embodiment of the present invention. In this motor, the relationship between the salient stator poles and the salient rotor poles is reversed from the motor shown in FIG. 32. Indicated by numerals 290, 291, 292 and 293 are salient stator poles having a structure as shown by (a) of FIG. 35, in which soft magnetic portions and spaces are alternately arranged along the circumference. The salient stator poles 290, 291, 292 and 293 made of a soft magnetic material are all arranged at the same circumferential positions. Indicated by 294 are A-phase salient rotor poles, by 296 are B-phase salient rotor poles and by 298 are C-phase salient rotor poles. The salient rotor poles have a structure as shown by (b) of FIG. 35, in which soft magnetic portions and spaces are alternately arranged along the circumference. The circumferential positions of the salient rotor poles 294, 296 and 298 made of a soft magnetic material are permitted to have a phase difference of 120° in electrical angle. Indicated by numeral 295 is an A-phase loop winding, by 297 is a B-phase loop winding and by 299 is a C-phase loop winding. A front flange 300, a rear flange 301 and a rotor shaft 1 of the motor are preferably made of a nonmagnetic material in terms of the electromagnetic operation.

The motor shown in FIG. 34 operates in the same fashion as the motor shown in FIG. 32. That is, A-, B- and C-phase currents are sequentially supplied at every width corresponding to 120° in electrical angle in synchronization with the rotational position of the rotor, so that torque can be continuously outputted.

The salient stator poles 290 and 293, which are arranged at the ends of the stator in the rotor shaft direction, may be permitted also to serve as the front flange 300 and the rear flange 301 of the motor to reduce the size and the cost. In particular, in FIG. 34, bearings 303 may be arranged in the inner-diameter side at the salient stator poles 290 and 293. However, it is necessary to consider that magnetic fluxes would not pass through the bearings 303. Various applications and modifications may be made in this motor. For example, the motor may have a structure in which the relationship between the stator and the rotor of FIGS. 32 and 34 is reversed, or the motor may be a multiphase motor of four or more phases.

Figure 38:
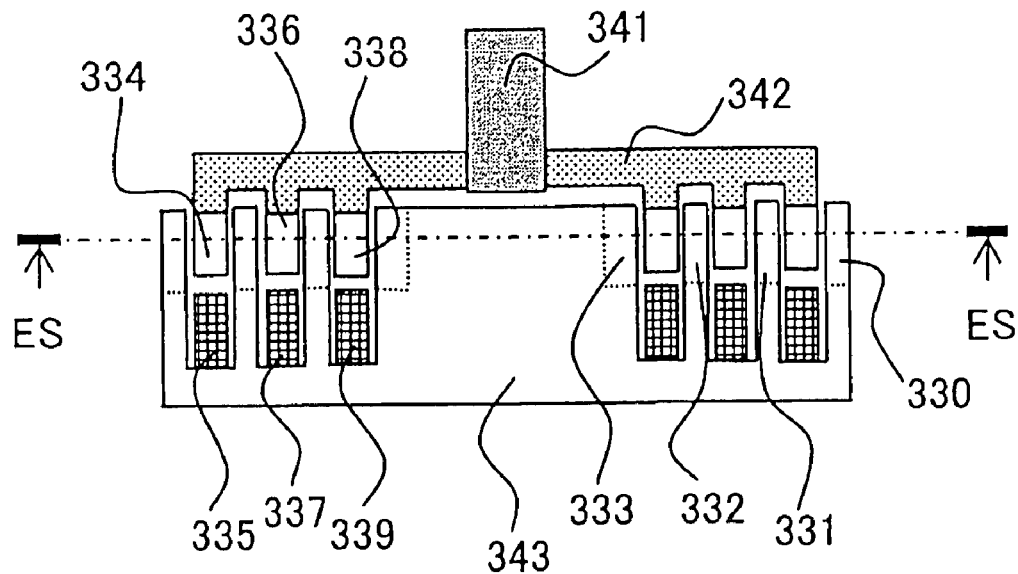
FIG. 38 is a schematic vertical cross section illustrating a motor, in which the salient stator poles and the salient rotor poles are mutually projected to the rotor shaft direction.
Figure 39:
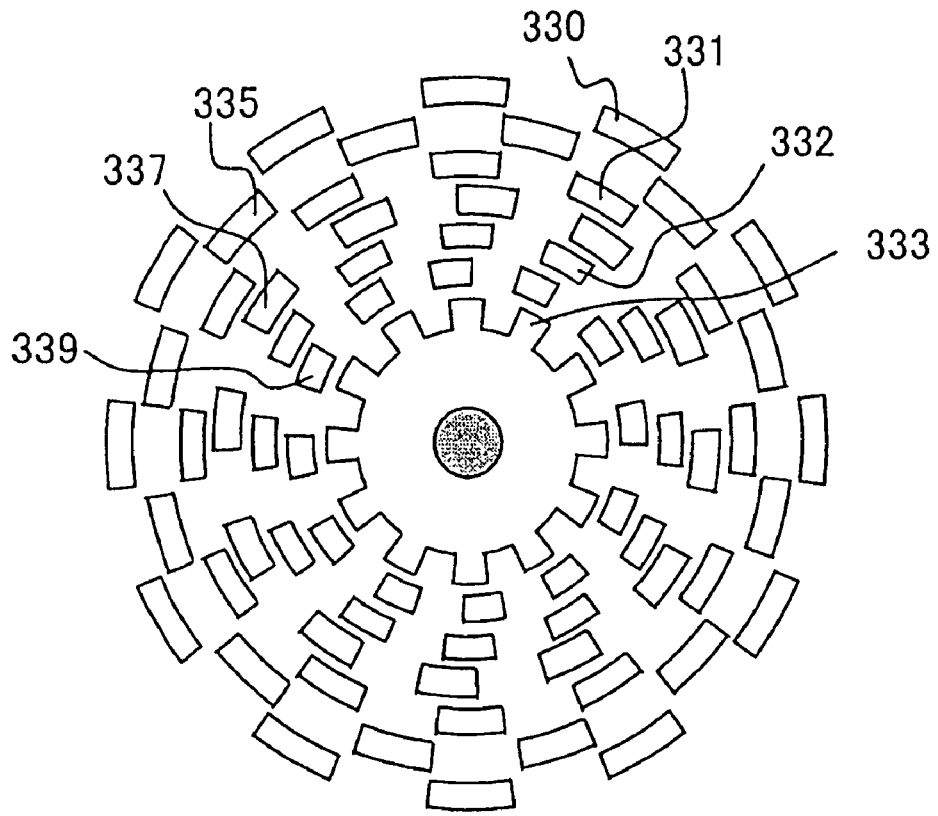
FIG. 39 is a schematic transverse cross section illustrating the stator shown in FIG. 38.

FIG. 38 shows a three-phase motor according to another embodiment of the present invention. In this motor, the relationship between the salient stator and rotor poles of FIG. 32 has been realized in the radial direction. Indicated by numerals 330, 331, 332 and 333 are salient stator poles having a structure, in which soft magnetic portions and spaces are alternately arranged along the circumference. A cross section of the structure taken along a line ES-ES is shown in FIG. 39. The salient stator poles 330, 331, 332 and 333 made of a soft magnetic material are all arranged at the same circumferential positions. Indicated by 334 are A-phase salient rotor poles, by 336 are B-phase salient rotor poles and by 338 are C-phase salient rotor poles. The salient rotor poles have a structure as shown in FIG. 39, in which soft magnetic portions and spaces are alternately arranged along the circumference. The circumferential positions of the salient rotor poles 334, 336 and 338 made of a soft magnetic material are permitted to have a phase difference of 120° in electrical angle. Indicated by numeral 335 is an A-phase loop winding, by 337 is a B-phase loop winding and by 339 is a C-phase loop winding. A rotor support portion 342 is preferably made of a nonmagnetic material in terms of the electromagnetic operation. Indicated by numeral 341 is a rotor shaft and by 343 is a stator.

The operation of the motor shown in FIG. 38 is analogous to that of the motor shown in FIG. 32. That is, A-, B- and C-phase currents are sequentially supplied at every width corresponding to 120° in electrical angle in synchronization with the rotational position of the rotor, so that torque can be continuously outputted.

Figure 40:
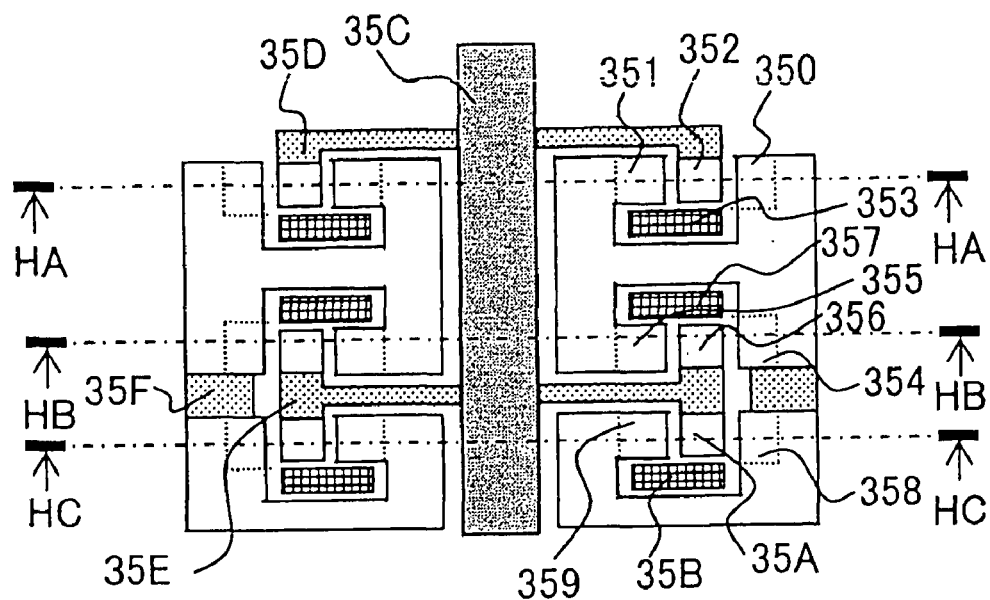
FIG. 40 is a schematic vertical cross section illustrating a three-phase motor provided with torque generating portions both at inner- and outer-diameter sides thereof.

FIG. 40 shows a three-phase motor according to another embodiment of the present invention. In this motor, the phases A, B and C are structured so as to be juxtaposed in the rotor shaft direction. In addition, in each of the phases, the salient stator and rotor poles are arranged in the radial direction, so that the magnetic fluxes of the portions generating torque in each of the phases are substantially passed in the radial direction.

Figure 42:
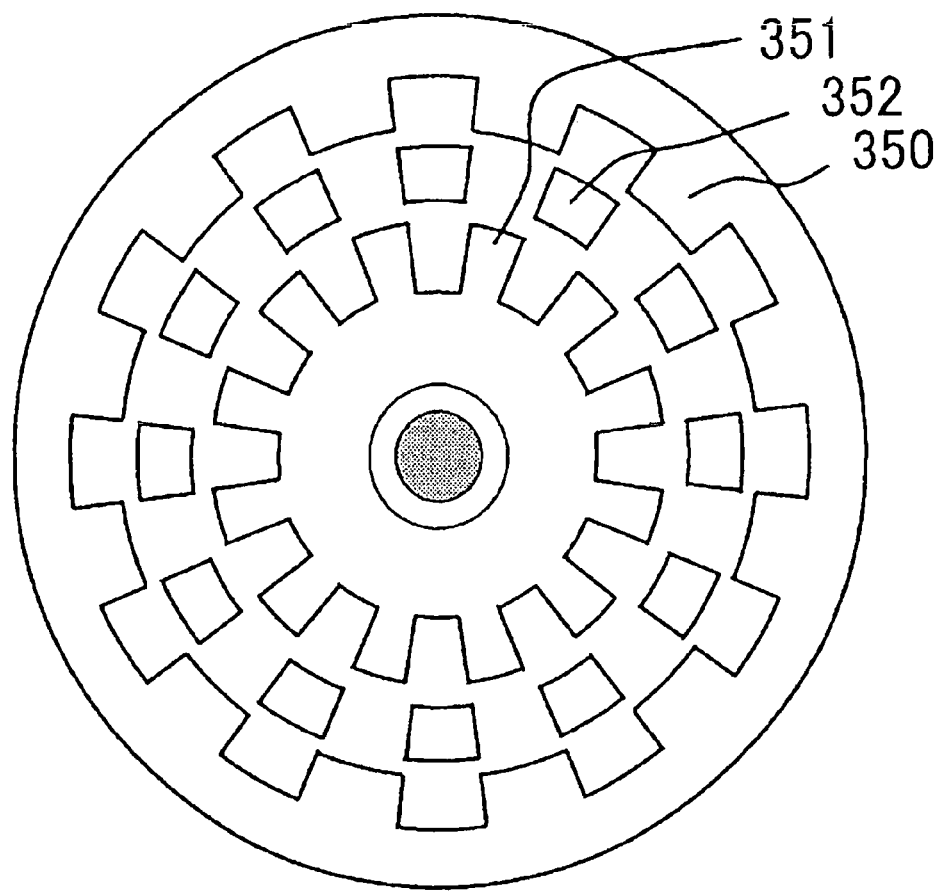
FIG. 42 is a schematic transverse cross section illustrating the stator shown in FIG. 40 or 41.

Indicated by numerals 350 and 351 are A-phase salient stator poles, by 352 are A-phase rotor poles and by 353 is an A-phase winding. Indicated by numerals 354 and 355 are B-phase salient stator poles, by 356 are B-phase salient rotor poles and by 357 is a B-phase winding. Indicated by numerals 358 and 359 are C-phase salient stator poles, by 35A are C-phase salient rotor poles and by 35B is a C-phase winding. Indicated by 35C is a rotor shaft. Indicated by 35D, 35E and 35F are supports for the rotor, which supports are preferably made of a nonmagnetic material. A cross section taken along a line HA-HA of FIG. 40 is shown in FIG. 42.

Basic operation of the motor shown in FIG. 40 is analogous to the motor shown in FIG. 32. That is, A-, B- and C-phase currents are sequentially supplied at every width corresponding to 120° in electrical angle in synchronization with the rotational positions of the rotor, so that torque can be continuously outputted. The magnetic circuit in each of the phases A, B and C can be independently operated.

The features of the motor shown in FIG. 40 include that, in order to drive each of the phases, current may only be supplied to a single winding as mentioned above, owing to the independency of the magnetic circuit of each of the phases to thereby reduce copper loss comparing with the motor shown in FIG. 32. Further, since the motor shown in FIG. 32 permits the magnetic fluxes to pass along the rotor shaft, the attraction forth in the rotor shaft direction is exerted. This may require careful motor designing prepared for the unbalanced attraction force in the rotor shaft direction. However, since the attraction force in the motor shown in FIG. 40 is exerted in the radial direction, the measure that should be taken for the unbalanced attraction force may be of a level of the conventional normal motors, thus facilitating the design and fabrication of this motor.

Figure 41:
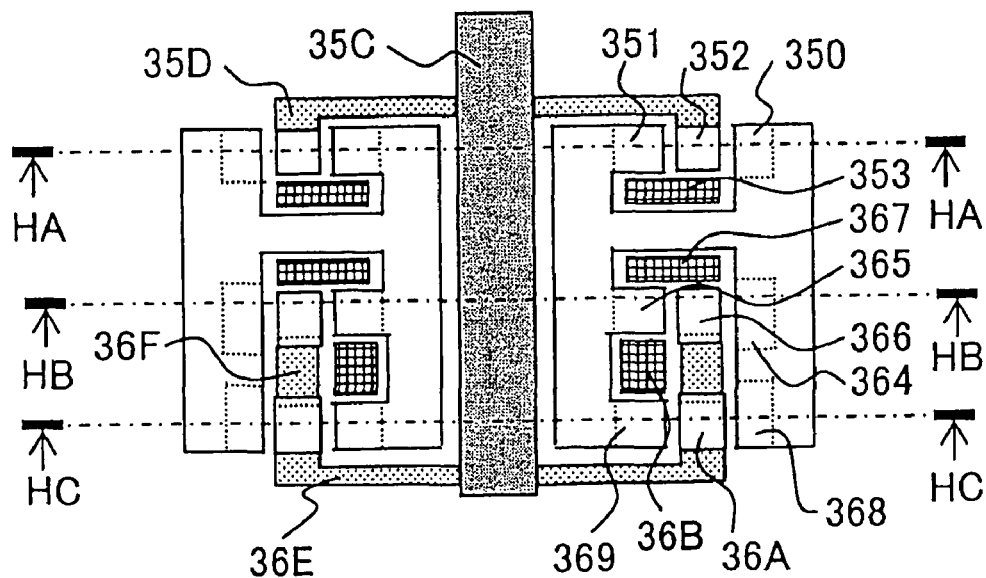
FIG. 41 is a schematic vertical cross section illustrating a three-phase motor provided with torque generating portions both at inner- and outer-diameter sides thereof.

FIG. 41 shows a three-phase motor according to another embodiment of the present invention. Comparing with the motor shown in FIG. 40, this motor is modified so that the phases B and C may have different structures. In this motor, the phases A, B and C are structured so as to be juxtaposed in the rotor shaft direction. In addition, in each of the phases, the salient stator and rotor poles are arranged in the radial direction, so that the magnetic fluxes of the portions generating torque in each of the phases are substantially passed in the radial direction. Indicated by numerals 364 and 365 are B-phase salient stator poles, by 366 are B-phase salient rotor poles and by 367 is a B-phase winding. Indicated by numerals 368 and 369 are C-phase salient stator poles, by 36A are C-phase salient rotor poles and by 36B is a winding used for driving both of the phases B and C. Indicated by 35C is a rotor shaft.

Indicated by 35D, 36E and 36F are supports for the rotor, which supports are preferably made of a nonmagnetic material.

Basic operation of the motor shown in FIG. 41 is analogous to the motor shown in FIG. 40. That is, an electromagnetic force that works between the salient stator and rotor poles of each of the phases A, B and C in synchronization with the rotation of the rotor, is permitted to effect at every width corresponding to 120° in electrical angle to obtain rotating torque. As to the phases A and C, the way of supplying currents for the phases is the same as the case of the motor shown in FIG. 40. However, when driving the phase B, currents are required to be reversely passed through the windings 367 and 36B, so that electromagnetic effect can be exerted in such a way that torque may be generated between the B-phase salient stator and rotor poles but that no torque may be generated between the C-phase salient stator and rotor poles. In this way, owing to the sequential torque generation in the order of the phases A, B and C, rotating torque can be continuously obtained. The angular widths of current supply and values of currents may be changed to some extent based on the basic concept to achieve smoother and more efficient rotation.

Figure 43:
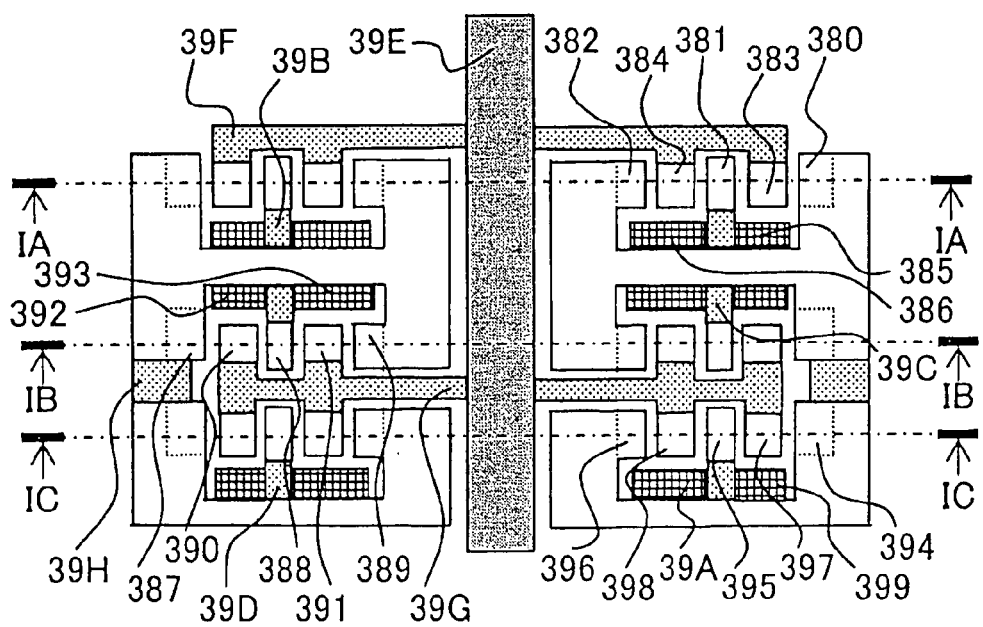
FIG. 43 is a schematic vertical cross section illustrating a three-phase motor provided with four radial torque generating portions.
Figure 44:
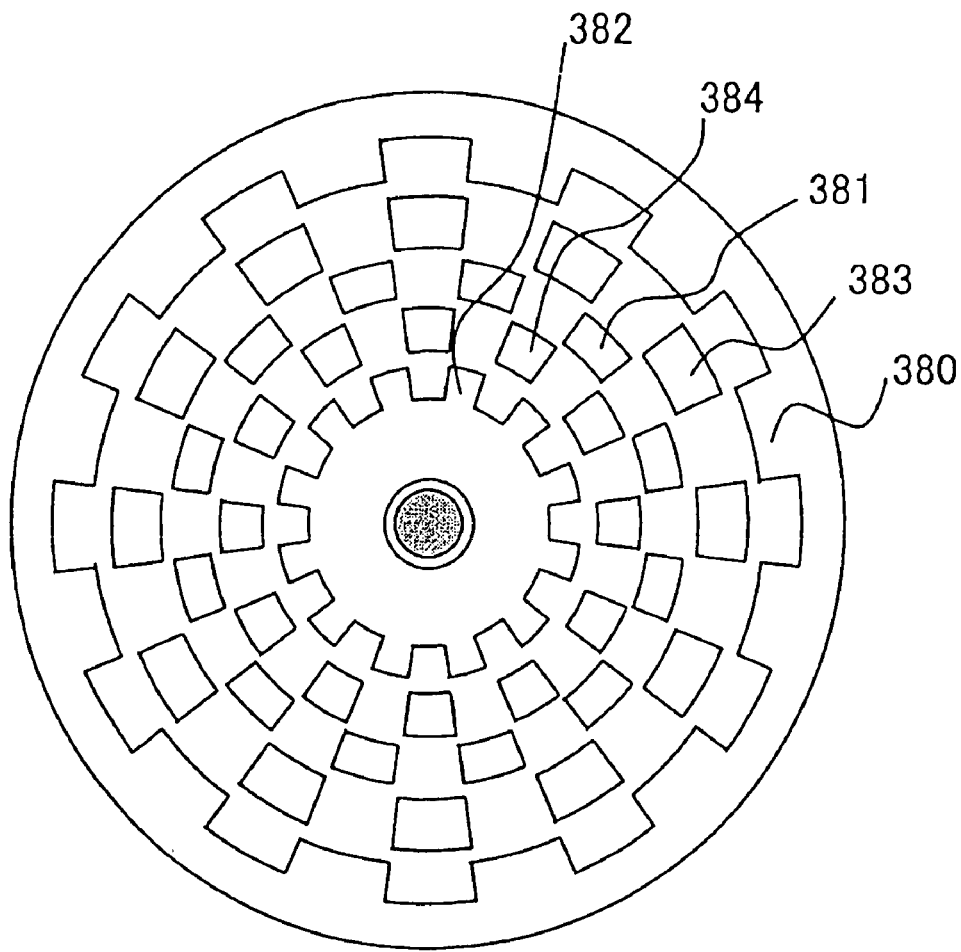
FIG. 44 is a schematic transverse cross section illustrating the stator shown in FIG. 43; is a vector diagram indicating currents of the windings shown in FIG. 43.

FIG. 43 shows a three-phase motor according to another embodiment of the present invention. This motor is different from the motor shown in FIG. 40 in that the salient stator and rotor poles in each of the phases are doubly structured in the radial direction. This structure has an effect of increasing the electromagnetic maximum limited torque. In addition, utilization of the portion at the inner-diameter side of the motor may also have an effect of increasing torque. In this motor, the phases A, B and C are structured being juxtaposed in the rotor shaft direction. In addition, in each of the phases, the salient stator and rotor poles are arranged in the radial direction, so that the magnetic fluxes of the portions generating torque in each of the phases are substantially passed in the radial direction.

Indicated by numerals 380, 381 and 382 are A-phase salient stator poles, by 383 and 384 are A-phase salient rotor poles and by 385 and 386 are A-phase windings. Indicated by numerals 387, 388 and 389 are B-phase salient stator poles, by 390 and 391 are B-phase salient rotor poles and by 392 and 393 are B-phase windings. Indicated by numerals 394, 395 and 396 are C-phase salient stator poles, by 397 and 398 are C-phase salient rotor poles and by 399 and 39A are C-phase windings. Indicated by 39E is a rotor shaft. Indicated by 39F and 39G are supports for the rotor and by 39H is a spacer for the stator. These supports and spacers are preferably made of a nonmagnetic material.

Basic operation of the motor shown in FIG. 43 is analogous to the motor shown in FIG. 40. That is, A-, B- and C-phase currents are sequentially supplied at every width corresponding to 120° in electrical angle in synchronization with the rotational position of the rotor, so that torque can be continuously outputted. The magnetic circuits of the phases A, B and C can be independently operated.

Portions indicated by 39B, 39C and 39D in FIG. 43 are made of a soft magnetic material, and two sets of magnetic circuits are radially and independently set up in each of the phases. This configuration may also allow the magnetic fluxes of the outer-diameter side magnetic circuits to be large to thereby increase torque. This motor may be regarded as being a motor in which two motors are effectively incorporated at the outer- and the inner-diameter sides of the motor. This motor structure readily enables incorporation of motors, and thus may be formed into a motor of triple- or more deep-structure in the radial direction. The technique of such a motor is applicable to other motors of the present invention.

Figure 31:
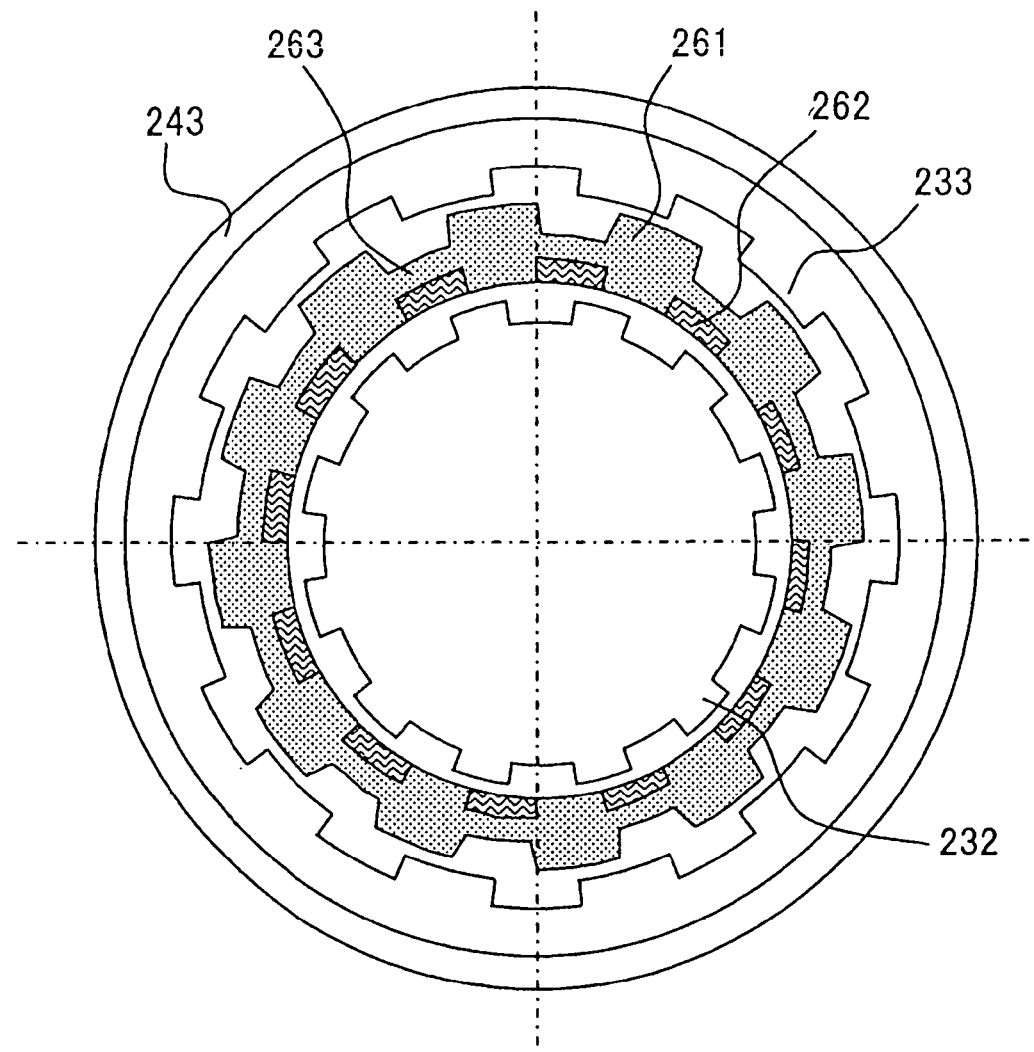
FIG. 31 is a schematic transverse cross section of the stator shown in FIG. 30.

FIG. 31 illustrates a configuration in which the salient rotor poles of the motor of the present invention are integrated to obtain a reinforced structure. Circumferentially arranged salient rotor poles 261 are linked through binders 263 to achieve circumferential integration of the same-phase salient rotor poles and to achieve a robust structure. Indicated by numeral 262 are nonmagnetic members connected to the nonmagnetic cylindrical portion 248 shown in FIG. 28. The salient portions along the circumference of the rotor are circumferentially linked for physical integration of the individual salient rotor poles. This is preferable in terms of both the strength and the fabrication of the rotor.

The plurality of the salient rotor poles 261 in FIG. 31 arranged along the circumference are circumferentially linked through the binders 263 in the figure. This however may raise a problem that the degree of each indent of the salient rotor poles may be low. Therefore, the linkage may be achieved by other forms, such as by linking the salient rotor poles at the side faces thereof not along the same circumference. Alternatively, outer-diameter side salient portions and inner-diameter side salient portions of the salient rotor poles 261 shown in FIG. 31 may have a phase difference of 180° in electrical angle. Alternatively, for example, large-width electromagnetic steel plates as the binders 263 and small-width electromagnetic steel plates as the binders 263 and the like may be stacked in the rotor shaft direction.

In the salient rotor poles 261 shown in FIG. 31, both the outer- and inner-diameter side salient portions are integrated. Alternatively, however, the inner-diameter side salient portions may be separated to obtain a detachable structure, so that the nonmagnetic members 262 and the salient rotor poles 261 can be readily assembled. It should be appreciated that the structure for linking the same-phase salient poles along the same circumference through the same material members may be applied to the salient poles of other motors of the present invention.

Hereinafter will be described a relationship between the shapes of the salient stator and rotor poles and torque T. An input electrical power P for the magnetic circuits of the motor can be expressed as follows:

$$P = V \times I \quad (1)$$

$$V = d\Psi/dt = d\Psi/d\theta \times d\theta/dt \quad (2)$$

$$\Psi = NN \times \phi \quad (3)$$

$$Pm = T \times d\theta/dt \quad (4)$$

where V is voltage, $\Psi$ is the number of interlinked fluxes, $\phi$ is magnetic fluxes, $\theta$ is rotational angle of the rotor, NN is the number of turns of winding, T is torque and Pm is mechanical output of the motor. Winding resistance, iron loss and the like are ignored. Further, for simplification of the issue, assuming that the magnetic energy of the magnetic circuits is as small as can be ignored, the following relation can be established based on Equations (1), (2), (3) and (4):

$$T \approx NN \times d\phi/d\theta \times I \quad (5)$$

Accordingly, in order to increase the torque T of the motor, it is effective to increase $d\phi/d\theta$. This means that, increase in a length at a portion where the salient stator and rotor poles face with each other, may increase $d\phi/d\theta$ to thereby increase torque in the magnetic saturation of the motor.

In each of the motors shown in FIGS. 1 to 4, the length of the portion in the rotor shaft direction, where a salient stator pole and a salient rotor pole face with each other is illustrated as being the same as the width of each of other magnetic paths. On the other hand, each of FIGS. 5, 15, 21, 28 and 25 shows a configuration, in which a length TB of the portion in the rotor shaft direction, where a salient stator pole and a salient rotor pole face with each other is larger than a length of each of other magnetic path portions in the rotor shaft direction. As mentioned above, the larger the length TB is, the larger the torque may become. Accordingly, it is advantageous to make the length TB large to obtain large torque, unless there is other inconveniency.

Figure 26:
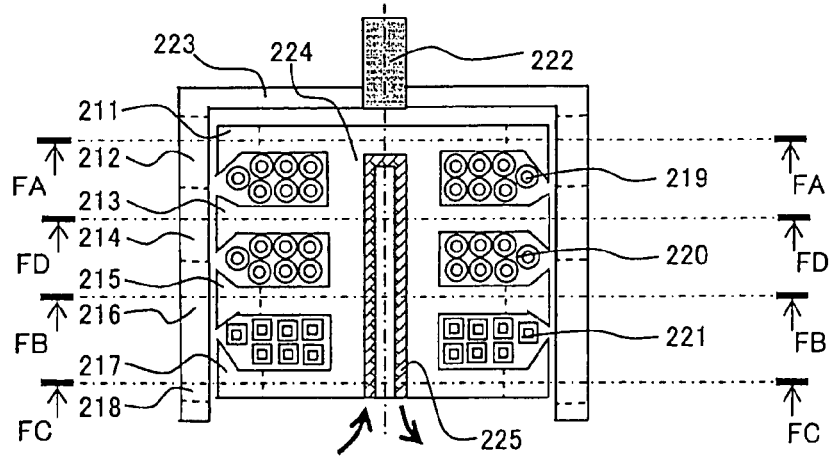
FIG. 26 is a schematic vertical cross section illustrating a three-phase motor incorporating a cooling mechanism with windings.

FIG. 26 shows an example of a three-phase motor of the present invention. This motor has a basic structure, in which the stator and the rotor of the motor shown by (a) of FIG. 12 are reversed, that is, the rotor is located at the outer-diameter side and the stator is located at the inner-diameter side. This motor has a so-called an outer-rotor motor structure.

Figure 27:
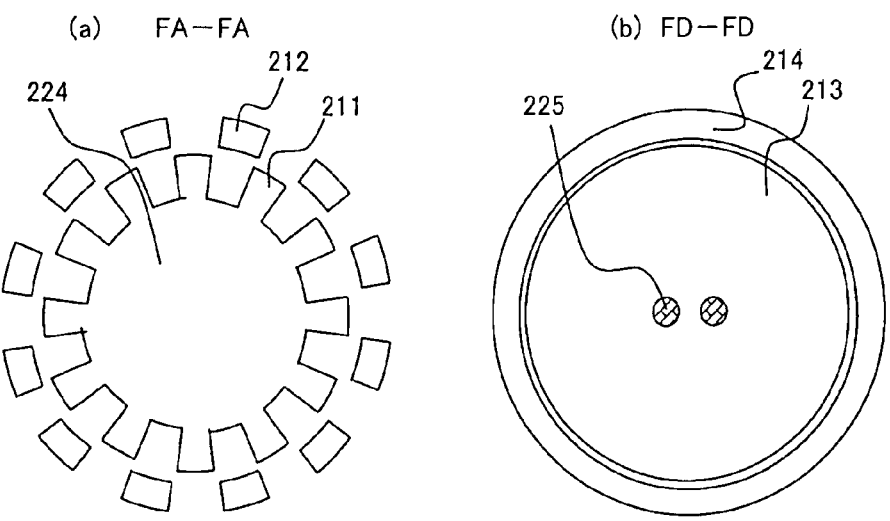
FIG. 27 illustrates schematic transverse cross section of the stator shown in FIG. 26.

In FIG. 25, indicated by numeral 212 are A-phase salient rotor poles and by 211 are salient stator poles, a cross section of which taken along a line FA-FA has a configuration shown by (a) of FIG. 27. As can be seen, soft magnetic portions and spaces are alternately arranged along the circumference. The soft magnetic portions are magnetically connected, in the rotor shaft direction, to other soft magnetic portions of the rotor. The circumferential side faces of the salient rotor poles 212 have a configuration as if holes of the spaces are provided in a cylindrical form. Alternatively, the inner peripheral side of the salient rotor poles 212 may be indented to provide salient poles, while the outer peripheral side thereof may be entirely covered. Indicated by numeral 216 are B-phase salient rotor poles and by 215 are salient stator poles, a cross section of which taken along a line FB-FB has a arrangement/structure shown by (a) of FIG. 27, in which the salient stator and rotor poles have a relative phase difference of 120°. Indicated by numeral 218 are C-phase salient rotor poles and by 217 are salient stator poles, a cross section of which taken along a line FC-FC has a arrangement/structure shown by (a) of FIG. 27, in which the salient stator and rotor poles have a relative phase difference of 240° from the phase A. A cross section taken along a line FD-FD has a configuration including magnetic paths for passing fluxes, as shown by (b) of FIG. 27. Relative phase difference of the salient rotor and stator poles between the individual phases of A, B and C is 120° in electrical angle. Indicated by numeral 219 is an A-phase loop winding, by 202 is a B-phase loop winding and by 221 is a C- and B-phase loop winding. Indicated by numeral 222 is a rotor shaft and by 223 is a support disc for the rotor.

This configuration may enable sequential driving of the phases in the order of A, B and C according to the rotational position of the rotor, and may further enable continuous torque generation. In addition, this configuration may enable reduction of torque ripple depending on the motor design. The phase A may be driven by supplying current to the winding 219. In other words, magnetic fluxes are induced to make a circuit through the salient rotor poles 212, the salient stator poles 211 and the magnetic paths 213 and 214 for passing fluxes, whereby an attraction force is produced between the salient rotor and stator poles 212 and 211 to generate torque. The phase B may be driven by supplying current to both of the windings 220 and 221. In other words, magnetic fluxes are induced to make a circuit through the salient rotor poles 216, the salient stator poles 215 and the magnetic paths 213 and 214 for passing fluxes, whereby an attraction force is produced between the salient rotor and stator poles 216 and 215 to generate torque. In this case, a sum of currents inversely supplied to the windings 220 and 221 is applied to the C-phase salient rotor and stator poles 218 and 217. Therefore, no magnetomotive force is ultimately applied to the phase C and thus no torque is generated. The phase C may be driven by supplying current to the winding 221. In other words, magnetic fluxes are induced to make a circuit through the salient rotor poles 218, the salient stator poles 217 and the magnetic paths 213 and 214 for passing fluxes, whereby an attraction force is produced between the salient rotor and stator poles 218 and 217 to generate torque. It should be appreciated that the above explanation is provided on the assumption that the facing area between the magnetic paths 213 and 214 for passing fluxes is constantly large and thus only small magnetic resistance is exerted.

In this way, sequential driving of the phases in the order of A, B and C according to the rotational position of the rotor can produce positive and negative torque to enable power driving and regenerative driving. In the operation of this motor, the range where one phase can generate torque depends on the shape of each salient pole. Meanwhile, where a width of a salient pole is 180° in electrical angle, driving can be effected within this 180°. The motor shown in FIG. 8 is capable of smooth driving with small torque ripple by sequentially driving the phases in the order of A, B and C. In this case, since each of the phases can be driven within a range of 120° or more, there are some regions in the vicinities of a border portion between two phases, where the two phases can be simultaneously driven.

The motor shown in FIG. 26 may be modified to realize a four-phase outer-rotor motor. To this end, the magnetic paths 213 and 214 for passing fluxes in FIG. 26 may be replaced by magnetic poles having the same shapes as the salient stator and rotor poles 215 and 216. In the resultant structure, the salient stator and rotor poles of the four phases designated as A, B, C and D from the top in the paper plane may have a relative phase difference of 90° in electrical angle from each other. The operation of this four-phase motor will be the same as that of the four-phase motor shown in FIG. 16. Multiphase outer-rotor motor of five or more phases may also be realized with the same structure.

Figure 36:
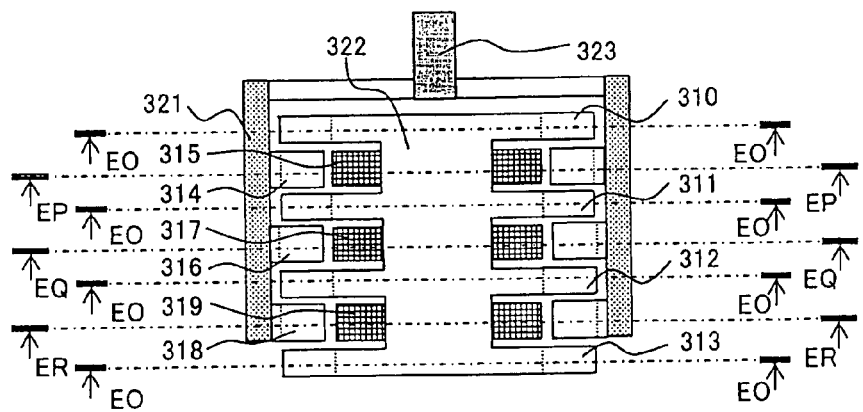
FIG. 36 is a schematic vertical cross section illustrating a modified configuration of the motor shown in FIG. 34, in which the rotor is located at the outer peripheral side.
Figure 37:
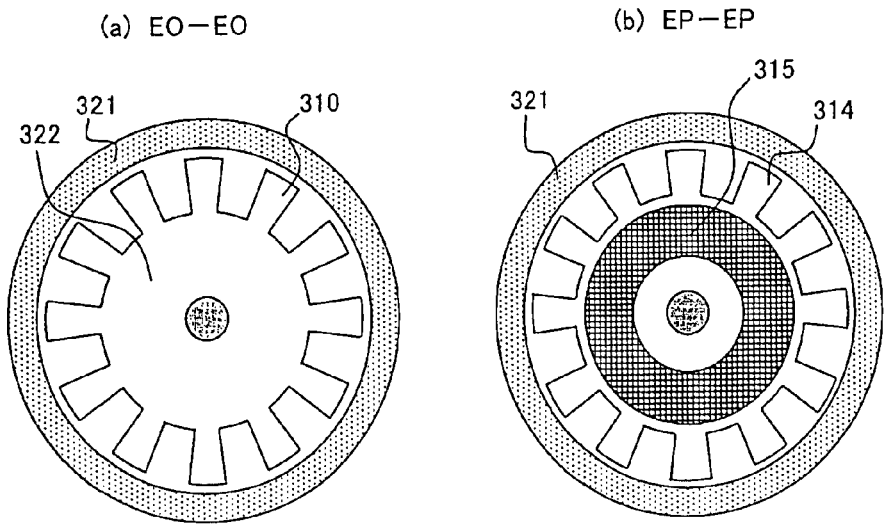
FIG. 37 illustrates schematic transverse cross sections of the stator shown in FIG. 36.

FIG. 36 shows a three-phase motor according to another embodiment of the present invention. In this motor, the outer-diameter side of the motor shown in FIG. 32 is allowed to rotate to serve as a rotor, and loop windings are fixedly attached to the inner-diameter side stator. This motor has a structure of a so-called outer-rotor motor. Indicated by numerals 310, 311, 312 and 313 are salient stator poles having a structure as shown by (a) of FIG. 37, where soft magnetic portions and spaces are alternately arranged along the circumference. The soft magnetic portions 310, 311, 312 and 313 are all arranged at identical circumferential positions. Indicated by numeral 314 are A-phase salient rotor poles, by 316 are B-phase salient rotor poles and by 318 are C-phase salient rotor poles, each of which has a structure shown by (b) of FIG. 37, where soft magnetic portions and spaces are alternately arranged along the circumference. The soft magnetic portions 314, 316 and 318 are arranged so as to have a circumferential phase difference of 120° in electrical angle. Indicated by numeral 315 is an A-phase loop winding, by 317 is a B-phase loop winding and by 319 is a C-phase loop winding. A cylindrical member 321 for the rotor is preferably made of a nonmagnetic material in terms of electromagnetic operation. Indicated by numeral 322 is a rotor and by 323 is a rotor shaft.

The motor shown in FIG. 36 operates in the same fashion as the motor shown in FIG. 32. That is, A-, B- and C-phase currents are sequentially supplied at every width corresponding to 120° in electrical angle in synchronization with the rotational position of the rotor, so that torque can be continuously outputted.

Particularly, in the structure of the outer-rotor motor of the present invention, the substantially looped windings are arranged at the inner-diameter side. Accordingly, the length of each winding is shortened to reduce material cost of the windings and also to reduce copper loss. Thus, this motor is excellent in terms of both cost and efficiency. Further, portions for performing electromagnetic generation operation of torque are located at the outer peripheral side of the motor. Therefore, a diameter at each action point is made large to exert an effect of generating large torque. A diameter of the rotor is also made large and thus the inertia is likely to become large. The outer peripheral side location of the rotor may require a cover, depending on the applications, along the outer periphery of the motor for the sake of safety.

Referring to FIGS. 21 to 44, some techniques for improving motor properties have been described chiefly exemplifying three-phase reluctance motors. These techniques can also be applied to single-phase motors to four- or more phase motors. Each multiphased or N-phased reluctance motors may variously be configured by combining motors having less than N number of phases. Such motors are also intended to be included in the present invention.

The various motors of the present invention described above can be variously modified in the shapes of the salient stator and rotor poles. These motors of the present invention are chiefly reluctance torque motors whose properties vary according to the distribution condition of the magnetic fluxes that pass through the soft magnetic material. Major problems include the problem of magnetic saturation at portions where no power is generated, and the problem of magnetic fluxes that will not contribute to torque generation in a case where high current is supplied for the purpose of having large torque generated. If a magnetic path along the way that does not generate power is saturated, a magnetomotive force H may be imposed on the saturated portion, and by that much, the magnetomotive force H at torque generation portions may be decreased, raising a problem of torque decrease. It should be appreciated that no problem will created by the fact that the portions where the salient stator and rotor poles face with each other and the vicinities thereof have large flux density. The magnetic fluxes that do not particularly contribute to torque generation and pass through spaces other than the spaces at the portions where the salient stator and rotor poles face with each other, are referred to as "leaked flux components φL". Hereinafter will be described some methods for decreasing these problems.

Figure 45:
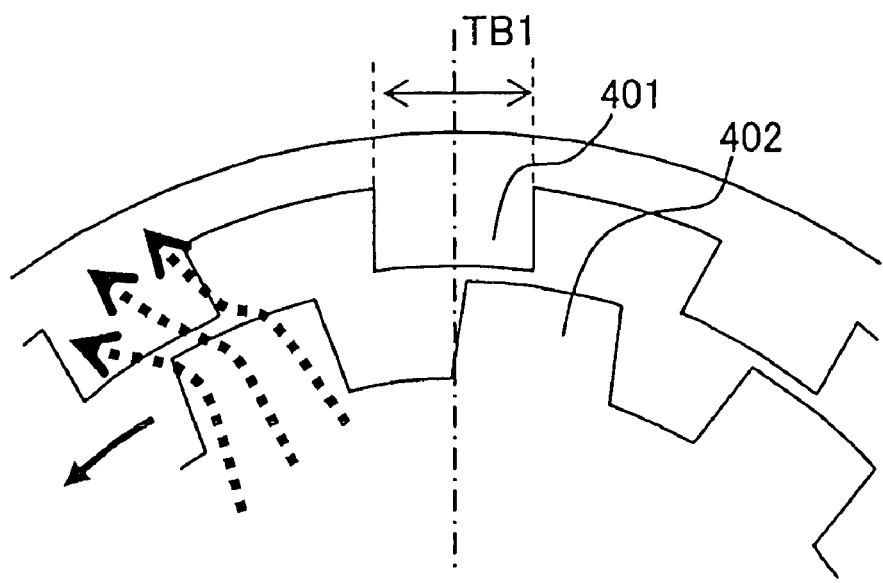
FIG. 45 illustrates circumferential configurations of salient stator poles and salient rotor poles.

First, an example of basic torque generation will be described. FIG. 45 shows outer-diameter side salient stator poles 401 and inner-diameter side salient rotor poles 402 facing with each other, and magnetic fluxes φRS passing along the direction of the arrows when magnetomotive force works on these poles. In this case, counterclockwise torque is generated at the rotor. The rotor gradually rotates counterclockwise. When the salient stator and rotor poles 401 and 402 come to positions where they face with each other head on, torque is zeroed, or there will be no torque generation. If the rotor is further rotated counterclockwise from these positions, reversed or clockwise torque is generated at the rotor.

When the salient stator and rotor poles 401 and 402 face with each other only over a small range, only a little magnetic flux will be passed. Therefore, there is no problem of magnetic saturation in the magnetic paths that make a circuit, and the value of dΨ/dθ in Equation (2) is expected to be large. However, even at this moment, the leaked flux components φL are present other than the portion where the salient stator and rotor poles 401 and 402 face with each other. These components pass through the spaces around the facing portions. Then, when the salient rotor pole 402 rotates counterclockwise up to a position just before the position where the salient stator and rotor poles 401 and 402 face with each other, the magnetic fluxes φRS are increased, being further added with the leaked flux components φL mentioned above. As a result, magnetic fluxes become larger at the base portions of the salient poles than at the portion where the salient poles face with each other, which may be led to a tendency of causing magnetic saturation.

Figure 46:
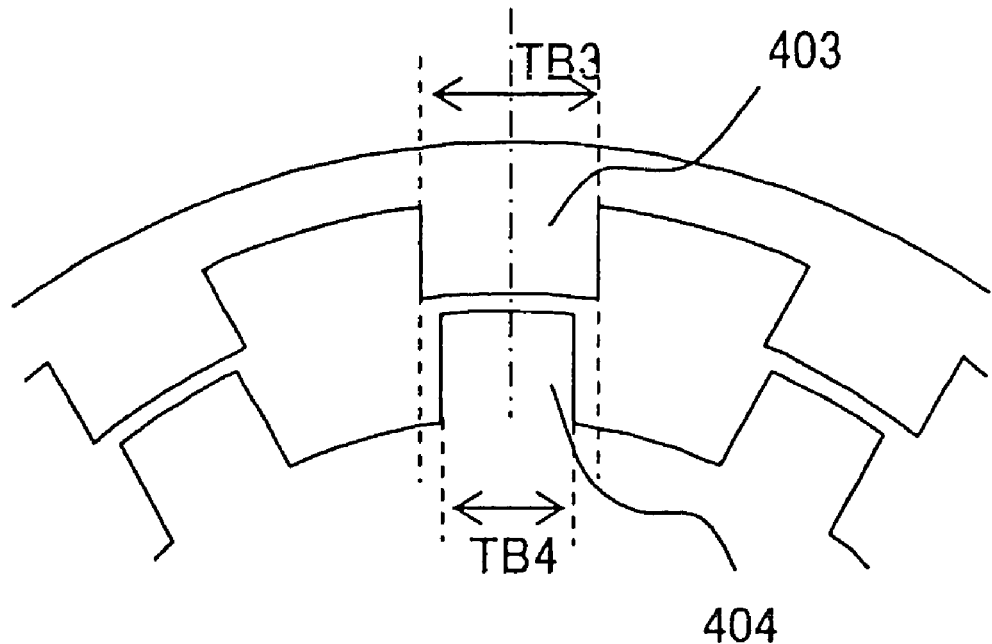
FIG. 46 illustrates circumferential configurations of salient stator poles and salient rotor poles.

As shown in FIG. 46, a circumferential width TB3 of a salient stator pole 403 and a circumferential width TB4 of a salient rotor pole 404 can be selected in association with an operation method of the motor. That is, the width TB3 and the width TB4 do not necessarily have to be the same.

Figure 47:
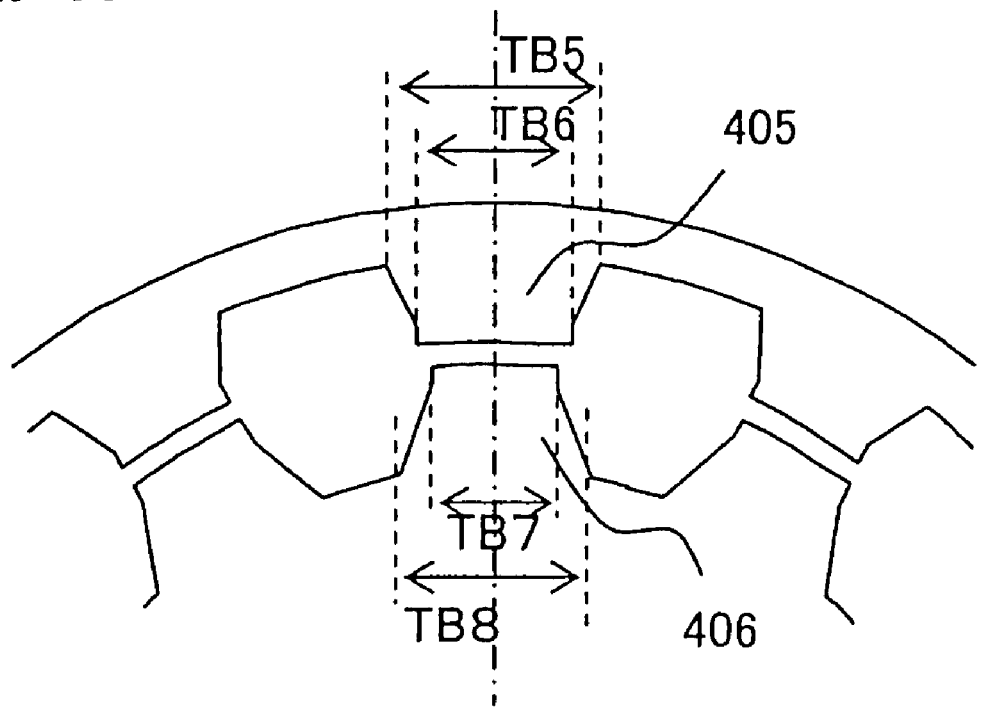
FIG. 47 illustrates circumferential configurations of salient stator poles and salient rotor poles.

FIG. 47 shows a structure where a circumferential base width TB5 of a salient stator pole 405 is made larger than a width TB6 thereof to avoid magnetic saturation at the base portion thereof. A salient rotor pole 406 also has a structure where a circumferential base width TB8 is relatively made larger than a circumferential width TB7 thereof to avoid magnetic saturation at the base portion thereof. This structure can provide a large circumferential range for the salient stator and rotor poles 405 and 406 to generate torque.

Figure 48:
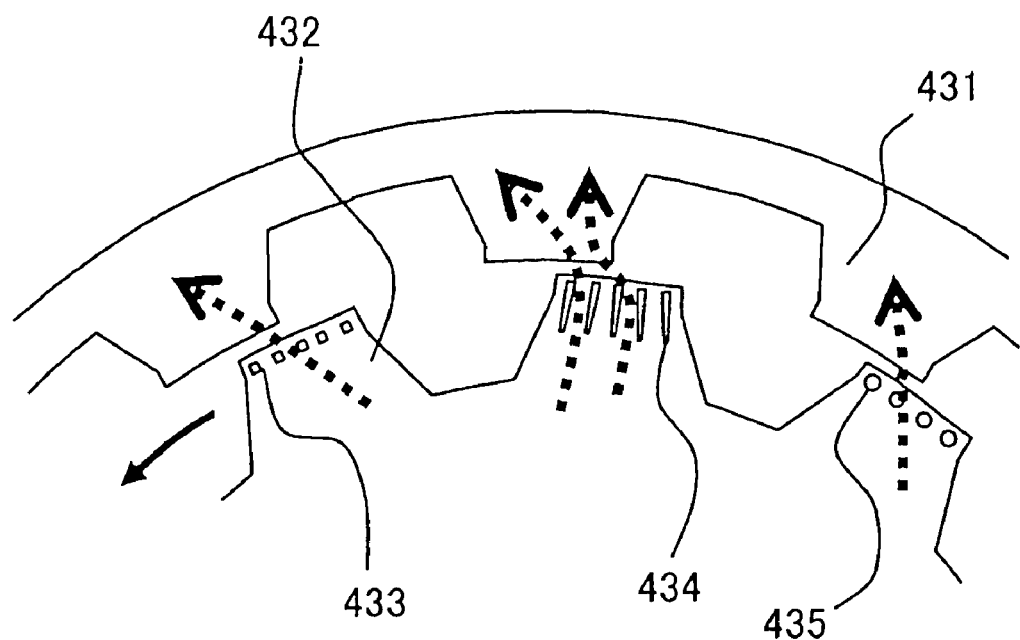
FIG. 48 is an illustration explaining magnetic fluxes inside the salient rotor poles.

FIG. 48 shows a method for limiting magnetic fluxes, or for limiting a magnetic path for passing magnetic fluxes, at an end portion of a salient rotor pole. Indicated by numeral 431 are salient stator poles, and by 432 are salient rotor poles. Each of the salient rotor poles 432 can partially be provided, for example, with square holes 433 or circular holes 435, so that magnetic fluxes passing through the salient rotor poles 432 may be limited. Elongated holes 434 may not only limit magnetic fluxes passing through the salient rotor poles, but also may limit a path for magnetic fluxes in each of the salient rotor poles to thereby exert an effect of reducing the leaked flux components φL. This structure may contribute to reducing stator-side magnetic saturation and to enlarging a circumferential range for the salient stator and rotor poles 405 and 406 to generate torque. Or, this structure may contribute to uniforming magnetic flux distribution on the surface of each salient rotor pole so as to provide a large rotation region where generated torque of the motor is uniformed.

These holes may be filled with resin having low magnetic permeability. Also, these holes may be provided on the side of the stator.

Figure 50:
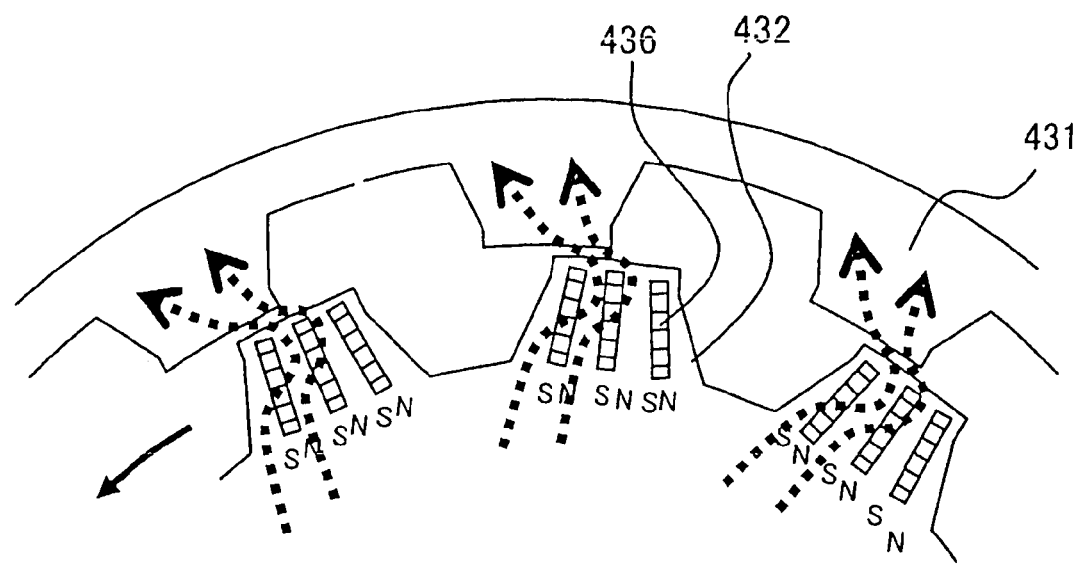
FIG. 50 is a transverse cross section illustrating a motor as an example in which permanent magnets are arranged inside each salient rotor pole.
Figure 51:
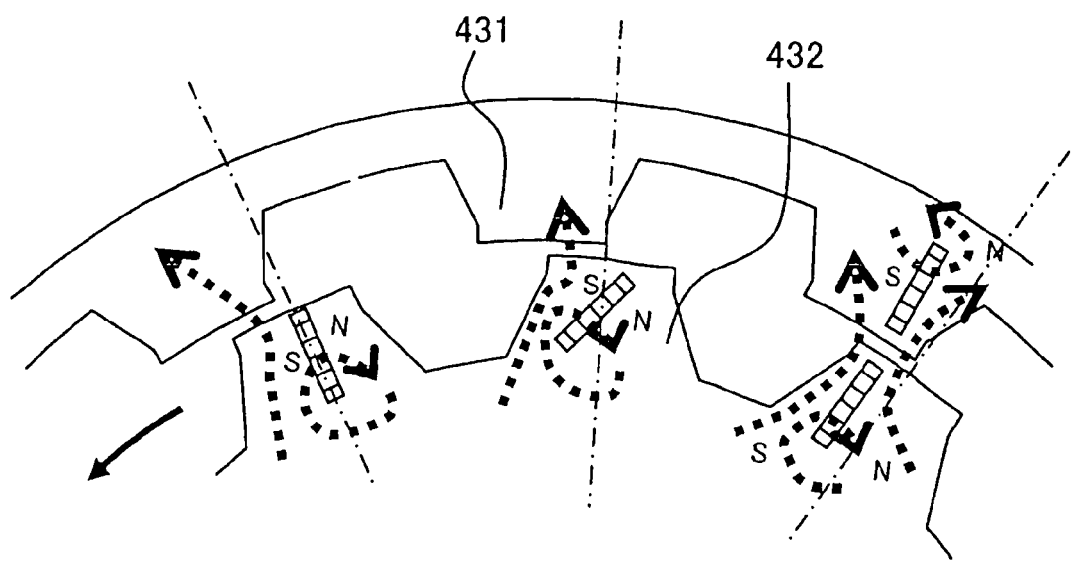
FIG. 51 is a transverse cross section illustrating a motor as an example, in which permanent magnets are arranged inside each salient rotor pole.

Further, as shown in FIGS. 50 and 51, permanent magnets 436 may be arranged to change the magnetic properties of the salient rotor poles 432. The arrangement, position, inclination and the like of the permanent magnets 436 can be varied as exemplified in FIGS. 50 and 51. In these examples, magnetic flux distribution in the salient rotor poles is varied by the permanent magnets, whereby the circumferential range can be made large for each salient rotor pole 406 to generate torque. Or, the magnetic flux distribution on the surface of each salient rotor pole can be uniformed so as to provide a large rotation region where generated torque of the motor is uniformed.

Figure 52:
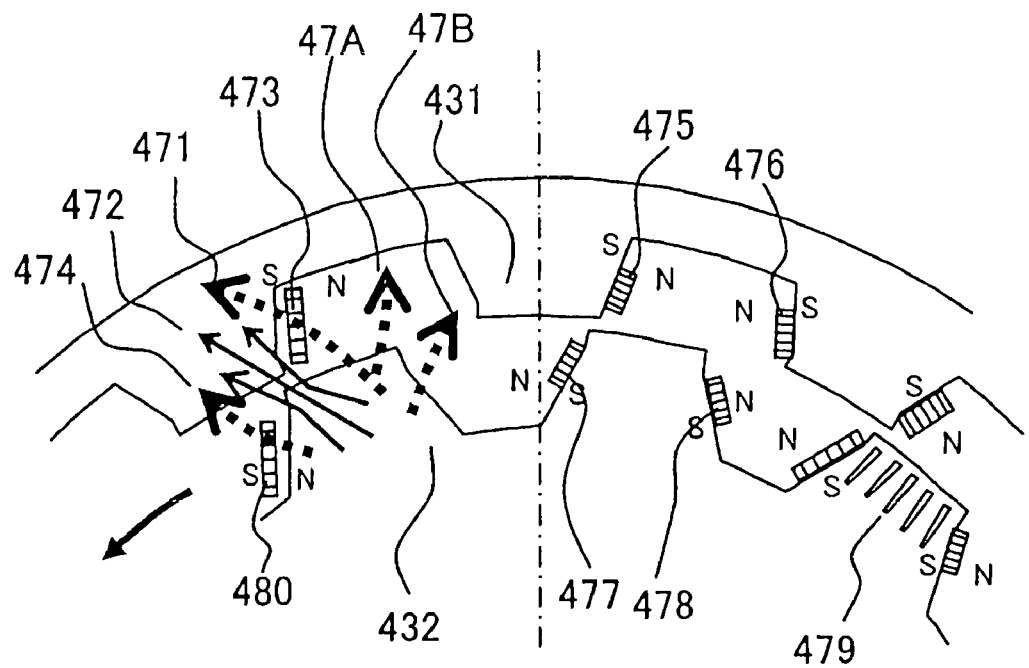
FIG. 52 illustrates a configuration, in which permanent magnets are arranged in the vicinities of salient rotor poles and salient stator poles, being oriented so as to reduce flux leakage.

FIG. 52 shows a method for reducing the leaked flux components (l)L by using permanent magnets. FIG. 52 partially shows some methods. Indicated by 472 are flux components that can efficiently generate torque. Magnetic fluxes 471 and 474 are the fluxes that may contribute to generating rotor torque indicated by an arrow, but are also the fluxes that may exert adverse effects. In particular, these are the flux components that may cause magnetic saturation in portions of the magnetic circuits. In terms of the principle of torque generation, these are the flux components that may be removed. Indicated by numeral 473 are permanent magnets arranged in a direction that can exert polarity for reducing the flux 471. Permanent magnets 480 are also arranged in a direction for reducing the flux 474. The term "direction for reducing" refers to a direction in which the magnetomotive force of the permanent magnets works, and which is opposite to the direction of the magnetomotive force that works on the salient stator and rotor poles.

The reason why such a configuration for reducing unnecessary magnetic fluxes is enabled is because, in a motor applied with reluctance torque, torque has nothing to do with the directions of the magnetic fluxes that exert the torque, and thus because intentional uniformization of the flux directions in the motor can reduce the leaked fluxes with the use of the permanent magnets. Accordingly, it is difficult for a brushless motor, for example, using permanent magnets to reduce flux leakage, because the direction of the magnetomotive force that works on portions of the stator changes between positive and negative with the rotation, in the same fashion as the alternating current.

The effect of reducing flux leakage using permanent magnets is prominent when a motor generates large torque. Removal of unnecessary fluxes can reduce the fluxes in the salient stator and rotor poles and in the magnetic paths. Accordingly, magnetic saturation is unlikely to occur and thus large peak torque can be obtained. Also, reduction in the unnecessary fluxes may lead to the reduction of inductance leakage. Therefore, the power factor can be improved, which may also lead to the improvement of the efficiency. Since the power factor can be improved, current capacity of a power transistor for driving the motor can be reduced, leading to possible reduction in the size and cost of a drive unit. One of the causes for limiting multipolarization in the inventive motors, stepping motors, switched reluctance motors and the like resides in the flux leakage described above. Thus, reduction of the flux leakage may raise the limitation in the multipolarization and may enhance torque. In case the flux leakage can be reduced using permanent magnets, the indent of the salient poles can also be reduced to provide variation in the magnetic resistance. Resultantly, reduction of the motor size or high torque can also be realized.

Although it depends on the purpose or usage of a motor, peak torque of a motor is a very important property and is usually in close relation with the limitation in the motor-size reduction. As a mater of course, peak torque also relates to the cost of a motor.

The shapes of the permanent magnets 473 and 480 can be modified as in the case of the permanent magnets 475, 476, 477 and 478. Flux leakage may also occur in directions 47A and 47B to produce harmful magnetic fluxes. Permanent magnets for reducing flux leakage can also be arranged at both circumferential side faces of the salient poles and at a back yoke side to attain more effectiveness.

Alternatively, since centrifugal force works on the rotor side, permanent magnets may be arranged only at the stator-side salient poles. Alternatively, the elongated holes 479 or the like mentioned above may be parallelly provided. In particular, a motor of high-speed rotation may effectively employ the elongated holes 479 for the limitation of the fluxes, without using permanent magnets on the rotor side.

Figure 54:
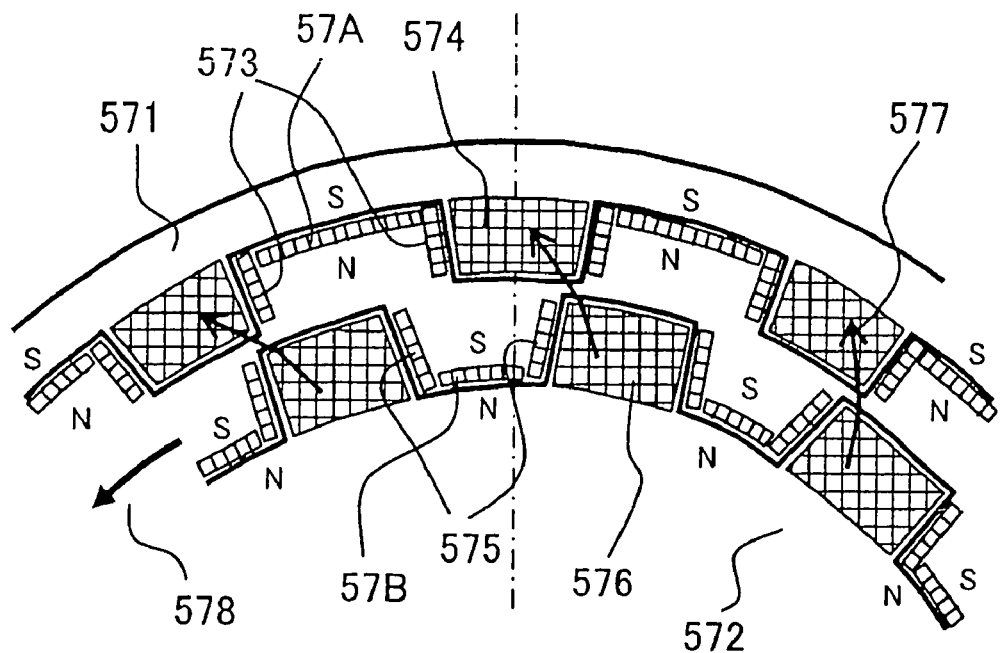
FIG. 54 illustrates a configuration, in which permanent magnets are arranged throughout the circumference except the an air gap portion where salient rotor poles and salient stator poles are opposed to each other, being oriented so as to reduce flux leakage.

FIG. 54 shows an example, in which permanent magnets for reducing flux leakage are arranged in all directions of the salient stator poles, except for end portions facing the rotor. In a stator 571, permanent magnets 573 are arranged at circumferential faces of the salient stator poles, permanent magnets 57A are arranged between the individual salient stator poles on the side of the back yoke, and permanent magnets 574 are arranged at faces of the salient stator poles in the rotor shaft direction. Each of the permanent magnets is oriented so that the magnetomotive force of the permanent magnet is produced in a direction opposite to the direction of the magnetomotive force produced by the current passing through each winding. In the same fashion, a rotor 572 is arranged with permanent magnets 575, 5713 and 576 to reduce flux leakage. Thus, portions that permit passage of magnetic fluxes between the stator and the rotor are limited to the end portions of the salient stator and rotor poles. By providing such a structure, unnecessary and harmful magnetic fluxes can be reduced, or, in particular, peak torque of the motor can be increased.

Figure 55:
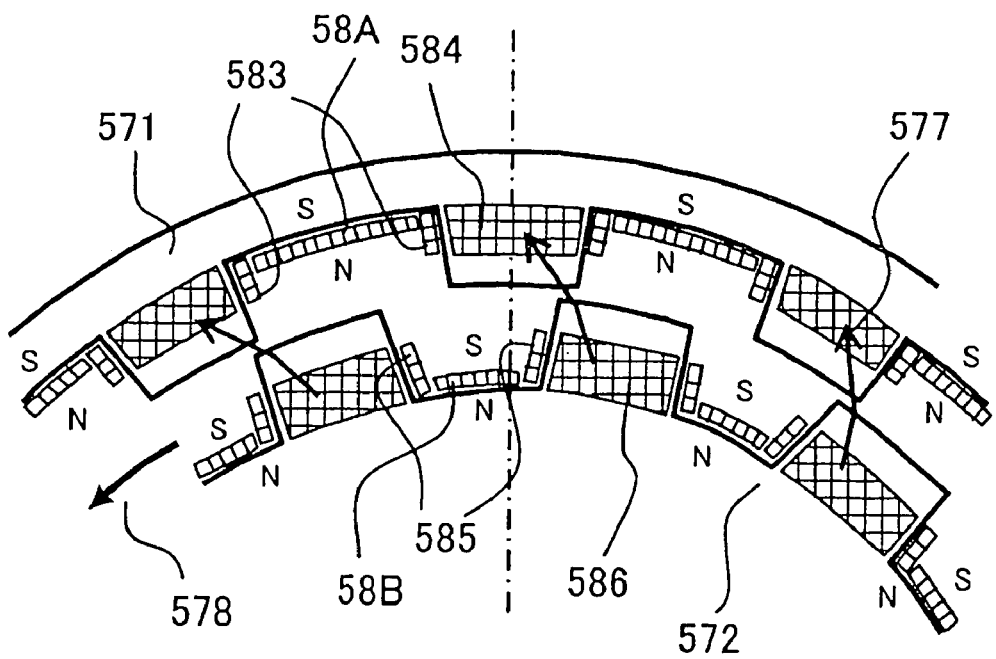
FIG. 55 illustrates a configuration, in which the permanent magnets located in the vicinities of the air gap portion in FIG. 54 are removed.

FIG. 55 shows a motor, in which the permanent magnets mounted on the motor shown in FIG. 54 are partially removed from the vicinity of each salient pole. Radial length of each of permanent magnets 583, 584, 585 and 586 is shortened. Since a large magnetomotive force caused by the current passing through each winding works on the vicinity of an end portion of each salient pole, demagnetization is likely to occur in the permanent magnets. This may raise a problem in the amount, such as thickness, of permanent magnets and a problem of cost. Considering these problems, this example does not provide permanent magnets in the vicinity of the end portion of each salient pole. The magnetic fluxes in the vicinity of the end portion of each salient pole have a large percentage of effectively working on the torque generation. This is one of the reasons for constituting the motor shown in FIG. 55.

Such an arrangement of the permanent magnets for reducing flux leakage is made for flux components passing through spaces. Thus, since magnetic resistance of the magnetic paths including the permanent magnets is large, the permanent magnets do not necessarily have to be brought into close contact with soft-iron portions. The permanent magnets may be arranged being spaced from the soft-iron portions as in the case of the permanent magnets 473 and 480 shown in FIG. 52. Support members for magnets may be arranged around the salient stator poles, for fixation of the magnets. As a specific example, recesses in the indented portions around the salient stator poles may be filled with resin together with magnets. The same applies to the side of the rotor.

In case of driving motors for electric vehicles or hybrid electric vehicles, forward driving torque is required to be large. However, in case where regenerative torque is less large, which is represented by the motor shown in FIG. 52, there may be a choice of attaching the permanent magnets 473 and 480 but of attaching no permanent magnet to the other side of each salient pole. This is a practical configuration satisfying desired performance and realizing low cost.

Contrarily, the permanent magnets may be brought into close contact with the soft-iron portions as shown in FIGS. 54 and 55. In particular, sintered permanent magnets may be stuck with an adhesive. Alternatively, so-called bonded magnets obtained by adding resin or the like to powder magnet may be stuck to the soft-iron portions. In particular, in a small motor, it is effective to mold permanent magnets using a mold and to stick these permanent magnets. In particular, injection molders or molders analogous thereto for plastics or the like can be utilized. This utilization is practical from the viewpoints of mass productivity and manufacturing cost.

Figure 53:
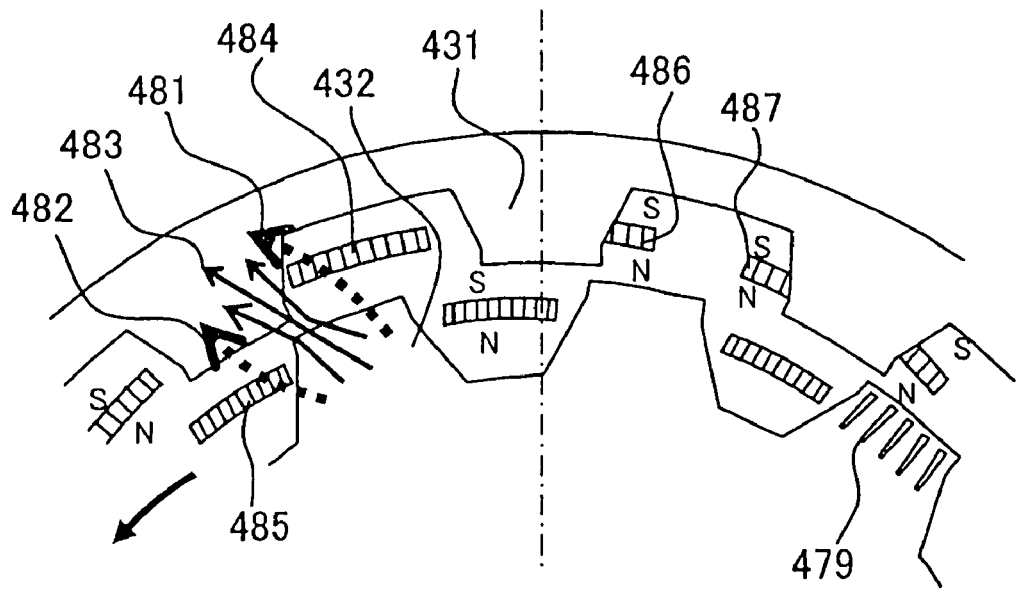
FIG. 53 illustrates a configuration, in which permanent magnets are arranged in the vicinities of an air gap portion where salient rotor poles and salient stator poles are opposed to each other, being oriented so as to reduce flux leakage.

FIG. 53 shows an example of a motor, in which permanent magnets 484, 485, 486 and 487 are arranged in the vicinities of air gaps made at the portions where the stator and rotor poles face with each other. An arrangement is so made that magnetic fluxes 483 effectively generating torque are little affected directly and that unnecessary magnetic fluxes 481 and 482 are reduced. A specific method that can be considered for holding the permanent magnets is to perform molding with resin by allowing magnets to be included therein. Other various fixing means can be considered.

Figure 56:
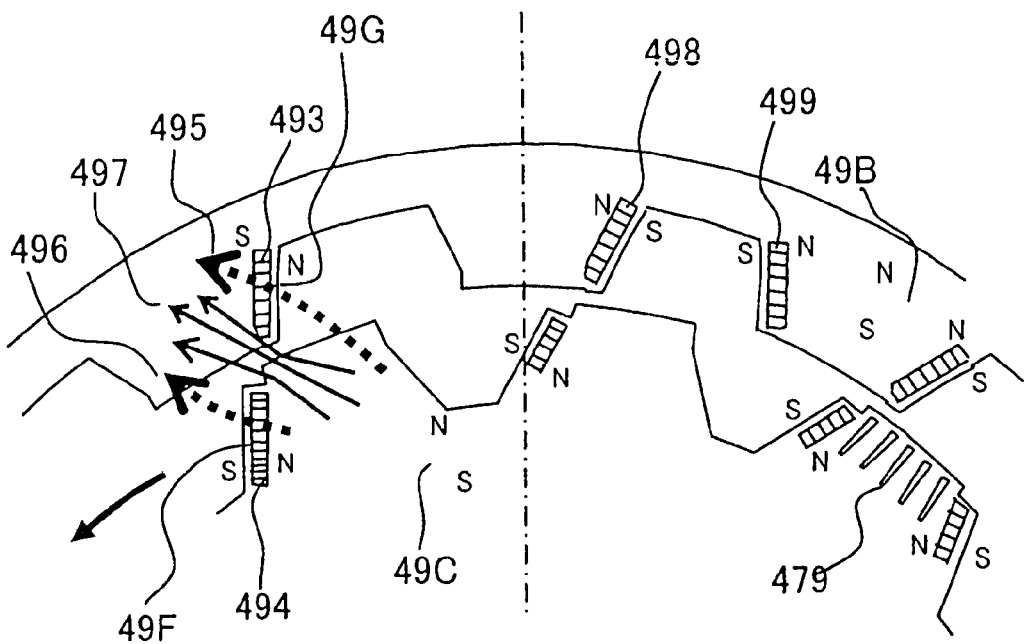
FIG. 56 illustrates a configuration, in which permanent magnets for reducing flux leakage are arranged inside salient stator poles and salient rotor poles.

FIG. 56 shows an example, in which permanent magnets, such as the permanent magnets 473, 475 and 476 of the motor shown in FIG. 52 are arranged inside the cores of the salient stator poles, and in which permanent magnets, such as the permanent magnets 480, 477 and 478, are arranged inside the cores of the salient rotor poles. Permanent magnets 493 and 494 for reducing unnecessary magnetic fluxes 495 and 496 are arranged inside the core of the salient stator pole and inside the core of the salient rotor pole, respectively. In particular, the permanent magnets 494 and 493 are structured so as to be supported by narrow soft-iron portions 49F and 49G, respectively, the narrowness being of a level that does not give large magnetic influences. Such a structure may readily enable fixture of the permanent magnets. Permanent magnets of other examples 498, 499 and 49B are also arranged inside the cores.

Figure 57:
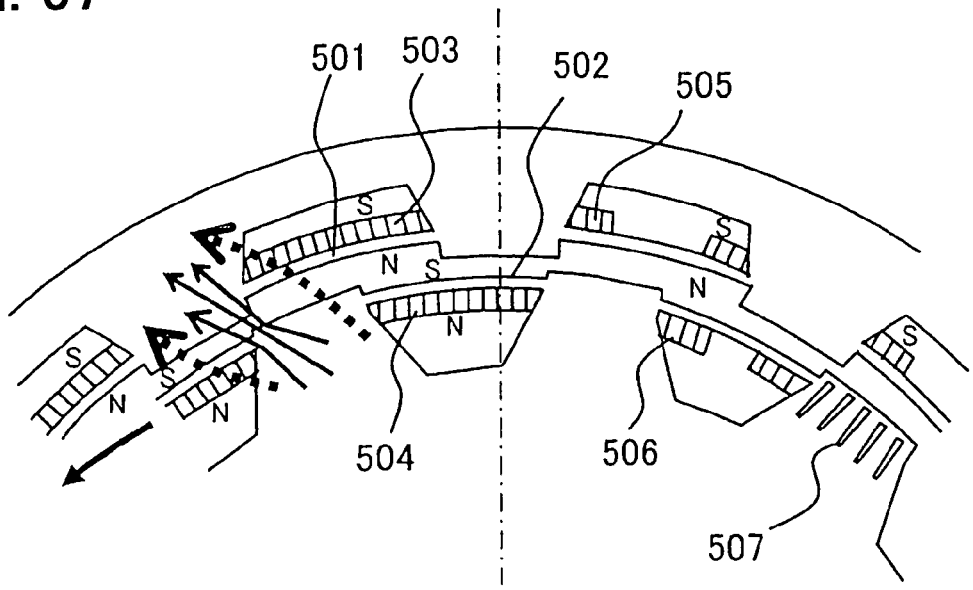
FIG. 57 illustrates a configuration, in which permanent magnets for reducing flux leakage are arranged inside salient stator poles and salient rotor poles.

FIG. 57 shows an example, in which the permanent magnets 484, 485, 486, 487 and the like of the motor shown in FIG. 53 are arranged inside the cores of the salient stator poles. Permanent magnets 503, 505, 504 and 506 are arranged inside soft-iron portions 501 and 502, facilitating fixture of the magnets.

As shown in FIGS. 52 to 57, reduction of unnecessary flux leakage utilizing permanent magnets may reduce magnetic fluxes at the salient poles, back yoke and the like of the motor and thus may mitigate magnetic saturation, whereby the maximum limited torque can be enhanced. The reduction of unnecessary magnetic fluxes may also improve the power factor of the motor. Further, where the indents of the salient poles can be made smaller by arranging the permanent magnets, it is possible to realize reduction in the size of the motor.

Hereinafter will be described a method for reducing the unnecessary magnetic fluxes 471 and 474 shown in FIG. 52. The method involves use of conductive plates or rings, or closed windings instead of the permanent magnets 473 and 480. The method utilizes an interaction that, when the magnetic flux at the portion 473 fluctuates, eddy current passes through the conductor so as to prevent the fluctuation of the flux. When the motor is in low-speed rotation, this method is not so effective because the rate of fluctuation is small. However, at a speed of more than a certain level, the rate of fluctuation of the magnetic fluxes becomes high to effectively reduce the fluxes 473, 474 and the like. The same effect can be achieved in the motors shown in FIGS. 43, 54, 55, 56 and 57 by replacing the permanent magnets with conductors.

Figure 59:
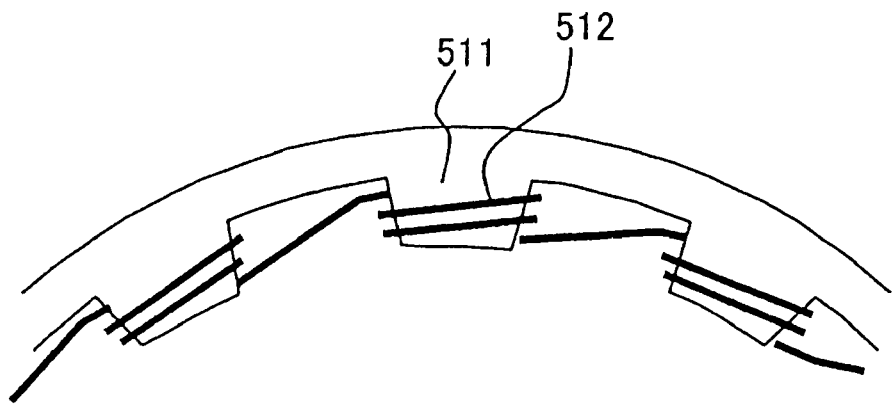
FIG. 59 illustrates a structure, in which salient stator poles are imparted with turns of windings.

FIG. 59 shows another example of the present invention. Taking the motor shown by FIG. 12(a) as an example of the present invention, the salient rotor and stator poles 31 and 32 correspond to the salient rotor and stator poles 432 and 431 of FIG. 52, respectively. Upon supply of large current to the loop winding 39, unnecessary magnetic fluxes, such as the magnetic fluxes 471 and 474 shown in FIG. 52, also are problematically caused around the salient poles. In other words, although the simplified shape of the loop winding can effectively simplify fabrication and reduce copper loss, the leaked flux components (I)L may be problematically increased.

One method for reducing this problem may be to provide a winding 512 in series, as shown in FIG. 56, in addition to the loop winding 39 shown in FIG. 12(a), the winding 512 being wound about salient poles 511. When current is supplied to the winding 512, leaked fluxes may be interlinked with the winding 512 together with the effective flux components 472 shown in FIG. 52. However, there is presented a feature that the unnecessary magnetic fluxes 471 and 474 passing from the rotor side to the stator side are comparatively small. On the other hand, the large length of the winding 512 creates a problem of increasing copper loss.

Current may be supplied to the winding 512 by having the loop winding 39 serially connected thereto, so that both of the windings may allow a magnetomotive force to work between the salient stator and rotor poles. Through this method, torque can be obtained and unnecessary magnetic flux components may be reduced. As another method, current may be supplied to the winding 512 only when large current is supplied to the winding 39. As still another method, the motor may normally be driven by the winding 39, and at the time of high current, the drive unit may be switched from the winding 39 to the winding 512 to drive the motor.

Figure 49:
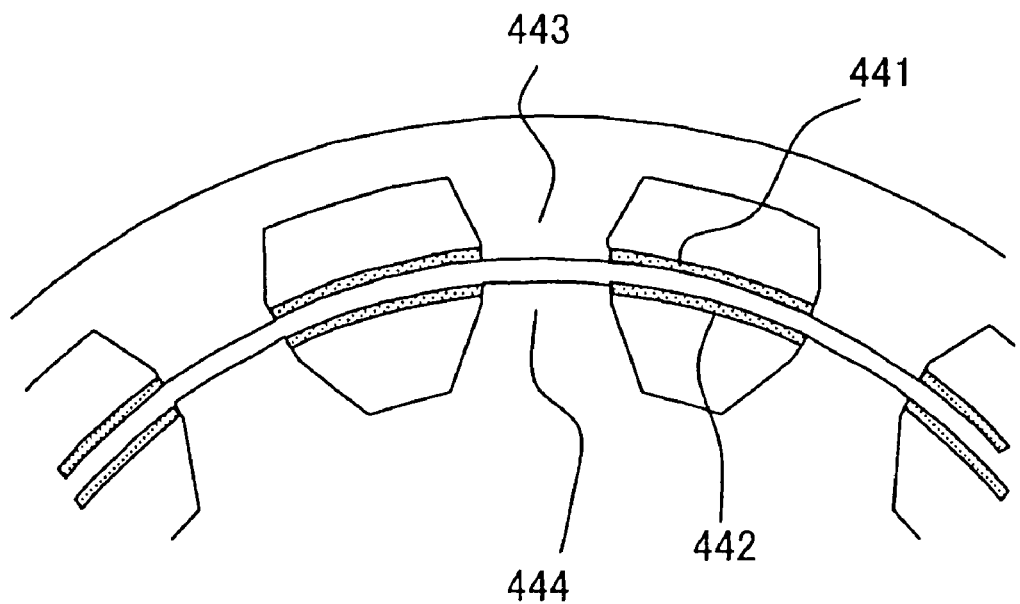
FIG. 49 illustrates an example of the configurations of salient stator poles and salient rotor poles whose recessed portions are smoothed.

Hereinafter will be described a method for reducing windage loss when the motor of the present invention is driven with high-speed rotation. As shown in FIG. 49, members 441 may be added at the inner-diameter side of the salient stator poles to provide a cylindrical shape with a smooth inner surface. Alternatively, members 442 may be added at the outer-diameter side of the salient rotor poles to provide a cylindrical shape with a smooth outer surface. Addition of both of the members 441 and 442 may be available. Further, the members 441 and 442 may be fabricated with the same material as a stator core 443 or a rotor core 444 and may be narrowed to an extent that will not cause a problem of electromagnetic harmful effect. Since the members can be made concurrently with fabrication of each core, this may bring an advantage in terms of cost. It is also possible to provide the arrangement of the magnets as shown in FIG. 55. In this case, a support portion of each magnet may have a strong structure to an extent of enabling support.

Hereinafter will be described a motor structure which can enhance the rotating torque in one direction in particular, among the rotation directions of the motor. As described above, the three-phase reluctance motor shown in FIG. 13 may be enhanced in the rotation performance by forming the salient rotor and stator poles into the shapes as shown by (b) of FIG. 14. Also, as described above, the four-phase reluctance motor shown in FIG. 16 can be enhanced in the rotation performance in one direction, by enlarging the widths, in the rotor shaft direction, of the salient rotor and stator poles toward mutually opposite directions, as shown by the salient rotor and stator poles 67 and 68 in FIG. 17. In this way, in order to enhance the output torque in one direction, the circumferential shapes of the salient rotor and stator poles may be made uneven for fluctuation of the magnetic impedance between both of the salient poles according to the rotational position. Further, at this moment, by creating phase difference in the magnetic impedance from other-phase salient rotor and stator poles, reluctance torque may be enhanced. The salient poles may be imparted with magnetic properties not only by simply changing the shapes of the salient poles but also by allowing the salient poles to have recesses, or by using materials having different magnetic permeability.

Figure 58:
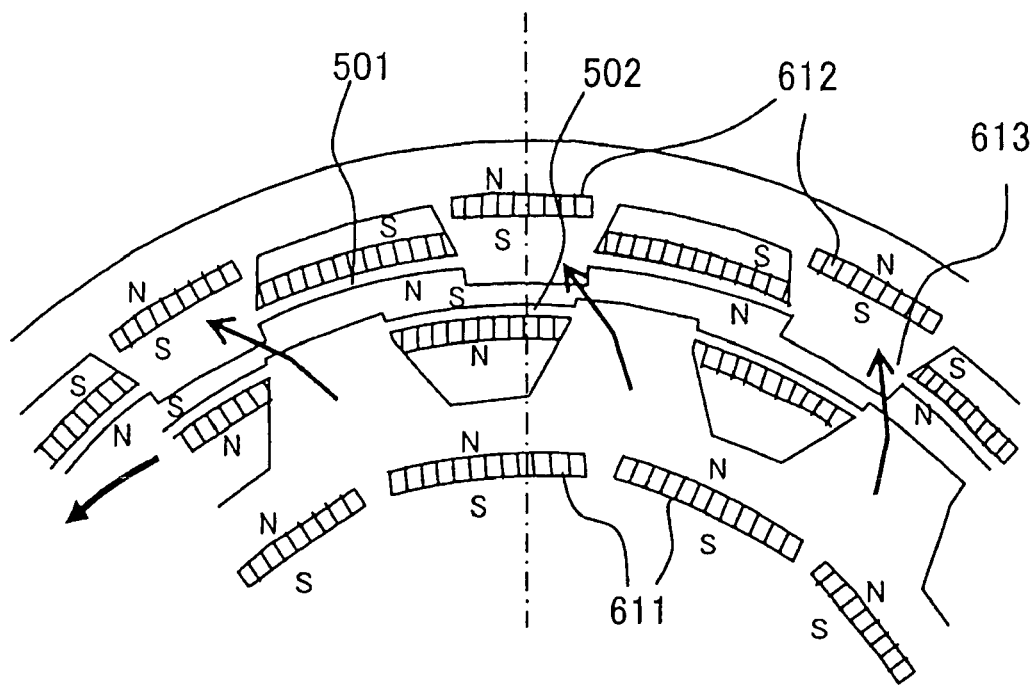
FIG. 58 illustrates a motor configuration having a structure for exciting flux components that generate torque, by using permanent magnets.

Referring now to FIG. 58, a method for improving motor efficiency of the inventive motor will be described. The motor shown in FIG. 58 has a configuration of the motor shown in FIG. 57 with the addition of permanent magnets 611 and 612. The permanent magnets 611 and 612 are arranged so that N-poles are directed from the inner peripheral side to the outer peripheral side, i.e. are directed to a direction for exciting magnetic fluxes 613 by the currents of the windings. By arranging the permanent magnets so as to be directed to a direction for exciting magnetic fluxes, in case of the motor shown by (a) of FIG. 12, for example, the currents supplied to the windings 39, 40 and 41 can be reduced. That is, the excitation currents of the magnetic circuits of the motor are partially owed by the permanent magnets. Thus, the power factor of the motor may also be improved.

Cogging torque ascribed to the permanent magnets when the currents are zeroed may be smoothed by magnetically balancing the phases A, B and C. Generally, the effect of reducing copper loss at the time of low current and low loading is larger than the effect attained at the time of high current. In an application where temporal rate of light loading is high and where importance is placed on efficiency, more effect can particularly be exerted.

This property is particularly important in case where the motor of the present invention is utilized in an operation under constant-power control with high-speed rotation. Taking a motor having a working revolution range of 0-10,000 rpm as an example where base revolution is 2,500 rpm, a rated voltage is reached at 2,500 rpm. Accordingly, at 7,500 rpm, operation and control have to be performed with ⅓ of average magnetic fluxes. Under such circumstances, the reluctance motor tends to have low power factor because of the relationship between the magnetic energy and the co-energy. If magnetic fluxes of the motor can be provided by the permanent magnets in this operation region, the power factor in such high-speed rotation can be improved.

Figure 60:
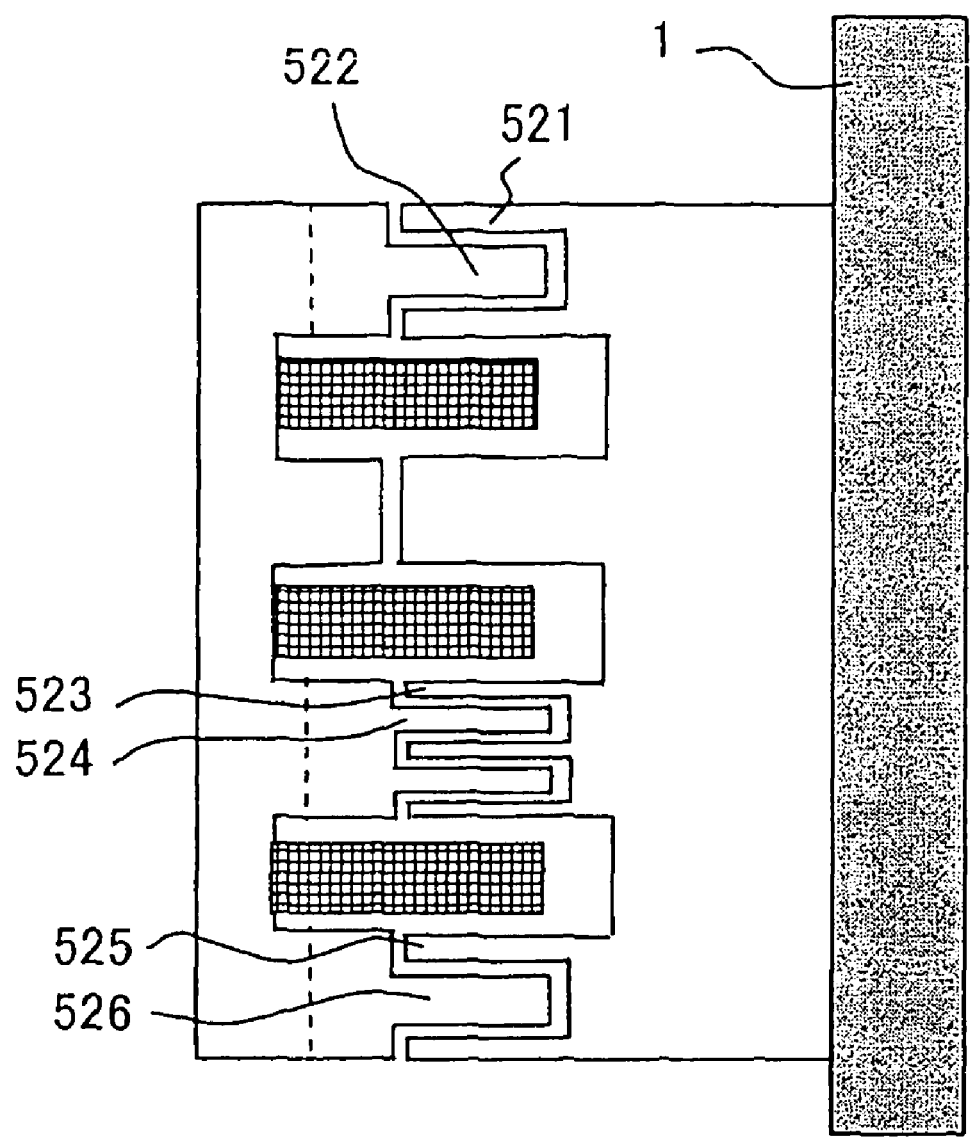
FIG. 60 illustrates a motor configuration, in which salient stator poles and salient rotor poles are radially projected to each other.
Figure 61:
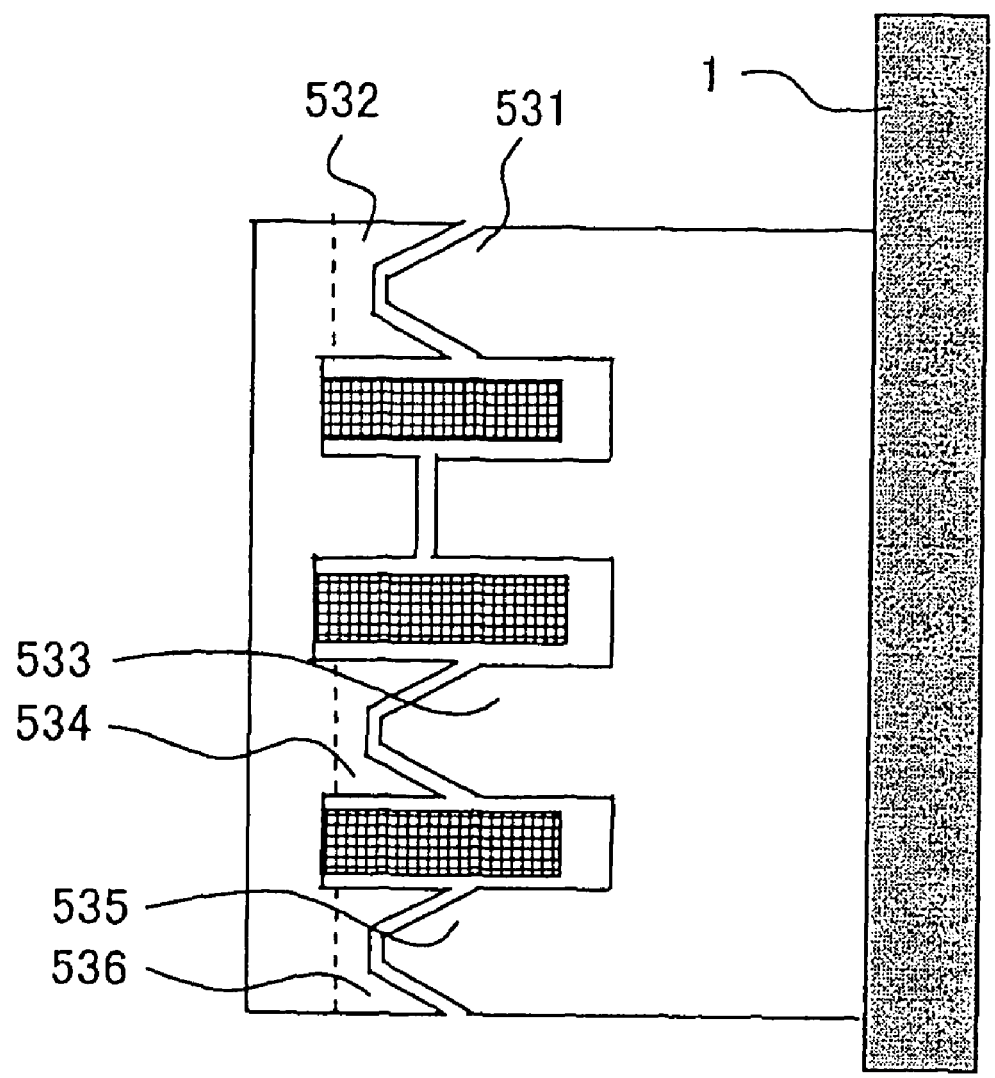
FIG. 61 illustrates a motor configuration, in which salient stator poles and salient rotor poles are radially projected to each the other.

Hereinafter will be described a method for attaining high torque and high output in the motor of the present invention. As indicated by Equations (1) to (5), the torque of the inventive motor is in proportion to $d\phi/d\theta$. Each of FIGS. 60 and 61 shows a specific example of a motor structure for increasing $d\phi/d\theta$. Each of these examples has been obtained by modifying the salient rotor poles 31, 33 and 35 and the salient stator poles 32, 34 and 36 shown by (a) of FIG. 12. Since a saturation flux density BM of the soft magnetic material is limited, increase in a magnetic flux (I) passing through the salient poles of each phase can be achieved on condition of providing a structure where facing areas between the salient stator and rotor poles are large and where no magnetic saturation is caused in the magnetic circuits of the motor at other portions.

In the motor shown in FIG. 60, in order to enlarge the facing areas between salient rotor poles 521, 523 and 525 and salient stator poles 522, 524 and 526, respectively, a cross section of each salient stator pole in the rotor shaft direction has a projected shape as shown in FIG. 60, and a cross section of each salient rotor pole in the rotor shaft direction has a recessed shape as shown in FIG. 60. Comparing with the motor shown by (a) of FIG. 12, this structure of the motor shown in FIG. 60 can achieve large facing areas between the salient stator and rotor poles. Accordingly, dφ/dθ can be increased to thereby increase torque.

In a motor shown in FIG. 61, each of salient rotor poles 531, 533 and 535, and salient stator poles 532, 534 and 536 has a cross section in the rotor shaft direction, taking a trapezoidal shape close to triangle as shown in FIG. 61. This structure also may exert the same effect as the example shown in FIG. 60 in a simple theory. Further, as far as the magnetic saturation in the vicinities of the salient rotor and stator poles is concerned, the shape shown in FIG. 61 is excellent in that it is unlikely to cause magnetic saturation.

Figure 62:
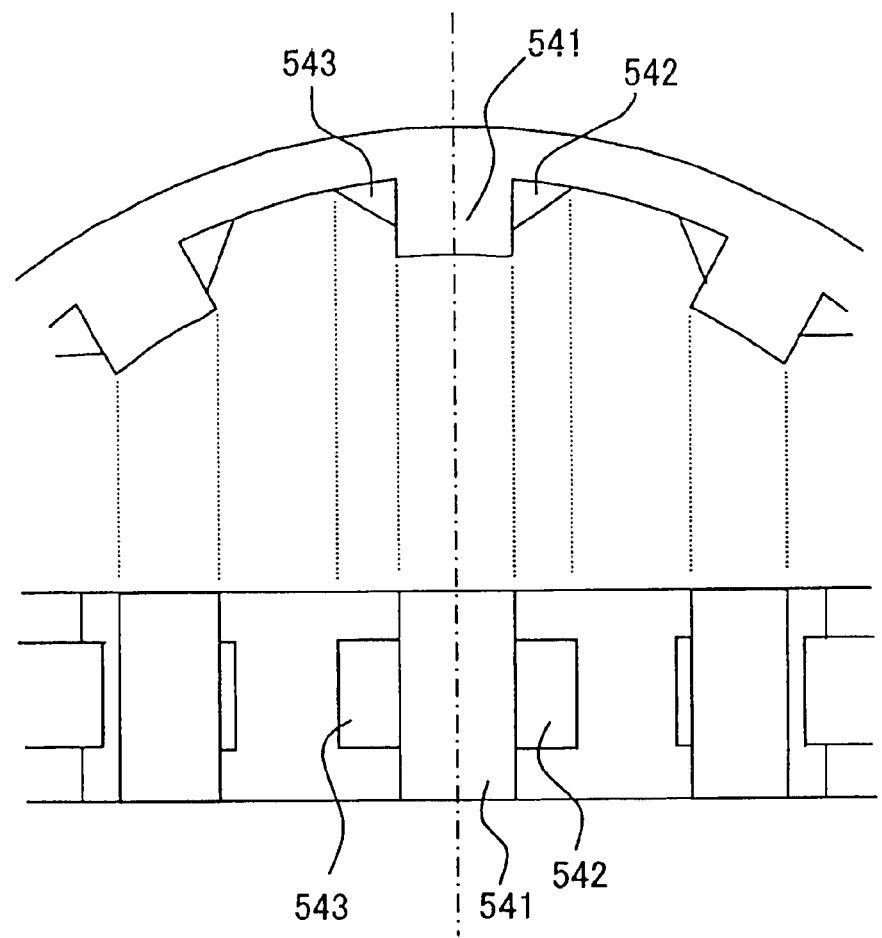
FIG. 62 illustrates an example of a shape of each salient stator pole.

Hereinafter will be described a method for reducing magnetic saturation at magnetic paths in the inventive motor. An upper part of FIG. 62 is a side view of a stator core and a lower part of FIG. 62 is a bottom view of the stator core. Indicated by numeral 541 are salient stator poles and by 542 and 543 are bulged portions at a base of each salient stator pole. Thus, magnetic resistance of a magnetic path can be reduced with the enlargement of a cross sectional area of the magnetic path by utilizing each salient stator pole 541 along the circumference. Each of the bulged portions 542 and 543 has a shape in the rotor shaft direction, which has a portion near the center of each salient stator pole as a main portion, with both ends in the rotor shaft direction being recessed more than the salient stator pole 541. Thus, flux leakage caused involving the opposed salient rotor pole can be reduced. Further, in case other-phase magnetic circuit is adjacently arranged in the rotor shaft direction, this shape may contribute to avoiding excessively large flux leakage caused involving the adjacent magnetic circuit.

The salient poles may be structured by combining the grooved pole shapes as shown in FIGS. 60 and 61, and the shape shown in FIG. 62 as well as the concepts thereof.

Figure 63:
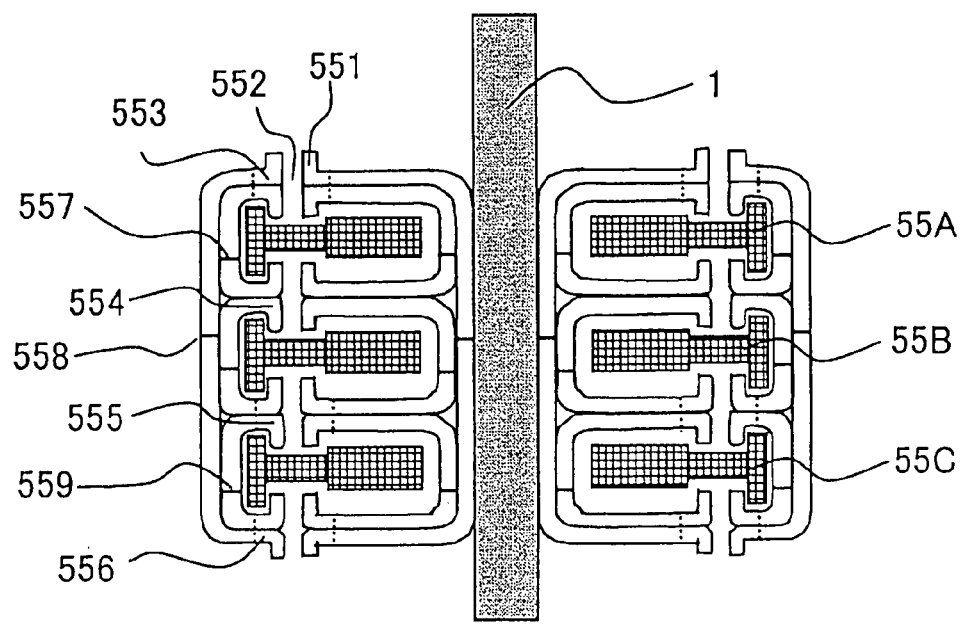
FIG. 63 is a vertical cross section illustrating an example of a motor, in which each soft magnetic portion is formed by press-cutting and press-molding electromagnetic steel plates.

Referring to FIG. 63, hereinafter will be described an example of fabricating the inventive motor with parts obtained by drawing electromagnetic steel plates by using a mold. The motor shown in FIG. 63 has the same electromagnetic basic configuration as the motor shown by (a) of FIG. 12. Indicated by numeral 551 are A-phase salient rotor poles, by 553 are A-phase salient stator poles and by 552 are air gap portions therebetween. Indicated by numeral 554 are magnetic paths for passing magnetic fluxes, by 555 are B-phase salient stator poles and by 556 are C-phase salient stator poles. Circumferential lateral configurations of these elements are as shown in FIG. 9. In FIG. 63, these are indicated by broken lines.

The example of the motor shown in FIG. 63 is made up of electromagnetic steel plates molded with salient stator poles, a stator back yoke, rotor poles and a rotor back yoke, as well as a rotor shaft 1. For facilitating molding of the electromagnetic plates, the electromagnetic steel plates have been separated at joints 557, 558, 559 before being butted. The magnetic path at each of the portions is made up of two electromagnetic plates, in which it is so configured that the butted portion does not coincide with a butted portion of an adjacent electromagnetic steel plate. Thus, it is so configured that magnetic fluxes can also sneak around from an adjacent electromagnetic steel plate, against the fluctuation of the magnetic resistance due to an air gap at the butted portion. This configuration can mitigate increase of magnetic resistance and can reduce magnetic resistance variation caused by the variation in the butting accuracy.

Indicated by 55A, 55B and 55C are windings for the individual phases. These windings work in the same fashion as in the motor shown by (a) of FIG. 12, and the electromagnetic effect is also principally the same.

The butted portions can be removed from the rotor if only bobbins are mounted after assembling rotor-side electromagnetic plates into the rotor shaft 1 and the windings are wound about the bobbins from the outer peripheries thereof. There may be other possible ways for removing the butted portions by contriving the assembling order of the winding coils and the method for molding the electromagnetic steel plates.

The motor configuration as shown in FIG. 63 can be fabricated by cutting and drawing electromagnetic steel plates by using a mold, and thus can be fabricated with high productivity and reduced cost. Particularly high productivity may be exhibited in case where a motor size is as small as can constitute each magnetic path with a thickness of one electromagnetic steel plate. In addition to having the electromagnetic properties, the electromagnetic steel plates to be used are required to be a material excellent in molding properties. The motor shown in FIG. 63 is only an example. Each of the parts fabricated with the electromagnetic steel plates is required to have a structure and a shape carefully considered in terms of the feasibility of drawing process, and the convenience of assembling the rotor shaft and the winding 553 as well as the bearing, motor case and the like. In the motor configuration, each of the parts may be structured with three or more electromagnetic steel plates.

Figure 64:
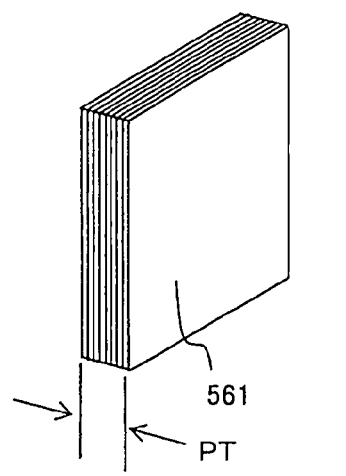
FIG. 64 illustrates configurations, in each of which electromagnetic steel plates and amorphous films are stacked.
Figure 64:
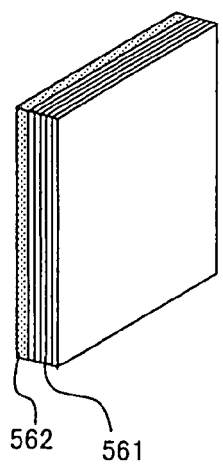
Figure 64:
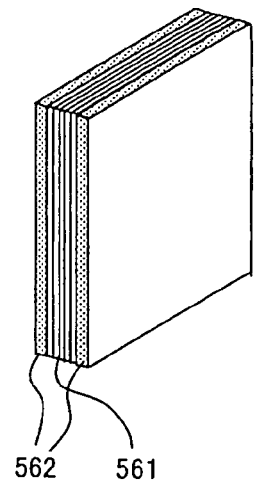

With reference to FIG. 64, a description will be given on the soft magnetic material making up the inventive motor. FIG. 64 shows by (a) an amorphous stack. Amorphous is also referred to as amorphous metal and is particularly excellent in high frequency properties because iron loss is small. However, considering a certain property of amorphous, that is, a property of being a soft magnetic material film with a thickness of about 25 micrometers, better efficiency may be achieved in the fabrication of motors, if a certain number of the amorphous films are stacked using an adhesive or the like to have an obtained stack 561 had a certain thickness before processing and assembling. The processing and assembling may be conducted by pasting a normal electromagnetic steel plate 562 at one side or both sides of the amorphous stack 561 to obtain a form as shown by (b) or (c) of FIG. 64. Thus, a composite material can be obtained by pasting the amorphous stack 561 and the electromagnetic steel plate 562, or rather, amorphous films can be stacked by using, as a base plate, the electromagnetic steel plate 562 having a certain strength. This composite material exerts good punching quality in a punching process using a metal pattern. A motor completed using this composite material will have a feature, for example, of having composite properties, i.e. a property of high flux density inherited from the electromagnetic steel plate 562 and a property of low iron loss inherited from the amorphous stack 561.

Specific measures for realizing three-dimensional magnetic paths may include use of a dust core as a soft magnetic material member of the inventive motor, the dust core having no limitation in the flux directions.

The motor shown in FIG. 26 has a stator core 224 which is provided with a cooling path 225. A mixture of gaseous matters, such as air and gases, or liquid, such as water and oil, or mist, may be passed through the cooling path 225 to cool the motor.

In particular, in case of an outer-rotor motor having stator windings arranged close to the center of the motor, simple cooling means may be provided in the vicinity of the center of the motor to realize effective motor cooling at low cost. In case of an outer-rotor motors having a heating portion arranged inside of the motor, cooling efficiency is generally low. For such an outer-rotor motor, the above measure may provide a potent method for resolving the problem. When a cooling medium cooled to a low temperature is passed through the cooling path 225, the motor can be more effectively cooled. The cooling path 225 may be constituted with a pipe such as of metal or resin. In case of loading a motor on an automobile for driving, the motor and a drive unit are mostly integrated or are arranged close to each other. In this case, cooling of the drive unit and cooling of the motor can be conducted in a serial connection.

FIG. 26 shows an example, in which each of the windings 219 and 220 is made up of a metal pipe having a circular cross section. The motor can be cooled by passing a cooling mixture of gaseous matters, liquid, or mist through a center hole of the metal pipe.

Suitable materials for the metal pipe include copper and aluminum. Copper has high electric conductivity but also has large specific gravity. Therefore, when weight reduction is highly required, aluminum or aluminum alloy may be used to satisfy the purpose. Since the electric conductivity of aluminum is not so high as that of copper, a heat generation problem may be covered up with the metal pipe and a cooling medium. The winding 221 in FIG. 26 shows an example of a square-shaped metal pipe. Comparing with the circular metal pipe, the square metal pipe can more efficiently utilize the spaces between the turns of the winding located in a slot.

Figure 87:
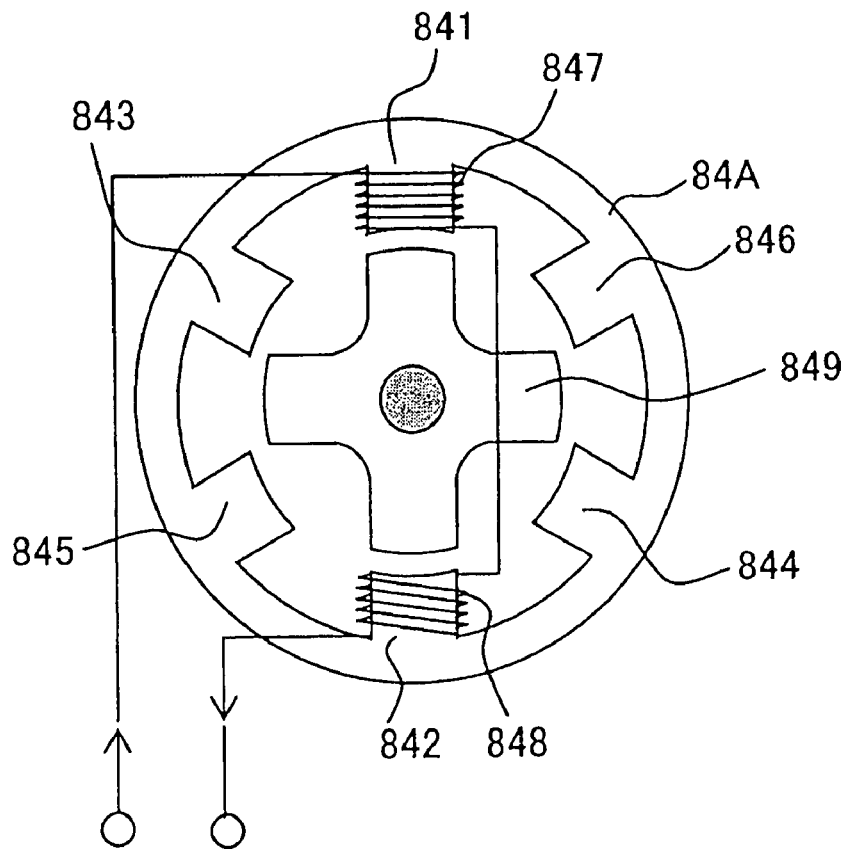
FIG. 87 is a schematic vertical cross section illustrating a conventional switched reluctance motor.

In case of a conventional motor as shown in FIG. 87, use of a copper pipe as a winding has not been practical because of the use of small-diameter windings. For multipolarization of the motor shown in FIG. 87, as can be imagined from its cross section, each space of a slot for arranging a winding may necessarily become further smaller. However, the motor of the present invention can structurally facilitate multipolarization of the motor. In addition, the multipolarization does not entail reduction of the slot form for arranging each loop winding. The slot form remains unchanged. As can be seen from Equation (2), the voltage of a winding is in proportion to the angle rate $d\Psi/d\theta$ of the number of interlinked fluxes $\Psi$. Accordingly, multipolarization will allow the angle rate $d\Psi/d\theta$ of the number of interlinked fluxes $\Psi$ to become large in proportion to the number of poles, necessitating reduction in the number of turns of each phase winding. As a result, multipolarization of the inventive motor can reduce the number of turns of each winding. Thus, the winding to be provided at each slot in FIG. 26 may have a large diameter comparing with the conventional motor. Further, the inventive motor can use simple loop windings. Consequently, the motor of the present invention can practically install a winding of a metal pipe that can also serve as a cooling mechanism. It should be appreciated that the method of performing both current supply and cooling with a metal pipe, can be applied to various motors of the present invention.

The cooling method utilizing a conductor of a metal pipe may involve a problem of electrical insulation. This necessitates the use of a cooling medium having high electrical insulating properties. Use of high-pressure air as a cooling medium requires a filter for avoiding entry of foreign matters. Use of cooling water requires a scheme for keeping the electrical conductivity of the water at a low level. Use of cooling oil is comparatively easy because oil has low electrical conductivity. An end of each winding is connected with a power supply line. In addition to that, an end of each winding requires treatment that enables charge and discharge of a cooling medium while keeping the electrical insulation at a certain level.

Figure 65:
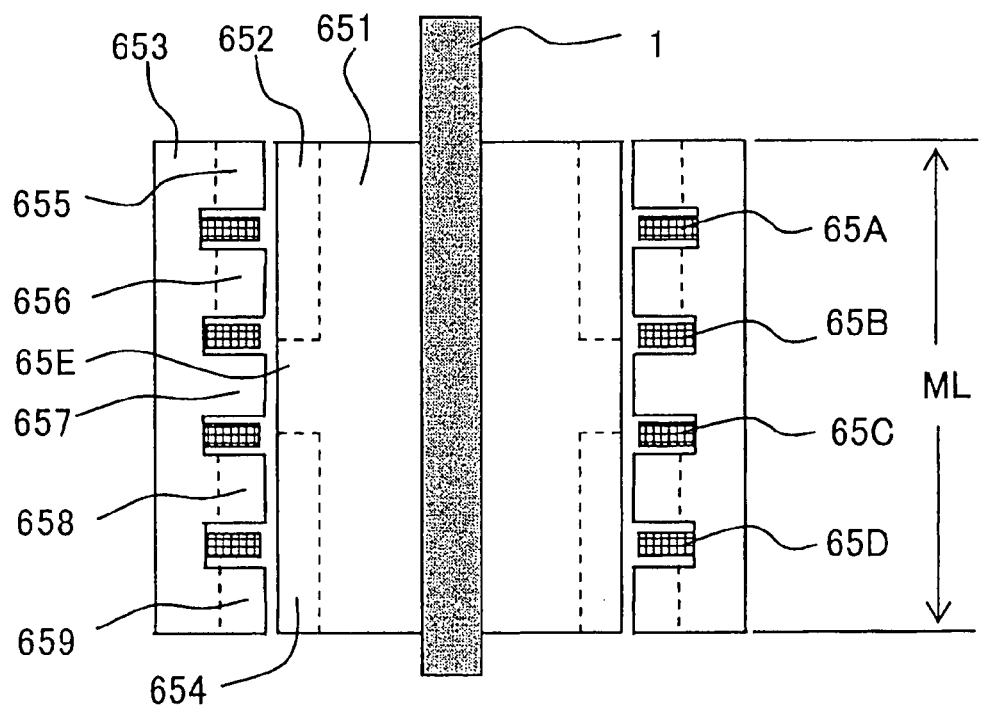
FIG. 65 is a schematic vertical cross section illustrating a four-phase motor having loop windings.
Figure 66:
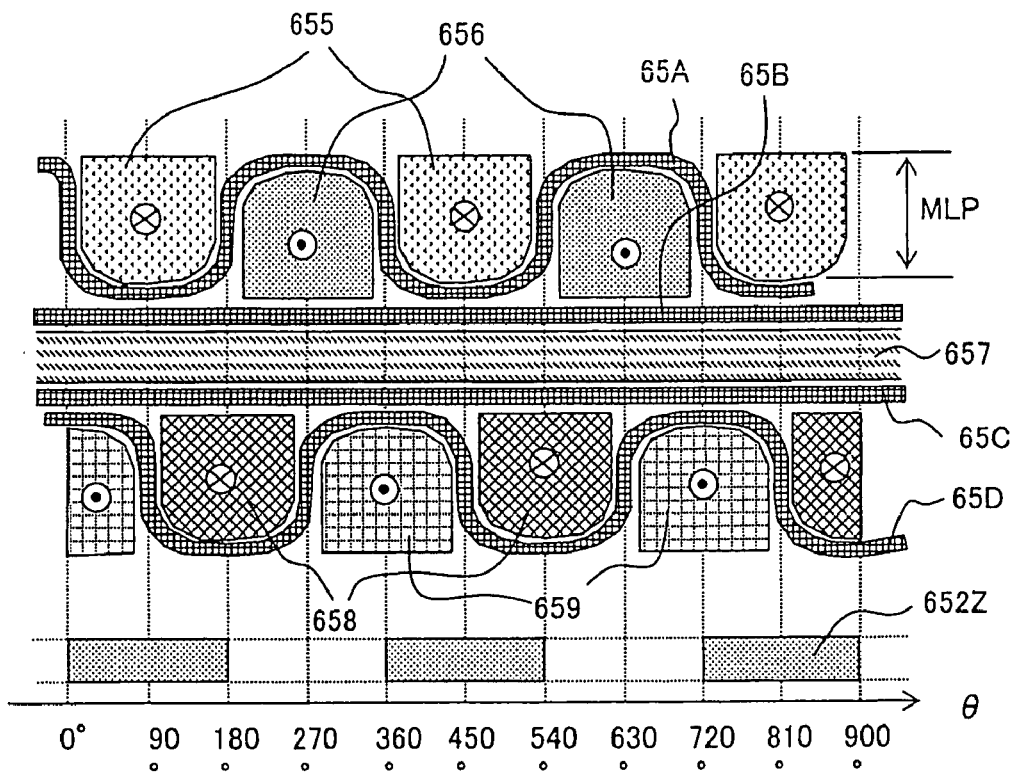
FIG. 66 is a linear development illustrating a configuration including modification in each shape of a salient stator pole and each loop winding.

Hereinafter, an explanation will be focused on a length MLP of each stator pole in the rotor shaft direction, in each of the phases of the motor of the present invention. Each of FIGS. 65 and 66 shows the four-phase motor shown in FIG. 15 with an example of modifications in the shapes of the salient stator and rotor poles and the windings of the motor. Indicated by ML in FIG. 65 is a length of the stator in the rotor shaft direction. Indicated by numeral 655 are A-phase salient stator poles, by 656 are B-phase salient stator poles, by 658 are C-phase salient stator poles and by 659 are D-phase salient stator poles. The figure roughly shows the arrangement, and a specific configuration is shown in FIG. 66. FIG. 66 is a linear development of a circumferential configuration of individual portions in an air-gap plain where the stator and the rotor face with each other. The horizontal axis indicates a rotational angle $\theta$ in electrical angle, and the vertical axis indicates the rotor shaft direction. As shown in FIG. 66, each of the stator poles of each phase has a larger configuration in rotor shaft direction than the configuration shown in FIG. 65, being mutually protruded along the side of each adjacent stator pole. Each stator pole has a length MLP in the rotor shaft direction. When the number of phases N is "4", a relation MLP>ML/N=MLP/4 is established. While the cross section shown in FIG. 65 have this relation MLP>ML/N=MLP/4 because of the necessity of spaces for the windings, the mutual protrusion along the side of the adjacent stator poles can allow the length MLP to be large. Positive and negative marks indicated at the salient stator poles in FIG. 66 indicate the directions for passing the magnetic fluxes.

Thus, the reason for making large the length MLP of each salient stator pole in the rotor shaft direction is that a rotation rate $d\phi/d\theta$ of the magnetic flux $\phi$ interlinking with each salient stator pole and winding is required to be increased to increase torque generation of the motor. The stator pole configurations of the inventive motors provided so far may be modified in the similar fashion.

Indicated by 657 and 65E are magnetic paths for passing magnetic fluxes, which are opposed to each other through a small cylindrical air gap. These magnetic paths are configured to comparatively readily pass magnetic fluxes from the back yoke of the stator to the back yoke of the rotor.

Indicated by 651 is a rotor and by 652 and 654 are salient poles of the rotor as shown in FIG. 9. In the motor shown in FIG. 66, the salient rotor poles have the same phase along the circumference. One set of the salient rotor poles is shared between the opposed to two sets of salient stator poles. Indicated by 652Z in FIG. 66 are ranges of salient portions of the salient rotor poles 652 and 654.

Figure 67:
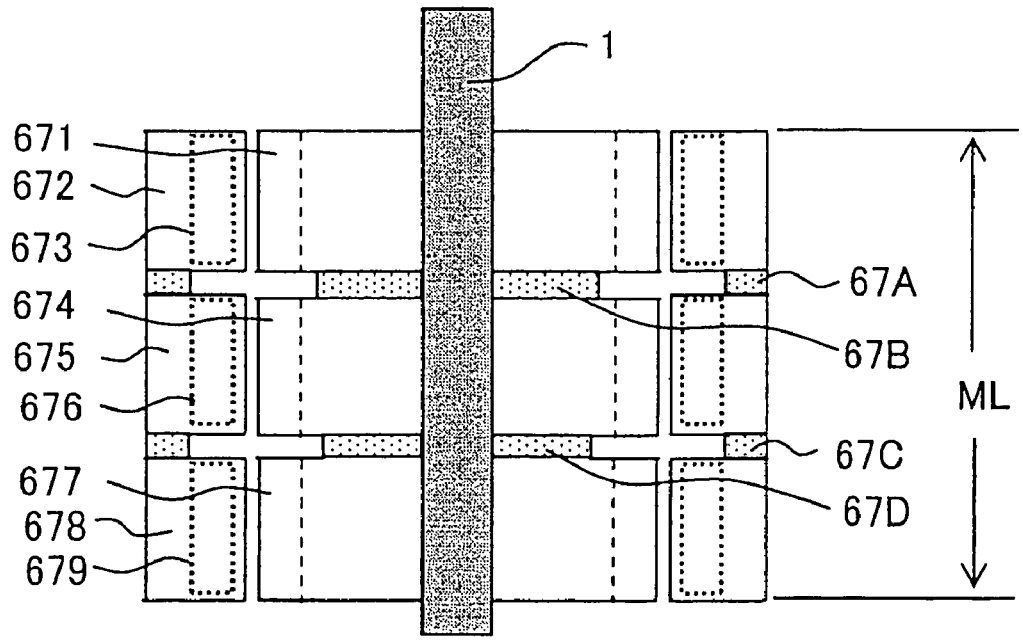
FIG. 67 is a schematic vertical cross section illustrating a six-phase motor having loop windings.
Figure 68:
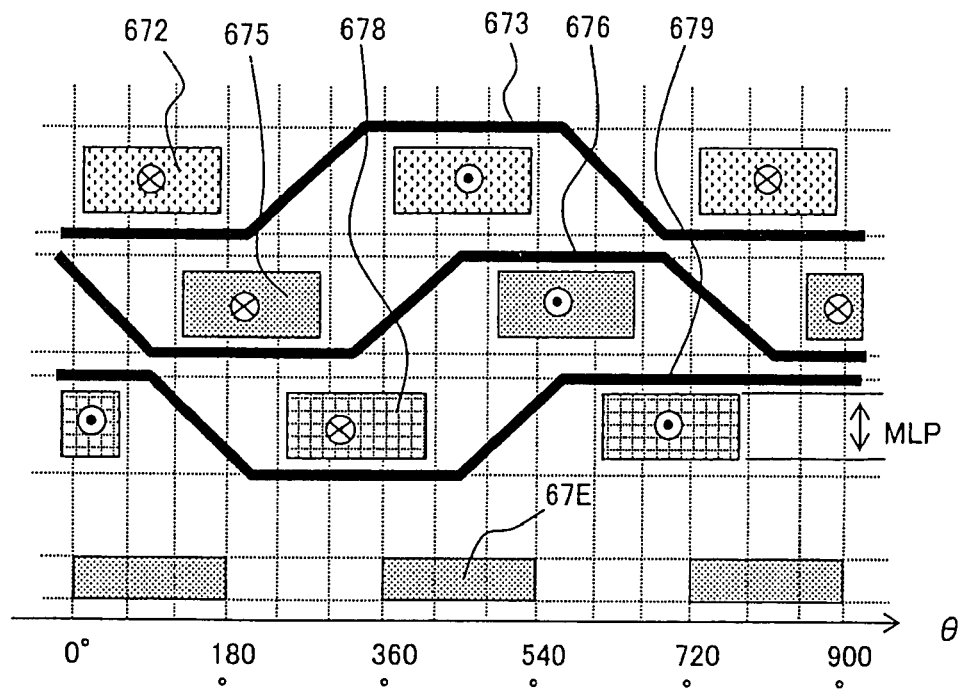
FIG. 68 is a linear development of a six-phase motor configuration including modification in each shape of a salient stator pole and each loop winding.

FIG. 66 shows that each of the windings 65B and 65C has a simple looped shape. Each of the windings 65A and 65D, however, has a looped shape which is wavy in the rotor shaft direction, because adjacent stator poles are mutually protruded in the rotor shaft direction. Although the length of the windings 65A and 65D becomes large, the rotation rate $d\phi/d\theta$ of the interlinked magnetic flux $\phi$ can be raised. Each of FIGS. 67 and 68 shows the six-phase motor shown in FIG. 24 with an example of modifications in the configurations of the salient stator and rotor poles and the windings. When it is defined that stator poles with fluxes in opposite directions are of the same phase, this motor can be interpreted as being a three-phase motor. Indicated by 672 are A- and D-phase stator poles, by 675 are B- and E-phase stator poles and by 678 are C- and F-phase stator poles. FIG. 68 shows a linear development of a circumferential configuration of individual portions in an air-gap plain where the stator and the rotor face with each other. The horizontal axis indicates a rotational angle θ in electrical angle, and the vertical axis indicates the rotor shaft direction. As shown in FIG. 68, the configuration of each of the stator poles in each phase has a length in the rotor shaft direction, which length is about ⅓ of the length ML of the stator in the rotor shaft direction shown in FIG. 67. Each stator pole has the length MLP in the rotor shaft direction. When the number of phases N is "6", a relation MLP>ML/N=MLP/6 is established.

In FIG. 68, each of windings 673, 676 and 679 has a shape which is wavily indented in the rotor shaft direction because adjacent stator poles are individually projected along the rotor shaft. Indicated by 67A, 67B, 67C and 67D are nonmagnetic material members disrupting the electromagnetic effect in the rotor shaft direction.

Figure 69:
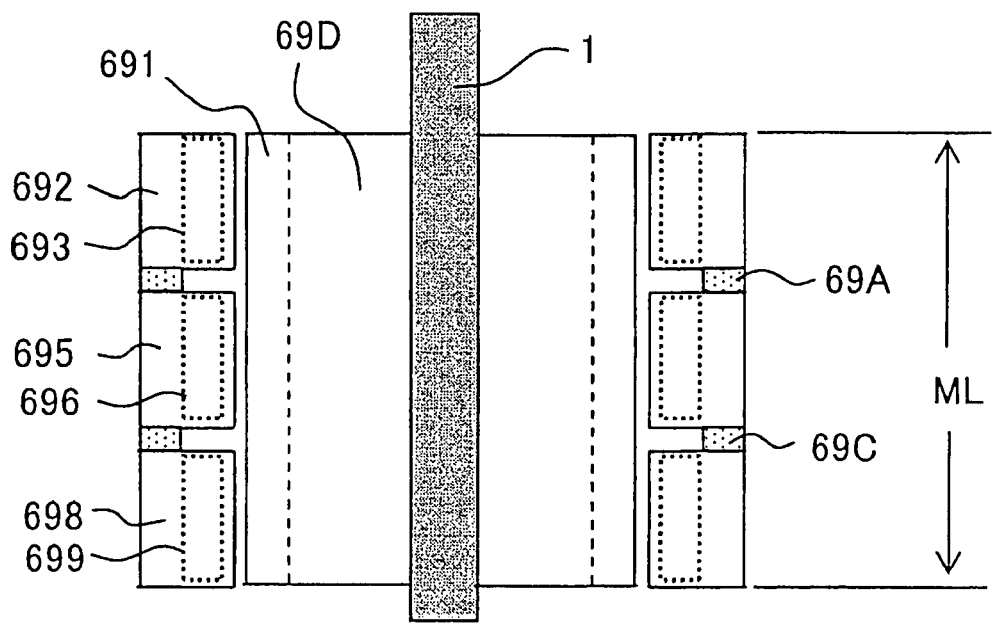
FIG. 69 is a schematic vertical cross section illustrating a six-phase motor having loop windings.
Figure 70:
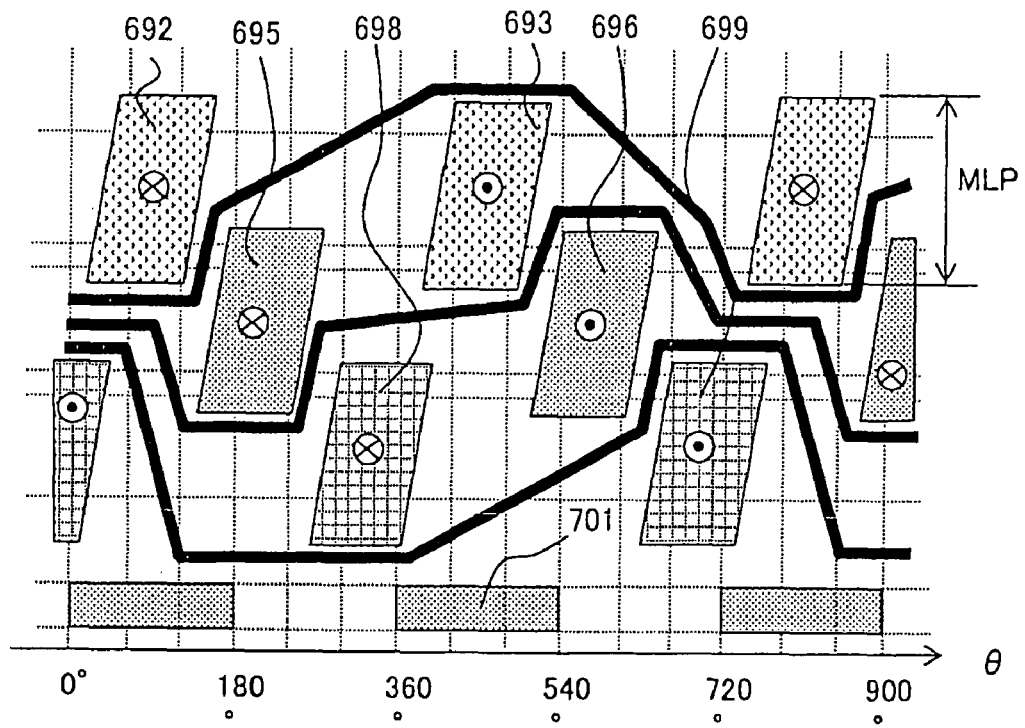
FIG. 70 is a linear development of a six-phase motor configuration including modification in each shape of a salient stator pole and each loop winding.

Each of FIGS. 69 and 70 shows the six-phase motor shown in FIGS. 67 and 68 with an example of further modifications. Indicated by 69D is a rotor and by 691 is a salient rotor pole, where the non-magnetic members arranged in the rotor shown in FIG. 67 are removed to provide a homogeneous configuration over the entire length of the rotor in the rotor shaft direction. Indicated by 701 are ranges of the salient portion of the rotor. Indicated by 692 are A- and D-phase stator poles, by 695 are B- and E-phase stator poles and by 698 are C- and F-phase stator poles. Indicated by 69A and 69C are nonmagnetic material members. Indicated by 693, 696 and 699 are windings.

FIG. 70 is a development showing configurations of the salient stator poles and the windings. The length MLP of each salient stator pole in the rotor shaft direction is made further larger comparing with the example shown in FIG. 68, allowing the rotation rate dφ/dθ of the flux φ to be large.

Figure 71:
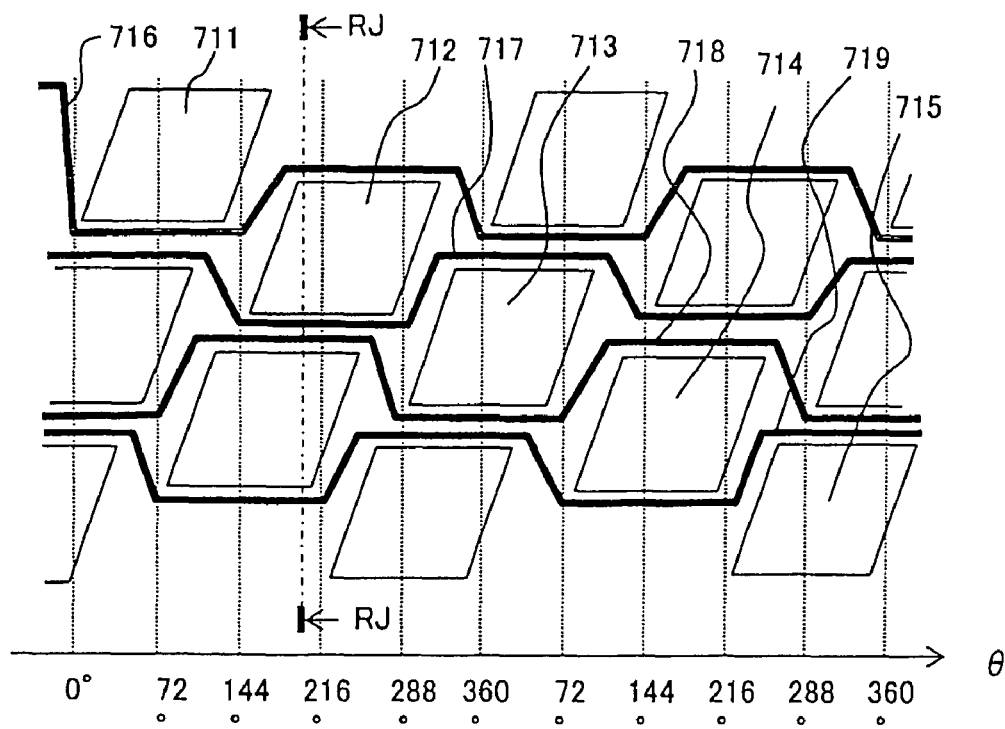
FIG. 71 is a linear development of a five-phase motor configuration including modification in each shape of a salient stator pole and each loop winding.

FIG. 71 shows the five-phase motor shown in FIGS. 18 and 19 with an example of modifications. Indicated by 711 are A-phase salient stator poles, by 721 are B-phase salient stator poles, by 713 are C-phase salient stator poles, by 714 are D-phase salient stator poles and by 715 are E-phase salient stator poles.

Figure 72:
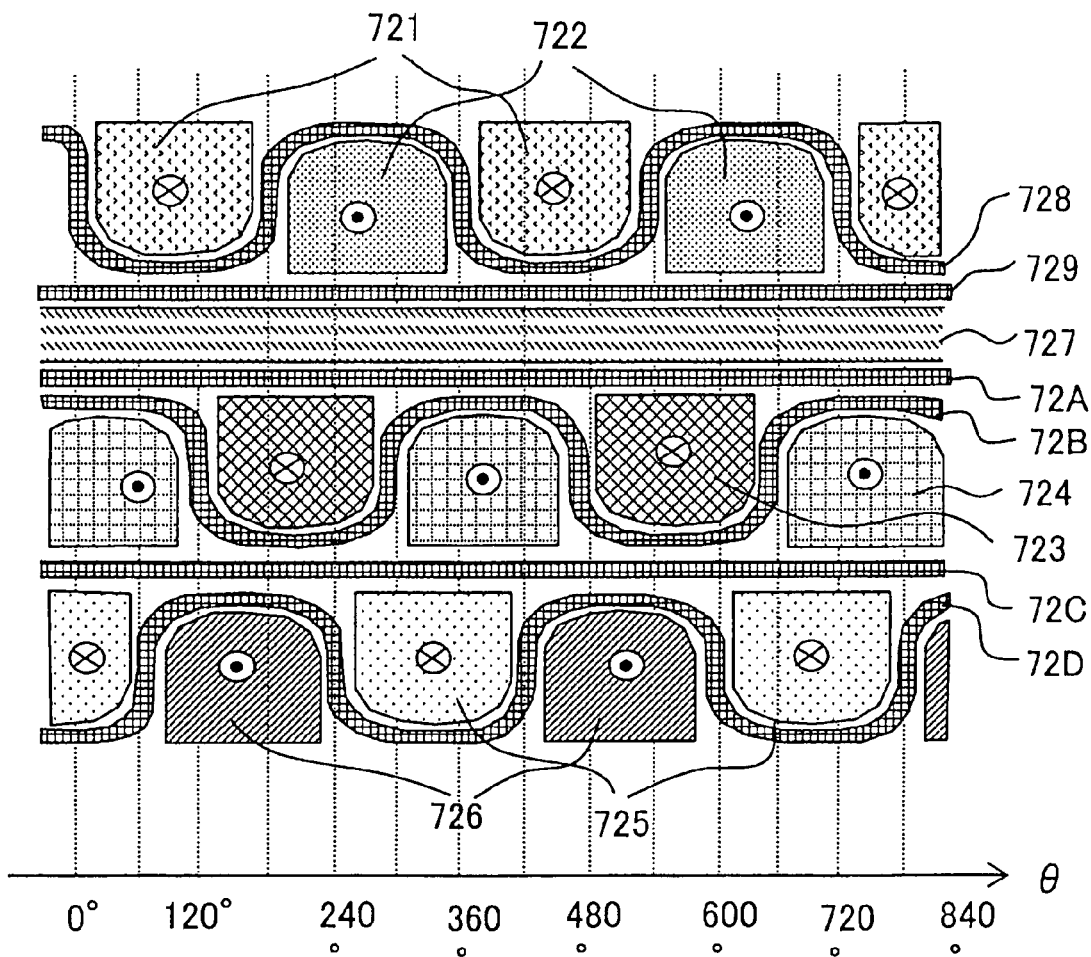
FIG. 72 is a linear development of a six-phase motor configuration including modification in each shape of a salient stator pole and each loop winding.

FIG. 72 shows the six-phase motor shown in FIG. 66 with an example of modifications. Indicated by 721 are A-phase salient stator poles, by 722 are D-phase salient stator poles, by 723 are C-phase salient stator poles, by 724 are F-phase salient stator poles, by 725 are E-phase salient stator poles and by 726 are B-phase salient stator poles. Indicated by 727 is a magnetic path shared between the salient stator poles of the individual phases, for passing magnetic fluxes.

Indicated by 728, 729, 72A, 72B, 72C and 72D are windings. As described above, the stator poles of each phase can be independently excited without influencing other phases by differentially supplying currents to the stator poles. As a result, comparing with the examples shown in FIGS. 68 and 70, the motor shown in FIG. 72, although being a reluctance motor, makes it possible to closely arrange the stator poles. Further, among the six phases, two or three phases can simultaneously generate torque, thereby enabling effective torque generation.

From the motor configuration shown in FIG. 72, the magnetic path 727 for passing fluxes and the winding 72A may be removed. This corresponds to a six-phase version of the five-phase motor shown in FIG. 71.

Figure 73:
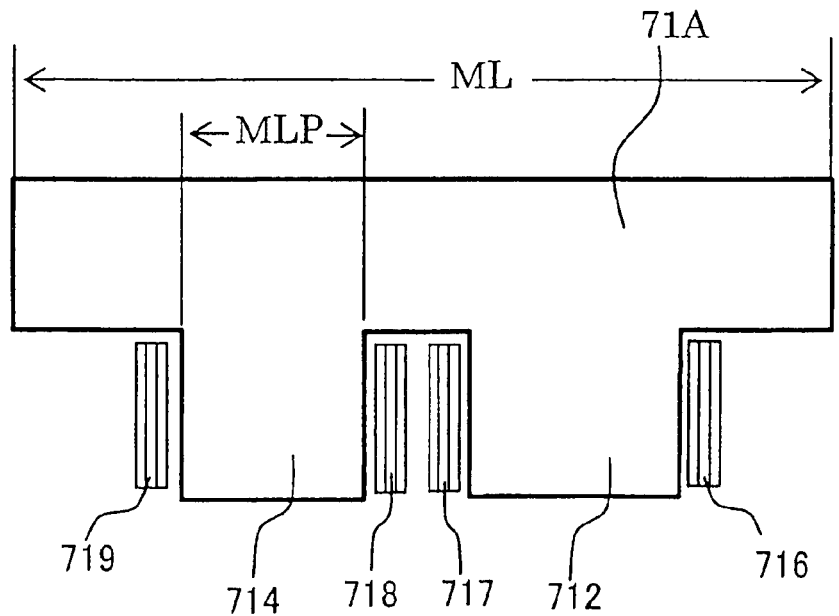
FIG. 73 is a cross section illustrating a circumferential configuration of salient stator poles in the motor shown in FIG. 71.
Figure 74:
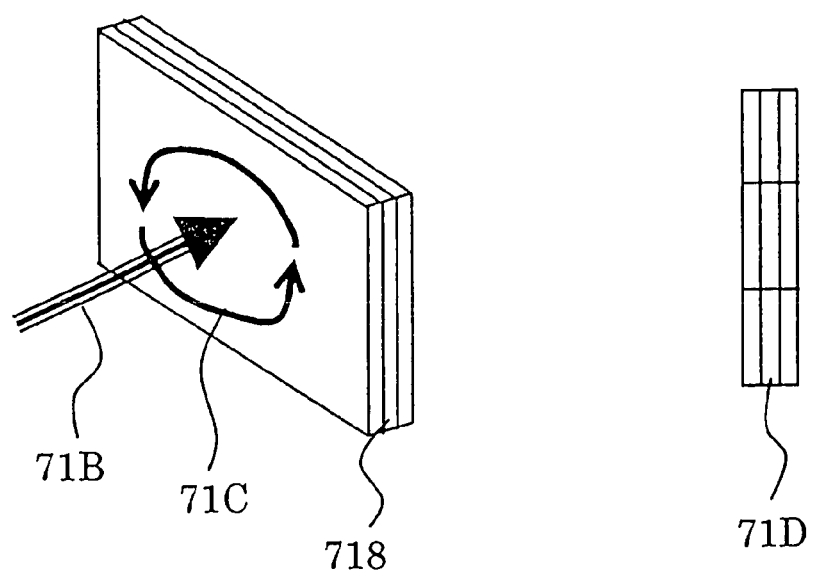
FIG. 74 illustrates a state where a magnetic flux passing through plate conductors is reduced by an eddy current.

Referring now to FIGS. 73 and 74, hereinafter will be described a method for reducing flux leakage from between the stator poles by contriving the configuration and the arrangement of the windings. FIG. 73 shows a cross section taken along a line RJ-RJ of FIG. 71, where the same portions are indicated by the same references.

Indicated by 71A is a stator back yoke. Indicated by 712 is a cross section of a B-phase salient stator pole, and by 714 is a cross section of a D-phase salient stator pole. Indicated by 716, 717, 718 and 719 are cross sections of the windings. As can be seen from the example shown in FIG. 73 and by (a) of FIG. 74, each of these windings has three turns of a flattened conductor.

These phase windings are arranged so as to block the stator poles of the individual phases. In this arrangement, a magnetomotive force exerted by each winding is adapted to work on end portions of the stator poles of each phase, i.e., is adapted to work from the individual stator poles to the side of the rotor. As a result, flux leakage occurring between stator poles of different phases can be drastically reduced. Owing to the flattened winding as a winding 718 shown by (a) of FIG. 74, when the flux leakage as indicated by an arrow 71B is increased, an eddy current as shown by an arrow 71C is induced. Since this eddy current has an effect of preventing the increase of the magnetic flux 71B, the flux leakage 71B that occurs between the stator poles of different phases may be reduced.

The configuration of the winding of the inventive motor is not limited to the one shown, for example, by (a) of FIG. 74, but may be radially divided as shown by (b) of FIG. 74. Alternatively, a normal round wire or strand wire may also be used. The currents passing through parts of the winding 718 resultantly form a combined current of the eddy current shown by the arrow 71C and the phase current supplied to the winding 718. The configuration of the phase windings is not limited to the one as shown in FIG. 73. Each winding may only have to be arranged up to the vicinity of an opening portion of the stator poles so as to exert an effect of reducing flux leakage between the stator poles of different phases.

The motors of the present invention have been described with reference to FIGS. 1 to 74. These motor may be combined to provide an incorporated motor. For example, a plurality of motors may be juxtaposed in the rotor shaft direction with their phases being changed to constitute a multiphase motor. Alternatively, two different motors may be arranged at an outer-diameter side and at an inner-diameter side to more effectively utilize the space inside the motor.

Further, the technique for configuring the motors shown in FIGS. 26 to 74 may be applied to the motors shown in FIGS. 1 to 25 to obtain respective effects. Examples of some combined configurations have been mentioned. However, describing all the combinations will make the description enolulous in quantity and thus will be impractical.

For example, the following methods may be provided for further increasing output torque in the motor shown by (b) of FIG. 12, or in FIG. 30 or 32. That is: the air gap between the rotor and the stator may be reduced; a motor may be multipolarized; the permanent magnets 477 and 478, as shown in FIG. 52, for reducing flux leakage may be arranged with their shapes being changed; the length MLP of each salient stator pole in the rotor shaft direction may be made large as shown in FIGS. 61 and 65 to 72; the winding between stator poles may be flattened as shown in FIGS. 73 and 74 and may be arranged so as to block the flux leakage between the stator poles; stronger permanent magnets and soft magnetic material of high flux density and low iron loss may be used; and a plurality of motors may be incorporated into a single motor, at the inner- and outer-diameter sides. By combining these techniques, larger output torque of a motor may be realized.

Various examples of the modes related to the present invention have been discussed. These modes may be modified and such modifications are also intended to be included in the present invention. For example, the numbers of the phases and poles may be increased more than indicted in the exemplified motors. The number of poles, in particular, is strongly directly related to torque.

As to the types of motors, inner-rotor motors having a cylindrical air gap have mainly been discusses. These motors may be modified, for example, into outer-rotor motors and axial gap motor having a disk-like air gap. Alternatively, a motor may have a slightly tapered cylindrical air gap. In this case, in particular, the stator and the rotor may be shifted in the rotor shaft direction to vary the length of the air gap, whereby the magnitude of a magnetic field may be varied to make the motor voltage variable. With this gap variation, constant output control can be realized.

In the motors of the present invention described above, electromotive forces generated in the rotor shaft direction by the individual windings may not sometimes be balanced so that a sum total of the currents will be zeroed as in the case of the three-phase sine wave alternating currents. Accordingly, depending on the operation conditions of a motor, a problem may be raised, in which the rotor shaft is magnetized to attract iron powder. This problem may be resolved by adding a winding coaxial with the rotor shaft and by supplying current for canceling the unbalanced magnetomotive forces.

Alternatively, two motors may be electromagnetically symmetrically arranged so that no magnetomotive force will remain in the rotor shaft to thereby eliminate the magnetomotive force problem. For example, when the arrangement order of the stator poles is reversely set and the current directions of the windings are reversely set, directions of torque generation can be unified, while reversely creating the magnetomotive force for the unbalanced currents that should be supplied to the windings. Thus, a configuration may be so made that the unbalanced magnetomotive forces of the two motors can be mutually cancelled. Further, three or more electromagnetically unbalanced motors may be coaxially arranged to achieve an electromagnetic balance.

In case a plurality of motors are incorporated or combined with application machinery of motors, parts sharing, for example, may achieve simplification. Alternatively, such a structure may be possible that a portion of the inventive motor is omitted and removed.

Other than the normal silicon steel plates, usable soft magnetic material members include amorphous electromagnetic steel plates, and dust cores obtained by subjecting powdered soft iron to compression molding process. In a small motor, in particular, electromagnetic steel plates may be subjected to punching, bending and forging processes to form a three-dimensionally shaped part and thus to form a portion of the inventive motor described above.

As to the windings of motors, loop windings have chiefly been discusses. However, windings do not necessarily have to be circular, but may be modified more or less so that each winding may have, for example, an elliptic shape, a polygonal shape, partially indented shape in the rotor shaft direction for the convenience, for example, of magnetic circuits. Alternatively, where loop windings having a phase difference, for example, of 180° are arranged in the stator, a closed circuit may be formed by connecting semicircular windings to different semicircular windings that have a phase difference of 180°, so that the loop windings can be modified into semicircular windings. The windings may be further divided for modification into arc windings.

Alternatively, description so far has been provided on motors each of which is configured to have loop windings arranged in respective slots. However, a structure with no slot may be provided, where thin windings are arranged near a rotor-side surface, to thereby obtain a so-called coreless motor.

The description so far has been given based on a structure in which the stator poles and the rotor poles of the same phase are circumferentially located at the same position in terms of electrical angle. However, for the purposes of reducing torque ripple, vibration and noise, the individual portions arranged along the circumference may be effectively arranged being shifted in the circumferential direction or in the rotor shaft direction so that the harmonic components may be cancelled. Specifically, a relevant motor portion may be divided, for example, into two groups of A and B. Then, one group, or group A of the motor portion, may be shifted along the circumference by ½ of the frequency of the problematic harmonic components, whereby the harmonic components can be cancelled.

These various modifications of the motors are intended to be included in the present invention as far as the modification techniques fall within the spirit of the present invention.

Hereinafter will be described a drive circuit and a driving method for controlling and driving the inventive motor.

Figure 75:
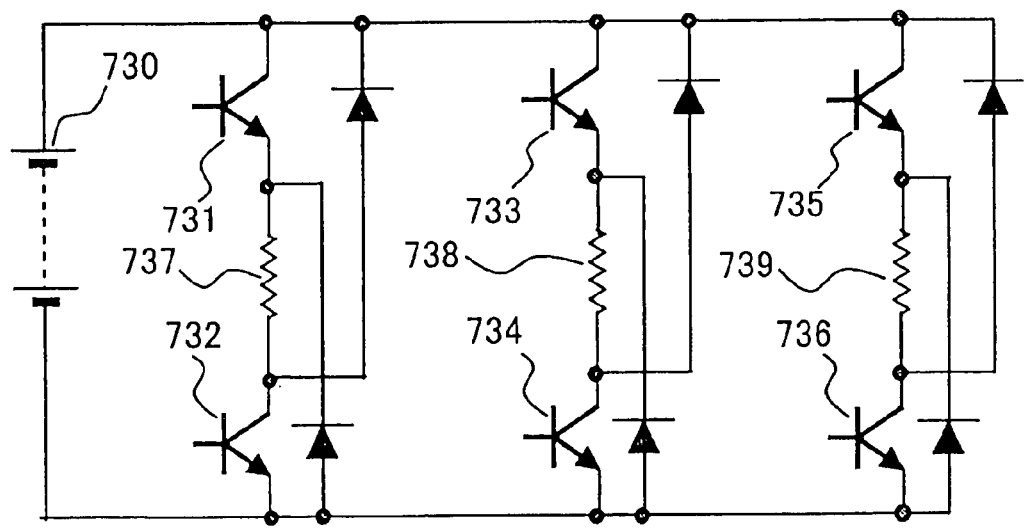
FIG. 75 illustrates a control circuit for controlling a one-way current in each of three windings.

FIG. 75 shows a circuit having three windings 737, 738 and 739, which is widely used as a drive circuit for a reluctance motor. Currents, although they are one way, can be freely passed through the three windings 737, 738 and 739, and thus the circuit can be utilized for various driving methods. Indicated by numerals 731, 732, 733, 734, 735 and 736 are power control elements, that is, so-called IGBTs, power FETS or the like, capable of on/off control of currents. A diode is connected to each of the power elements to supply an oppositely directed current. This diode supplies current when each power element is turned off. At this moment, each diode is also capable of performing regeneration for a power source for magnetic energy of the motor interior and the wiring portions, and regeneration for a power source for kinetic energy of the motor and the motor load. Indicated by numeral 730 is a DC power source.

The switched reluctance motor shown in FIG. 87 can also be controlled using the control circuit shown in FIG. 75.

Figure 77:
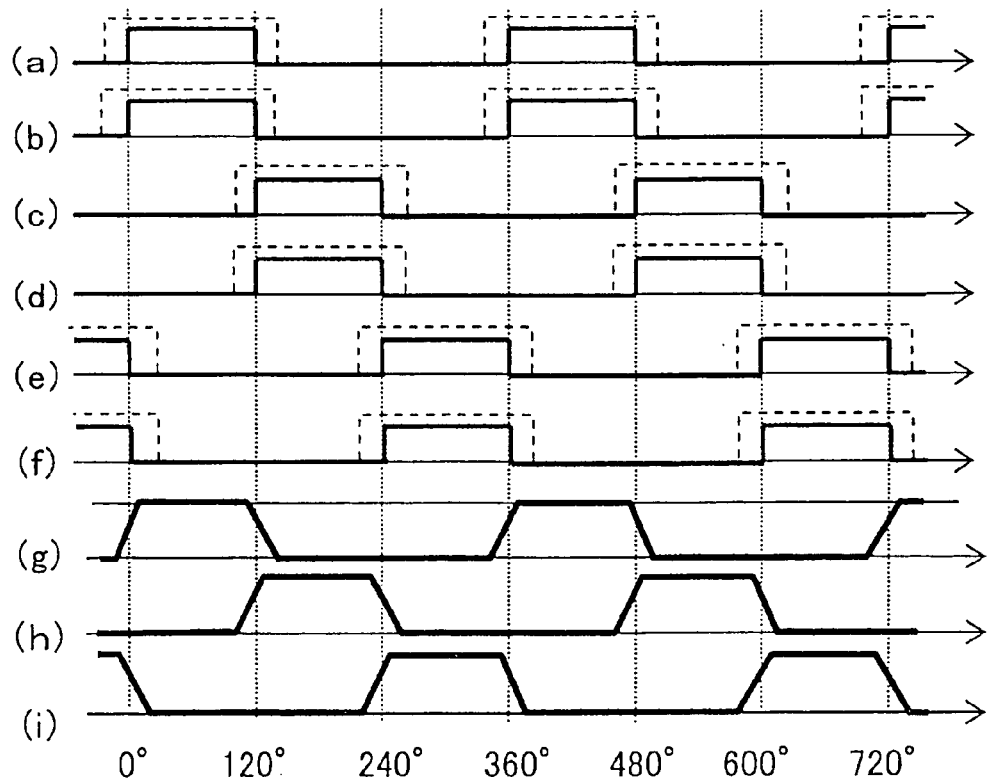
FIG. 77 illustrates examples of operations and current waveforms of the control circuit shown in FIG. 75.

FIG. 77 shows the driving and controlling of the motor shown in FIG. 8 by using the drive circuit shown in FIG. 75. The A-phase winding 24 of FIG. 8 corresponds to a winding 737 of FIG. 75. Similarly, the winding 25 corresponds to a winding 738 and the winding 26 corresponds to a winding 739. The horizontal axis of FIG. 77 indicates rotational position of the rotor in terms of electrical angle to thereby indicate control timing of each power element. The vertical axis indicates control/non-control of each power element, where "1" indicates a "control range" and "0" indicates a "non-control range". The "control range" refers to pulse-width modulation control, or so-called PWM control, of each power element, for supplying power to each winding. Accordingly, the terms "control range" and "non-control range" may be replaced by terms "power supply range" and "non-power supply range", respectively, for each winding. The "non-control range" does not necessarily mean that a relevant power control element is inhibited from supplying current, but may mean, for example, that all of the three windings 737, 738 and 739 are constantly supplied with current but are controlled to have different current magnitude. Specifically, this current control may be variously conducted. For example, a steady value current can be supplied during a certain rotational range of the rotor, or the current value may be gradually increased, or the current may have a trapezoidal or sinusoidal form. As a matter of course, magnitude of the current may be variable. Alternatively, the motor may be driven under voltage control instead of the current control. Further, various methods may be used for the current modulation under the PWM.

FIG. 77 shows by (a) that the power element 731 is controlled with a range of "1". Similarly, FIG. 77 shows by (b) the power element 732, by (c) the power element 733, by (d) the power element 734, by (e) the power element 735 and by (f) the power element 736 are controlled with a range of "1". In this case, the A-phase salient rotor and stator poles 18 and 19 of the motor shown in FIG. 8 are in an arrangement relationship, for example, as shown in FIG. 45, ranging from 0 to 120° of FIG. 77. That is, these salient poles are in a relationship where current supply to the winding 737 by the power elements 731 and 732 of FIG. 75 will generate torque in the motor of FIG. 8. When the rotor is rotated in this state, the power elements to be operated are sequentially changed, and the phases of the salient rotor and stator poles are also sequentially changed in the order of A, B, C, A . . . . In summary, in the electrical angle range of 0 to 120°, the power elements 731 and 732 are controlled to supply a current CC1 shown by (g) of FIG. 77 to the winding 737, bringing the salient rotor and stator poles 18 and 19 of the motor shown in FIG. 8 into the relationship shown in FIG. 45, whereby a magnetomotive force caused by the current is applied for the induction of magnetic fluxes to thereby generate counterclockwise torque in the rotor. In an electrical angle range of 120 to 240°, the power elements 733 and 734 are controlled to supply a current CC2 shown by (h) of FIG. 77 to the winding 738, bringing the salient rotor and stator poles 20 and 21 of the motor shown in FIG. 8 into the relationship shown in FIG. 45, whereby a magnetomotive force caused by the current is applied for the induction of magnetic fluxes to thereby generate counterclockwise torque in the rotor. In an electrical angle range of 240 to 360°, the power elements 735 and 736 are controlled to supply a current CC3 shown by (i) of FIG. 77 to the winding 739, bringing the salient rotor and stator poles 22 and 23 of the motor shown in FIG. 8 into the relationship shown in FIG. 45, whereby a magnetomotive force caused by the current is applied for the induction of magnetic fluxes to thereby generate counterclockwise torque in the rotor.

Many of the regions in each current control range shown in FIG. 77 may enable simultaneous driving of two sets of the phases. As shown by broken lines in FIG. 77, each control range can be increased. When the motor shown in FIG. 8 generates reverse torque, or clockwise torque, the mutual facing portions of the salient rotor and stator poles of FIG. 45 are shifted along the circumference to the opposite ends as can be readily estimated from the relationship shown in FIG. 45. Thus, the relationship is drastically changed between the rotational position of the rotor and the current supply range.

Hereinafter is described a current driving method for the motor shown by (a) of FIG. 12. For the motor shown in FIG. 8, the electromagnetic operations of the phases A, B and C have been independent from each other. However, the motor shown by (a) of FIG. 12 causes electromagnetic interference between the phases B and C of the motor, necessitating the change of control. The control circuit is the one shown in FIG. 75, in which the A-phase winding 39 corresponds to the winding 737 of FIG. 57. Similarly, the winding 40 corresponds to the winding 738 and the winding 41 corresponds to the winding 739. The operational range of each power element may result in as shown in FIG. 78.

Figure 78:
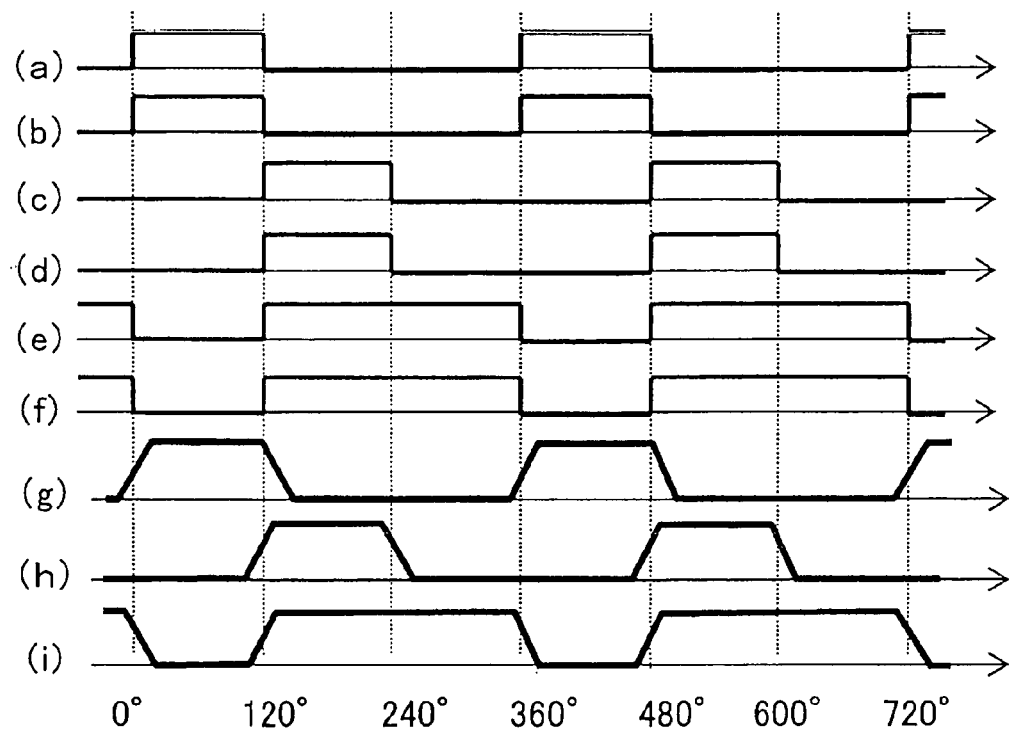
FIG. 78 illustrates examples of operations and current waveforms of the control circuit shown in FIG. 75.

In the electrical angle range of 0 to 120°, the power elements 731 and 732 are controlled to supply a current CC4 shown by (g) of FIG. 78 to the winding 737, bringing the salient rotor and stator poles 31 and 32 of the motor shown by (a) FIG. 12 into the relationship shown in FIG. 45, whereby a magnetomotive force caused by the current is applied for the induction of magnetic fluxes to thereby generate counterclockwise torque in the rotor.

In the electrical angle range of 120 to 240°, the power elements 733 and 734 are controlled to supply a current CC5 shown by (h) of FIG. 78 to the winding 738, and at the same time the power elements 735 and 736 are controlled to supply a current CC6=−CC5 shown by (i) of FIG. 78 to the winding 739, which current is reverse of the current of the winding 738. At this moment, the salient rotor and stator poles 20 and 31 of the motor shown by (a) of FIG. 12 are brought into the relationship shown in FIG. 32, whereby a magnetomotive force caused by the current is applied for the induction of magnetic fluxes to thereby generate counterclockwise torque in the rotor. In this case, a magnetomotive force is applied between the salient rotor and stator poles 37 and 38, which magnetomotive force is to generate the current CC5+CC6=CC5-CC5=0. Since a sum of the two currents is zero, no magnetomotive force is exerted. As a result, only a little magnetic flux is induced then between the salient rotor and stator poles 37 and 38 to thereby generate no torque.

In an electrical angle range of 240 to 360°, the power elements 735 and 736 are controlled to supply a current CC7 to the winding 739, bringing the salient rotor and stator poles 37 and 38 of the motor shown by (a) of FIG. 12 into the relationship shown in FIG. 45, whereby a magnetomotive force caused by the current is applied for the induction of magnetic fluxes to thereby generate counterclockwise torque in the rotor.

In the motor shown by (a) of FIG. 12, the current passed through the winding 40 has been reversed from the current passed through the winding 39. Passing reverse current to the winding 40 corresponds to imparting the winding with reverse turns. It also corresponds to reversing the connection from the control circuit to the winding.

FIG. 79 shows an example, in which the motor model shown by (a) of FIG. 12 is sequentially controlled, with the current supply mode shown in FIG. 78, in the order of the phases A, B and C in synchronization with the rotational position of the rotor. In the control, magnetic field analysis is conducted for the three-dimensional configuration of the motor by using a nonlinear finite-element method with the aid of a computer to calculate the output torque of the motor. The horizontal axis indicates electrical angle and the vertical axis indicates output torque of the motor. Torques T-A, T-B and T-C are the torques generated by the salient rotor and stator poles when currents are supplied, for the respective phases A, B and C, to the relevant windings by a range of 120° in electrical angle. The B-phase torque T-B, in particular, resulting from the differential operation by passing reverse currents through the two windings 40 and 41, can be confirmed as being in conformity with the theory. As can be seen, there is torque ripple at the frequency of 120° in electrical angle. Torque ripple of this degree, however, may give room for lots of applications. Lots of measures can be taken for reducing this torque ripple including: improving the pole configuration of the motor; supplying each phase current also in the range of 120° to 180° in electrical angle; and effecting compensation with current amplitude. Thus, there is room for improvement.

Figure 76:
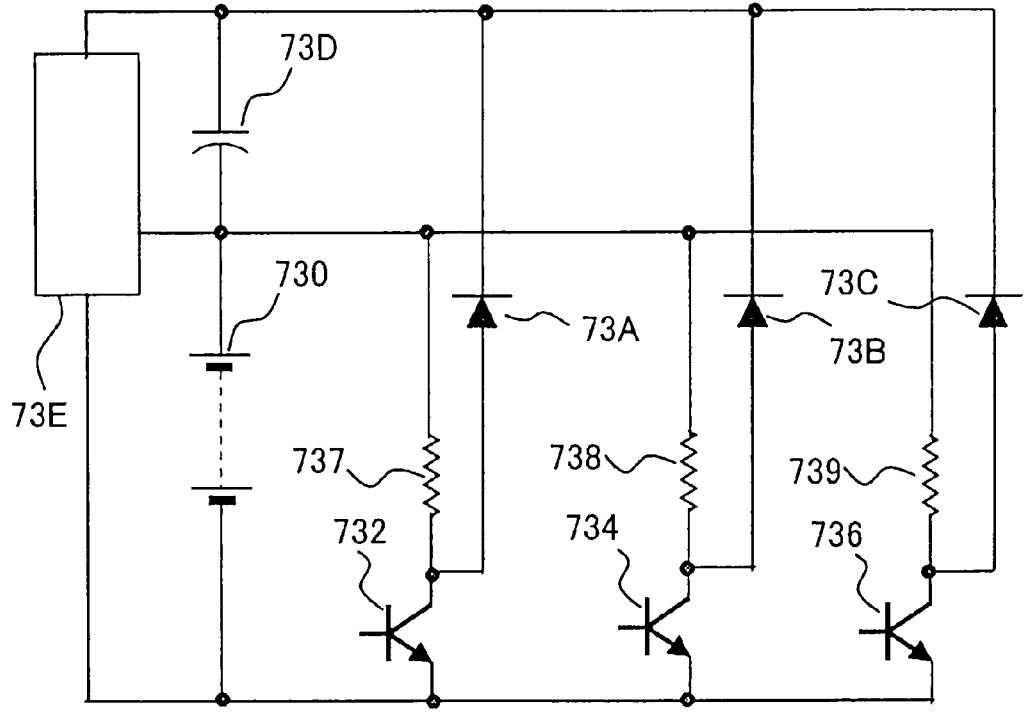
FIG. 76 illustrates a control circuit for controlling a one-way current in each of three windings.

FIG. 76 shows another circuit for controlling one-way current of three-phase windings. In addition to a DC power source 730, this circuit is provided with a similar DC power source or a second DC power source 73D simply made up of a capacitor. This circuit is based on a double power source system, which is provided with a DC-DC converter 73E and enables shifting of energy stored in the DC power source 73D to the DC power source 730. This control circuit is a well-known control circuit that can also drive the switched reluctance motor shown in FIG. 87.

Current of the winding 737 is controlled by the power element 732, and when the power element 732 is turned off, the current is regeneratively passed to the second DC power source 73D through a diode 73A. Similarly, current of the winding 738 is controlled by the power element 734, and when the power element 734 is turned off, the current is regeneratively passed to the second DC power source 73D through a diode 73B. Current of the winding 739 is controlled by the power element 736, and when the power element 736 is turned off, the current is regeneratively passed to the second DC power source 73D through a diode 73C. In order to enable regeneration of the magnetic energy with this system, the voltage of the second DC power source 73D has to be large to an extent that cannot be ignored, comparing with the DC power source 730. Otherwise, regeneration time cannot be reduced. For example, when the voltage of the DC power source 730 is 200 V, the second DC power source 73D should have a voltage of 50 V or more.

The control circuit shown in FIG. 76 has a feature that the number of the power elements is small, which elements are directly required for the current supply to the windings. The DC-DC converter 73E may be structured in various ways, including comparatively simple structures. The DC-DC converter 73E may be shared between the control circuits of a plurality of motors. For example, when five motors are controlled, the DC-DC converter 73E as a single structure can be sued. Accordingly, as far as a control circuit per single motor is concerned, it is possible to reduce the cost for the DC-DC converter and the space for the control unit. Additionally, the control circuit shown in FIG. 76 can perform current control for the motors shown in FIGS. 77 and 78.

Figure 80:
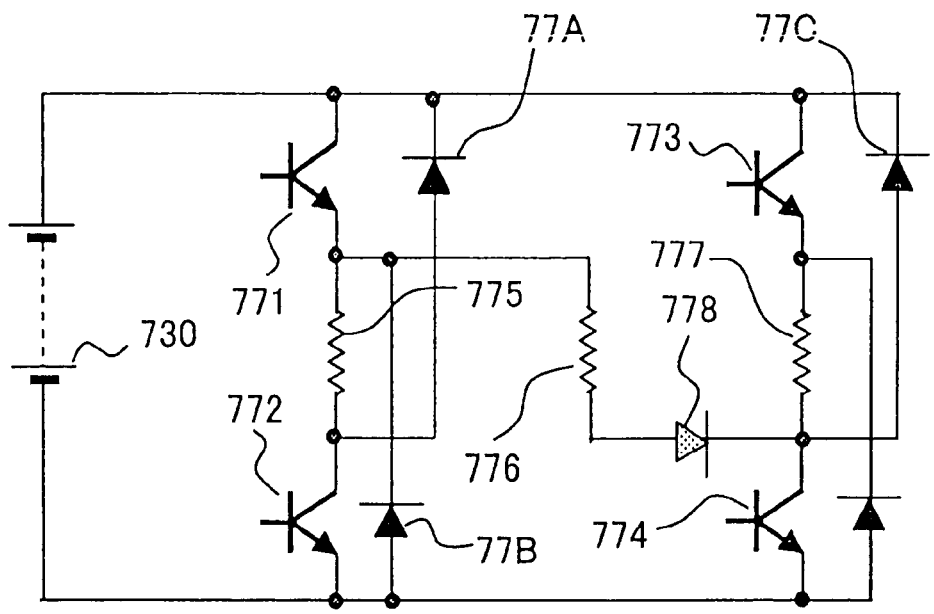
FIG. 80 illustrates a control circuit for controlling a one-way current in each of three windings.

FIG. 80 shows a control circuit for effecting control of currents for three windings with four power elements 4. Current of a winding 775 is controlled by power elements 771 and 772, current of a winding 776 is controlled by power elements 771 and 774 and current of a winding 777 is controlled by power elements 773 and 774. Let us now discuss a case where the motor shown by (a) of FIG. 12 is driven. The windings 39, 40 and 41 shown by (a) of FIG. 12 correspond to the windings 775, 776 and 777, respectively, shown in FIG. 80. A region controlled by the power element 771 is shown by (a) of FIG. 81, a region controlled by the power element 772 is shown by (b) of FIG. 81, a region controlled by the power element 773 is shown by (c) of FIG. 81, and a region controlled by the power element 774 is shown by (d) of FIG. 81.

Figure 81:
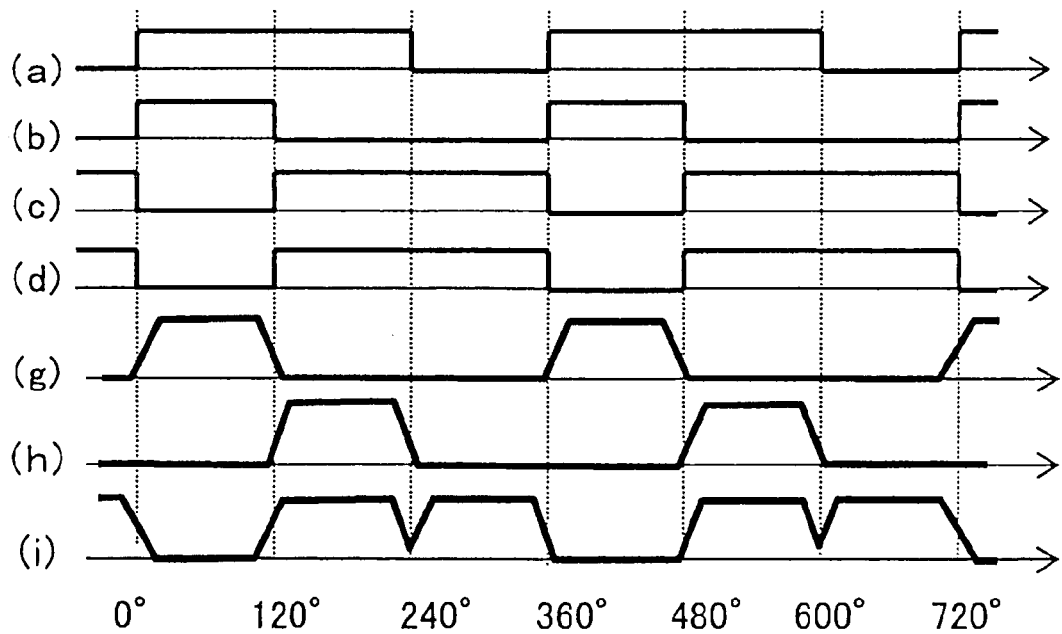
FIG. 81 illustrates examples of operations and current waveforms of the control circuit shown in FIG. 80.

As shown in FIG. 81, the power elements 771 and 772 effect control as a function of the electrical angle ranging from 0° to 120° along the circumference of the motor to control current of the winding 775 shown by (g) of FIG. 81.

In a range of 120° to 240°, the power elements 771, 774 and 773 control currents of the windings 776 and 777 shown by (h) and (i) of FIG. 81.

In a range of 240° to 360°, the power elements 773 and 774 control current of the winding 777 shown by (i) of FIG. 81.

When the currents shown by (g), (h) and (i) of FIG. 81 are controlled by the control circuit shown in FIG. 80, and where current is being passed through a certain winding at a current-switching timing, the magnetic energy and the current of the winding in question have to be regeneratively passed to the DC power source 730 to an extend of causing no actual harm, before starting current supply to the subsequent winding. Therefore, operation will be a little delayed. For example, when the power elements 771 and 772 are turned off while current is being passed through the winding 775, the current is regeneratively passed to the DC power source 730 through the diodes 77A and 77B. As a result, the potential across the winding 775 is fluctuated and inverted, causing inconveniency for the control of the subsequent power supply to the winding 776. Although the time period may be short on the order of 0.001 to 0.01 seconds, the output torque of the motor may become intermittent. This may mostly not create a problem at low-speed rotation because the absence of current may be short and a ratio of the occurrence is low. However, at high-speed rotation, the delay time in operation may deteriorate average torque.

Further, the power element 774 may resultantly have to pass the currents of the winding 776 and 777 on a simultaneous basis, leading to the necessity of increasing the current capacity of the power element 774 by a factor of about two.

The control circuit shown in FIG. 80 has a feature that only four power elements are required and thus the cost and the space can be reduced.

Addition of a diode 778 may prevent current from being reversely passed to the winding 776. A small motor with sufficiently large winding resistance may enable control without having to look for the timing of the regenerative operation shown in FIG. 81.

Hereinafter will be described a method for providing a configuration which does not require increase of the current capacity even when currents are passed through two windings. The windings 40 and 41, which require simultaneous power supply ranging from 120° to 240° in electrical angle of FIG. 81, are driven by the windings 775 and 777, respectively, of the control circuit shown in FIG. 80. The winding 39 is arranged at the winding 776 of FIG. 80. In this way, simultaneous power supply to the windings 40 and 41 may allow each of the power elements to have an average current, eliminating the necessity of increasing the current capacity of the power element by a factor of two. However, in this case, the power elements 771 and 774 are required to be controlled in the above range so as not to be simultaneously brought into an on-state. When the power elements 771 and 774 are simultaneously turned on, current may disadvantageously be passed to the winding 776 in the range of 120° to 240°.

Another method for resolving the problem of the regeneration time may be achieved by providing a configuration which is additionally provided with the second DC power source 73D of FIG. 76, with the diodes 77A and 77C being connected to the second DC power source 73D. In this configuration, magnetic energy may be regeneratively passed to the second DC power source 73D through the diodes 77A ad 77C. This may eliminate the necessity of taking time for the regeneration explained above and may achieve the current control as shown by (g), (h) and (i) of FIG. 78.

It should be appreciated that the control circuit having the configuration shown in FIG. 80 may be applicable to the motor shown by (b) of FIG. 12 and the four-phase motor shown in FIG. 16. Also, the control circuit having the configuration shown in FIG. 80 may be capable of driving the switched reluctance motor shown in FIG. 87. The control circuit of FIG. 80 may theoretically have a configuration in which the power elements are arranged so that the positive and negative directions for the DC power source 730 are symmetrically reversed. Thus, this configuration may also be included in the present invention.

Figure 82:
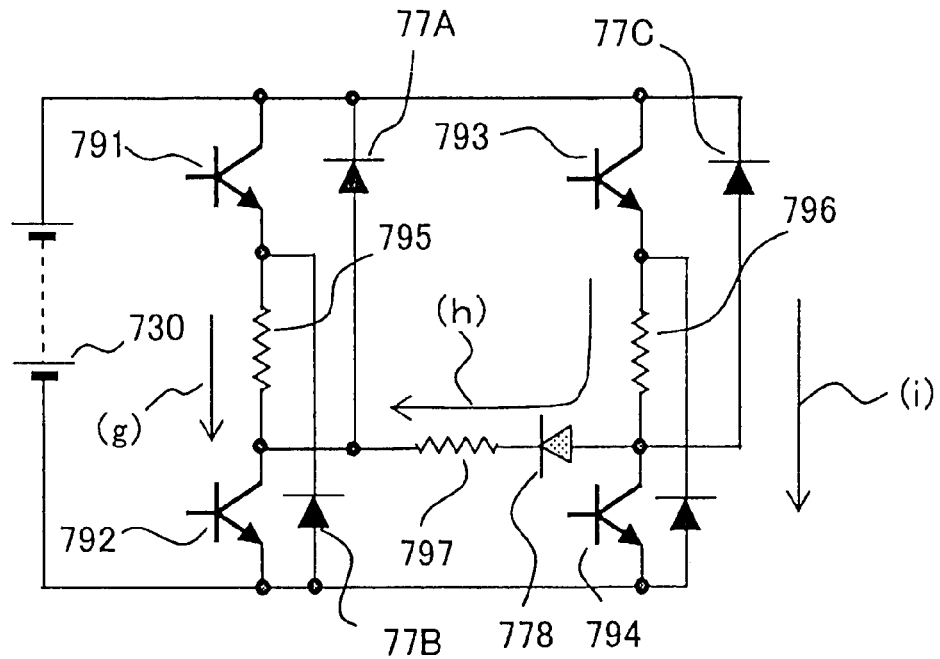
FIG. 82 illustrates a control circuit for controlling a one-way current in each of three windings.

FIG. 82 shows a control circuit for controlling currents of three windings by using four power elements. Unlike the control circuit shown in FIG. 80, this control circuit does not allow currents to be collected to a specific power element. Therefore, it is not necessary to increase the current capacity.

Current of a winding 795 is controlled by power elements 791 and 792, current of a winding 796 is controlled by power elements 793 and 792, and current of a winding 797 is controlled in series with the winding 796 by the power elements 793 and 792. Current is supplied in this way. The purpose of controlling the windings 797 and 796 being serially connected for application of voltage is as follows. That is, the purpose is to effect control so that, in case both of the windings are permitted to differentially excite a certain stator pole, a sum of the voltages induced to both of the windings may not exceed a certain value, and that, mostly, the induced voltage of one winding may be zeroed as will be described later.

Description is now focused on a case where the motor shown by (a) of FIG. 12 is driven. The windings 39, 40 and 41 shown by (a) of FIG. 12 correspond to windings 795, 797 and 796 shown in FIG. 82. A region controlled by a power element 791 corresponds to (a) of FIG. 83, a region controlled by a power element 792 corresponds to (b) of FIG. 83, a region controlled by power element 793 corresponds to (c) of FIG. 83, and a region controlled by a power element 794 corresponds to (d) of FIG. 83.

Figure 83:
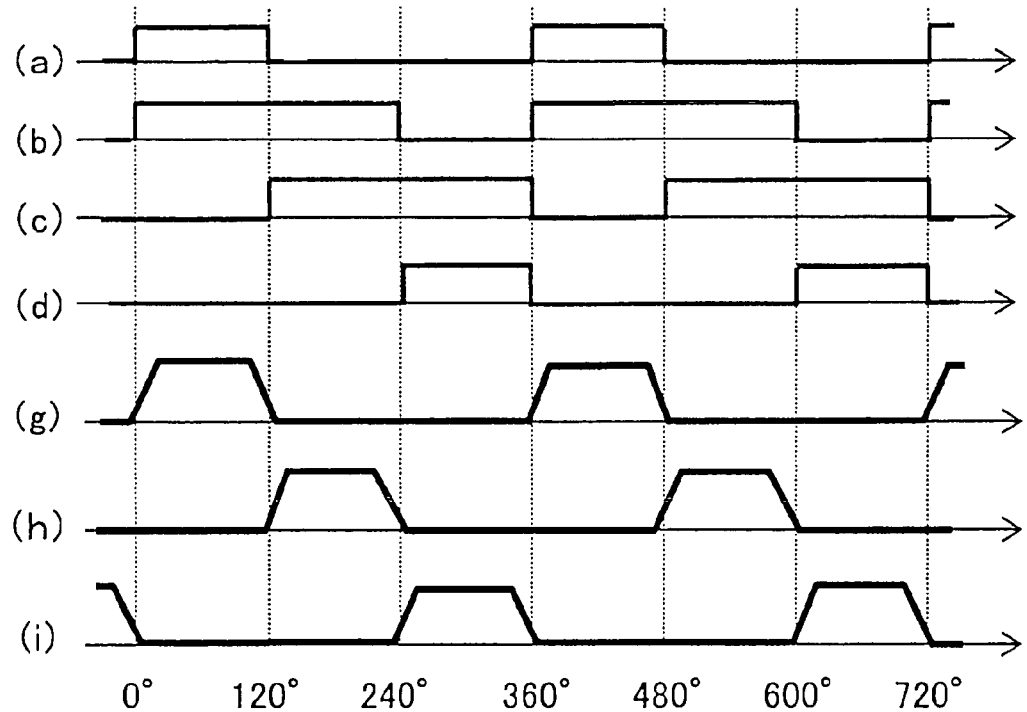
FIG. 83 illustrates examples of operations and current waveforms of the control circuit shown in FIG. 82.

As shown in FIG. 83, the power elements 791 and 792 effect control in a range from 0° to 120° as a function of the circumferential electrical angle of the motor to supply current to the winding 795 as indicated by (g) of FIG. 83.

The power elements 793 and 792 effect control in a range from 120° to 240° to serially supply currents to the windings 796 and 797 as indicated by (h) of FIG. 83. This means that reversed currents are supplied through the windings 40 and 41 in the motor shown by (a) of FIG. 12. A sum of the magnetic fluxes interlinked with both of these windings is equivalent to a flux φb that passes through the salient stator poles 36. Accordingly, a sum of the voltage induced to both of the windings corresponds to a rate of change of the flux φb expressed by dφb/dt. For example, the sum of the voltage will be equivalent to a value of voltage amplitude generated at the winding 41 when the C-phase salient stator poles 38 are excited. Thus, no voltage problem will be caused even when the windings 796 and 797 are driven in series.

The power elements 793 and 794 effect control in a range from 240° to 360° to supply current to the winding 796 as indicated by (i) of FIG. 83.

ID case where the currents shown by (g), (h) and (i) of FIG. 83 are controlled by the control circuit shown in FIG. 82, and where current is being passed through a certain winding at a current-switching timing, the magnetic energy and the current of the winding in question have to be regeneratively passed to the DC power source 730 to an extend of causing no actual harm, before starting current supply to the subsequent winding. Therefore, operation will be a little delayed. For example, when the power elements 791 and 792 are turned off while current is being passed through the winding 795, the current is regeneratively passed to the DC power source 730 through the diodes 77A and 77B. As a result, the potential across the winding 795 is fluctuated and inverted, causing inconveniency for the control of the subsequent power supply to the winding 797. Although the time period may be short on the order of 0.001 to 0.01 seconds, the output torque of the motor may become intermittent. This may mostly not create a problem at low-speed rotation because the absence of current may be short and a ratio of the occurrence is low. However, at high-speed rotation, the delay time in operation may deteriorate average torque.

As in the example shown in FIG. 80, control can be effected so that currents of two windings will not be passed being overlapped, to the power elements 791, 792, 793 and 794. Thus, advantageously, there is no need of increasing a current capacity of a specific power element by a factor of about two.

The control circuit shown in FIG. 82 has a feature that only four power elements are required and thus that cost and space can be reduced.

Addition of the diode 778 may prevent current from being reversely passed to the winding 797. A small motor with sufficiently large winding resistance may enable control without having to look for the timing of the regenerative operation shown in FIG. 81.

Another method for resolving the problem of the regeneration time may be achieved by providing a configuration which is additionally provided with the second DC power source 73D of FIG. 76, with the diodes 77A and 77C being connected to the second DC power source 73D. In this configuration, magnetic energy may be regeneratively passed to the second DC power source 73D through the diodes 77A ad 77C. This may eliminate the necessity of taking time for the regeneration explained above and may achieve the current control as shown by (g), (h) and (i) of FIG. 78.

The control circuit having the configuration shown in FIG. 80 may be applied to the control of the motor shown by (b) of FIG. 2 and the four-phase motor shown in FIG. 16. The windings 50, 51 and 52 correspond to the windings 795, 797 and 796 shown in FIG. 82. Current is supplied to the winding 795 when the phase A is driven, current is serially supplied to the windings 795 and 797 when the phase B is driven, and current is serially supplied to the windings 796 and 797 when the phase C is driven. In this case, attention should be paid to the fact that the direction of the current passed to the winding 797 is reversed.

The control circuit of FIG. 80 may theoretically have a configuration in which the power elements are arranged so that the positive and negative directions for the DC power source 730 will be symmetric, or reversed. Thus, this configuration may also be included in the present invention.

Figure 84:
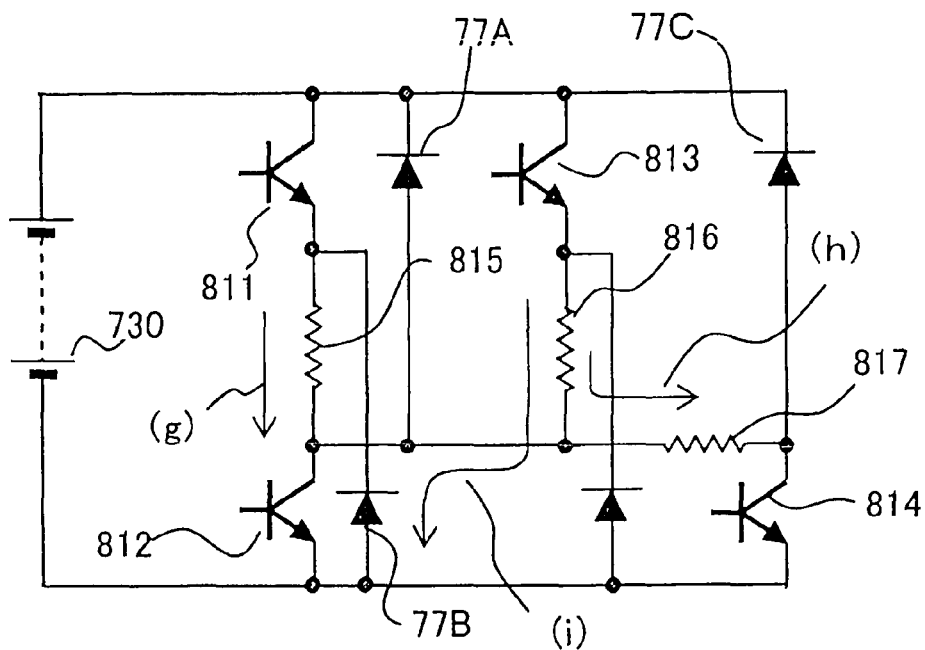
FIG. 84 illustrates a control circuit for controlling a one-way current in each of three windings.

FIG. 84 shows a control circuit for controlling currents of three windings with four power elements. Unlike the control circuit shown in FIG. 80, this control circuit does not allow currents to be collected to a specific power element. Therefore, it is not necessary to increase the current capacity. Also, it is unlikely that a current direction of a certain winding is reversed during the rotation of the rotor, as in the case where the motor shown by (b) of FIG. 12 is driven by the control circuit shown in FIG. 82.

Current of a winding 815 is controlled by power elements 811 and 812, current of a winding 816 is controlled by power elements 813 and 812, or by power elements 813 and 814. Further, current of a winding 817 is controlled by the power elements 811 and 814 or by the power elements 813 and 814, in series with the winding 815 or 816. Current supply is conducted in this way. The serially connected two windings have a relationship where a sum of the voltages induced to both of the windings may not exceed a predetermined value. Usually, control is so effected that the voltage induced to one winding will be zeroed. Accordingly, no voltage problem will be caused even when the two windings are serially connected.

Description is now focused on a case where the motor shown by (a) of FIG. 12 is driven. The windings 39, 40 and 41 shown by (a) of FIG. 12 correspond to windings 811, 817 and 816 shown in FIG. 84. A region controlled by a power element 811 corresponds to (a) of FIG. 85, a region controlled by a power element 812 corresponds to (b) of FIG. 85, a region controlled by power element 813 corresponds to (c) of FIG. 85, and a region controlled by a power element 814 corresponds to (d) of FIG. 85.

Figure 85:
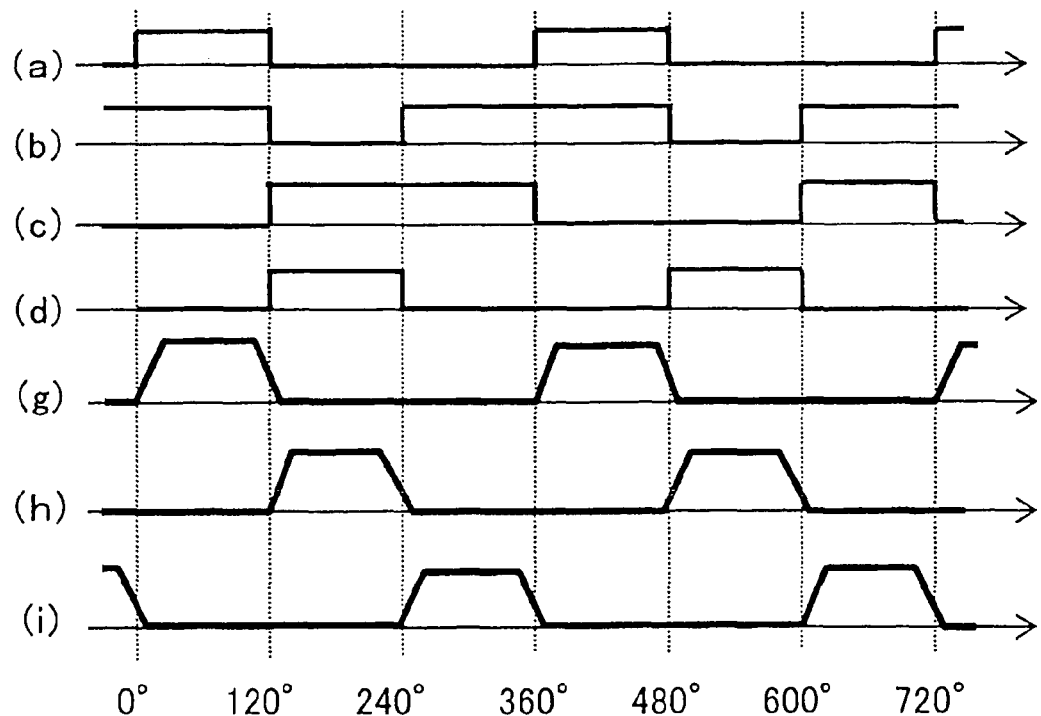
FIG. 85 illustrates examples of operations and current waveforms of the control circuit shown in FIG. 84.

As shown in FIG. 85, the power elements 811 and 812 effect control in a range from 0° to 120° as a function of the circumferential electrical angle of the motor to supply current to the winding 815 as indicated by (g) of FIG. 85.

The power elements 813 and 814 effect control in a range from 120° to 240° to serially supply currents to the windings 816 and 817 as indicated by (h) of FIG. 85. This means that reversed currents are supplied through the windings 40 and 41 in the motor shown by (a) of FIG. 12. A sum of the magnetic fluxes interlinked with both of these windings is equivalent to the flux φb that passes through the salient stator poles 36. Accordingly, a sum of the voltage induced to both of the windings corresponds to a rate of change of the flux φb expressed by dφb/dt. For example, the sum of the voltage will be equivalent to a value of voltage amplitude generated at the winding 41 when the C-phase salient stator poles 38 are excited. Thus, no voltage problem will be caused even when the windings 816 and 817 are driven in series.

The power elements 813 and 814 effect control in a range from 240° to 360° to supply current to the winding 816 as indicated by (i) of FIG. 85.

In case where the currents shown by (g), (h) and (i) of FIG. 85 are controlled by the control circuit shown in FIG. 84, and where current is being passed through a certain winding at a current-switching timing, the magnetic energy and the current of the winding in question have to be regeneratively passed to the DC power source 730 to an extend of causing no actual harm, before starting current supply to the subsequent winding. Therefore, operation will be a little delayed. For example, when the power elements 811 and 812 are turned off while current is being passed through the winding 815, the current is regeneratively passed to the DC power source 730 through the diodes 77A and 77B. As a result, the potential across the winding 815 is fluctuated and inverted, causing inconveniency for the control of the subsequent power supply to the windings 816 and 817. Although the time period may be short on the order of 0.001 to 0.01 seconds, the output torque of the motor may become intermittent. This may mostly not create a problem at low-speed rotation because the absence of current may be short and a ratio of the occurrence is low. However, at high-speed rotation, the delay time in operation may deteriorate average torque.

As in the example shown in FIG. 80, control can be so effected that currents of two windings will not be passed, being overlapped, to the power elements 811, 812, 813 and 814. Thus, advantageously, there is no need of increasing a current capacity of a specific power element by a factor of about two. The control circuit shown in FIG. 84 has a feature that only four power elements are required and thus that cost and space can be reduced.

Addition of the diode 778 may prevent current from being reversely passed to the winding 797. A small motor with sufficiently large winding resistance may enable control without having to look for the timing of the regenerative operation shown in FIG. 81.

Another method for resolving the problem of the regeneration time may be achieved by providing a configuration which is additionally provided with the second DC power source 73D of FIG. 76, with the diodes 77A and 77C being connected to the second DC power source 73D. In this configuration, magnetic energy may be regeneratively passed to the second DC power source 73D through the diodes 77A and 77C. This may mitigate the necessity of taking time for the regeneration explained above.

The control circuit having the configuration shown in FIG. 84 may be applied to the control of the motor shown by (b) of FIG. 12 and the four-phase motor shown in FIG. 16. The windings 50, 51 and 52 correspond to the windings 815, 817 and 816 shown in FIG. 84. Current is supplied to the winding 815 when the phase A is driven, current is serially supplied to the windings 815 and 817 when the phase B is driven, and current is serially supplied to the windings 816 and 817 when the phase C is driven.

The control circuit of FIG. 84 may theoretically have a configuration in which the power elements are arranged so that the positive and negative directions for the DC power source 730 will be symmetric, or reversed. Thus, this configuration may also be included in the present invention.

Figure 86:
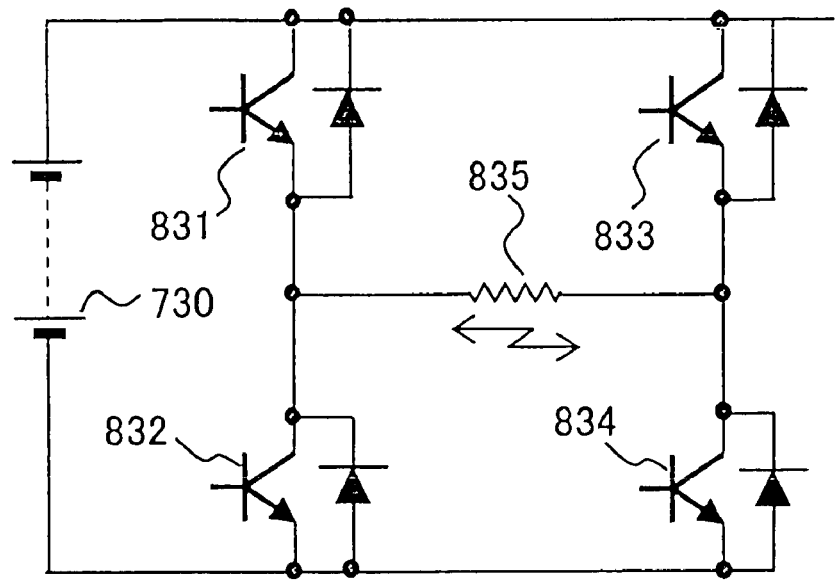
FIG. 86 illustrates an example of a control circuit for passing two-way current through windings.

The motors and the control circuits therefor of the present invention have so far been described. These motors and circuits may have various modifications. Such modifications that fall within the scope of the spirit of the present invention are intended to be included in the present invention. For example, in each of the control circuits shown in FIGS. 80, 82 and 84, positions of the elements may be partially changed, or elements may be additionally provided in conformity with the increase in the number of the motor phases. These modifications are also intended as falling within the scope of the present invention. Further, where there is a need for currents in both directions, or a need for positive and negative currents, as winding currents, a control circuit shown in FIG. 86 may be used for performing driving, which control circuit is typically used for driving a DC motor. Indicated by numeral 835 is a winding, and by 831, 832, 833 and 834 are power elements each of which is in reverse parallel connection with a diode.

The present invention can realize a very simple mode motor without using permanent magnets, and thus can realize a low-cost motor. Also, the substantially looped structure imparted to each of the windings can facilitate fabrication of windings. Modification of the configuration of such windings so as to be indented in the rotor shaft direction, can also be readily carried out using a mold or the like. The present invention can also facilitate fabrication of the windings with high space factor. Further, the simple and robust shape of the rotor can realize high-speed rotation. The stator poles arranged along the circumference with an even interval therebetween can produce attraction force in the radial direction substantially throughout the periphery. Therefore, the stator may have a very small rate of deformation to thereby realize a motor having low vibration and low noise. In addition to the windings, the entire motor configuration may help facilitate its assemblage because parts can be fabricated being divided in the rotor direction and can then be assembled in the rotor shaft direction. The present invention may also enable generation of large torque by utilizing various techniques, such as reduction of flux leakage by utilizing permanent magnets. In addition, the present invention can realize a motor drive control unit with a control circuit of a simple configuration to realize a low-cost motor system.

The present application is based on Japanese Patent Application No. 2005-131808 (filed Apr. 28, 2005), Japanese Patent Application No. 2005-144293 (filed May 17, 2005), Japanese Patent Application No. 2005-151257 (filed May 24, 2005) and Japanese Patent Application No. 2005-208358 (filed Jul. 19, 2005) all of which are incorporated herein by reference.

The invention related to the present application should be defined only by the claims, and thus should not be construed as being limited to the embodiments or the like described in the specification and the drawings.

The invention claimed is:

1. An N-phased (N is an integer of four or more) AC electric motor comprising:
   a stator;

a rotor arranged opposed to the stator, the rotor having a shaft disposed in an axial direction of the motor about which the rotor rotates;

a plurality of stator salient poles and a plurality of rotor salient poles, which are respectively provided as N sets for an N number of phases, the plurality of stator salient poles for each phase being arranged along a circumference of the stator at a corresponding N position in the axial direction of the motor and the plurality of rotor salient poles for each phase being arranged along a circumference of the rotor at the corresponding N position in the axial direction of the motor so as to be opposed to the stator salient poles for each phase, a stator-flux-passing magnetic path arranged along the circumference of the stator at a different position in the axial direction of the motor and formed to allow magnetic fluxes to pass through the stator;

a rotor-flux-passing magnetic path arranged along the circumference of the rotor at the different position in the axial direction of the motor so as to be opposed to the stator-flux-passing magnetic path and formed to allow the magnetic fluxes to pass through the rotor;

a stator back yoke magnetic path magnetically shared between the stator salient poles for the N number of phases and the stator-flux-passing magnetic path;

a rotor back yoke magnetic path magnetically shared between the rotor salient poles for the N number of phases and the rotor-flux-passing magnetic path; and an (N−1) number of substantially looped windings arranged between the stator salient poles for the N number of phases and the stator-flux-passing magnetic path.

2. An N-phased (N is an integer of four or more) AC electric motor comprising:

a stator;

a rotor arranged opposed to the stator, the rotor having a shaft disposed in an axial direction of the motor about which the rotor rotates;

a plurality of stator salient poles and a plurality of rotor salient poles, which are respectively provided as N sets for an N number of phases, the plurality of stator salient poles for each phase being arranged along a circumference of the stator at a corresponding N position in the axial direction of the motor and the plurality of rotor salient poles for each phase arranged along a circumference of the rotor at the corresponding N position in the axial direction of the motor so as to be opposed to the stator salient poles for each phase, a stator back yoke magnetic path magnetically shared among the stator salient poles for the N number of phases;

a rotor back yoke magnetic path magnetically shared among the rotor salient poles for the N number of phases; and an (N−1) number of substantially looped windings arranged between the stator salient poles for the N number of phases.

3. An AC electric motor comprising:

a stator;

a rotor arranged to be opposed to the stator, the rotor having a shaft disposed in an axial direction of the motor about which the rotor rotates;

a plurality of first stator salient poles arranged along a circumference of the stator at a first position in the axial direction of the motor;

a plurality of first rotor salient poles arranged along a circumference of the rotor at the first position in the axial direction of the motor so as to be opposed to the first stator salient poles;

a plurality of second stator salient poles arranged along the circumference of the stator at a second position in the axial direction of the motor;

a plurality of second rotor salient poles arranged along the circumference of the rotor at the second position in the axial direction of the motor so as to be opposed to the second stator salient poles;

a stator-flux-passing magnetic path arranged along the circumference of the stator at a third position in the axial direction of the motor and formed to allow magnetic fluxes to pass through the stator;

a rotor-flux-passing magnetic path arranged along the circumference of the rotor at the third position in the axial direction of the motor and formed to allow the magnetic fluxes to pass through the rotor;

a stator back yoke magnetic path magnetically shared among the first stator salient poles, the second stator salient poles and the stator-flux-passing magnetic path;

a rotor back yoke magnetic path magnetically shared among the first rotor salient poles, the second rotor salient poles and the rotor-flux-passing magnetic path; and a plurality of substantially looped windings, one of the plurality of substantially looped windings being arranged between the first stator salient soles and the stator-flux-passing magnetic path, and an other of the plurality of substantially looped windings being arranged between the second stator salient poles and the stator-flux-passing magnetic path, wherein the first and second stator salient poles and the first and second rotor salient poles are formed such that first and second the stator salient poles have faces each having a stator's opposing shape opposed to the rotor, and the first and second rotor salient poles having faces each having a rotor's opposing shape opposed to the stator, the stator's opposing shape and the rotor's opposing shape being opposed to each other to provide a mutually opposed shape which changes with a rotational angle of the rotor;

the mutually opposed shape has an area of which rotation rate changes with the rotational angle of the rotor in a rotational range of the rotor, from a rotational angle at which the mutually opposed shape is initiated with the encountering of stator and rotor salient poles with each other, to a rotational angle at which the mutually opposed shape is eliminated with the parting of the stator and rotor salient poles from each other, and rotation of the rotor in one direction generates more serial rotating torque than rotation of the rotor in the other direction.

4. An AC electric motor comprising:

a stator;

a rotor arranged to be opposed to the stator, the rotor having a shaft disposed in an axial direction of the motor about which the rotor rotates;

a plurality of first stator salient poles arranged along a circumference of the stator at a first position in the axial direction of the motor;

a plurality of first rotor salient poles arranged along a circumference of the rotor at the first position in the axial direction of the motor so as to be opposed to the first stator salient poles;

a plurality of second stator salient poles arranged along the circumference of the stator at a second position in the axial direction of the motor;

a plurality of second rotor salient poles arranged along the circumference of the rotor at the second position in the axial direction of the motor so as to be opposed to the second stator salient poles;

a stator-flux-passing magnetic path arranged along the circumference of the stator at a third position in the axial direction of the motor and formed to allow magnetic fluxes to pass through the stator;

a rotor-flux-passing magnetic path arranged along the circumference of the rotor at the third position in the axial direction of the motor and formed to allow the magnetic fluxes to pass through the rotor;

a stator back yoke magnetic path magnetically shared among the first stator salient poles, the second stator salient poles and the stator-flux-passing magnetic path;

a rotor back yoke magnetic path magnetically shared among the first rotor salient poles, the second rotor salient poles and the rotor-flux-passing magnetic path; and a plurality of substantially looped windings, one of the plurality of substantially looped windings being arranged between the first stator salient poles and the stator-flux-passing magnetic path, and an other of the plurality of substantially looped windings being arranged between the second stator salient poles and the stator-flux-passing magnetic path, wherein at least one of the stator salient poles and the rotor salient poles have base portions each united with a center portion of each salient pole and in a direction radial to the rotor shaft, and the base portion has a shape bulged in a circumferential direction of the rotor.

5. An AC electric motor comprising:

a stator;

a rotor arranged to be opposed to the stator, the rotor having a shaft disposed in an axial direction of the motor about which the rotor rotates;

a plurality of first stator salient poles arranged along a circumference of the stator at a first position in the axial direction of the motor;

a plurality of first rotor salient poles arranged along a circumference of the rotor at the first position in the axial direction of the motor so as to be opposed to the first stator salient poles;

a plurality of second stator salient poles arranged along the circumference of the stator at a second position in the axial direction of the motor;

a plurality of second rotor salient poles arranged along the circumference of the rotor at the second position in the axial direction of the motor so as to be opposed to the second stator salient poles;

a stator-flux-passing magnetic path arranged along the circumference of the stator at a third position in the axial direction of the motor and formed to allow magnetic fluxes to pass through the stator;

a rotor-flux-passing magnetic Bath arranged along the circumference of the rotor at the third position in the axial direction of the motor and formed to allow the magnetic fluxes to pass through the rotor;

a stator back yoke magnetic path magnetically shared among the first stator salient poles, the second stator salient poles and the stator-flux-passing magnetic path;

a rotor back yoke magnetic path magnetically shared among the first rotor salient poles, the second rotor salient poles and the rotor-flux-passing magnetic path;

a plurality of substantially looped windings, one of the plurality of substantially looped windings being arranged between the first stator salient poles and the stator-flux-passing magnetic path, and an other of the plurality of substantially looped windings being arranged between the second stator salient poles and the stator-flux-passing magnetic path;

a cooling mechanism having a structure of passing liquid or gas therethrough; and the cooling mechanism being located one of inside of a soft magnetic material of a stator, or between the soft magnetic material of the stator and windings of the motor.

6. An AC electric motor comprising:

a stator;

a rotor arranged to be opposed to the stator, the rotor having a shaft disposed in an axial direction of the motor about which the rotor rotates;

a plurality of first stator salient poles arranged along a circumference of the stator at a first position in the axial direction of the motor;

a plurality of first rotor salient poles arranged along a circumference of the rotor at the first position in the axial direction of the motor so as to be opposed to the first stator salient poles;

a plurality of second stator salient poles arranged along the circumference of the stator at a second position in the axial direction of the motor;

a plurality of second rotor salient poles arranged along the circumference of the rotor at the second position in the axial direction of the motor so as to be opposed to the second stator salient poles;

a stator-flux-passing magnetic path arranged along the circumference of the stator at a third position in the axial direction of the motor and formed to allow magnetic fluxes to pass through the stator;

a rotor-flux-passing magnetic path arranged along the circumference of the rotor at the third position in the axial direction of the motor and formed to allow the magnetic fluxes to pass through the rotor;

a stator back yoke magnetic path magnetically shared among the first stator salient poles, the second stator salient poles and the stator-flux-passing magnetic path;

a rotor back yoke magnetic path magnetically shared among the first rotor salient poles, the second rotor salient poles and the rotor-flux-passing magnetic path;

a plurality of substantially looped windings, one of the plurality of substantially looped windings being arranged between the first stator salient poles and the stator-flux-passing magnetic path, and an other of the plurality of substantially looped windings being arranged between the second stator salient poles and the stator-flux-passing magnetic path; and a cooling mechanism in which a portion or all of windings of the motor are made up of metal pipes serving as conductors, and liquid or gas is passed through the metal pipes.

7. An AC electric motor comprising:

a stator;

a rotor arranged to be opposed to the stator, the rotor having a shaft disposed in an axial direction of the motor about which the rotor rotates;

a plurality of first stator salient poles arranged along a circumference of the stator at a first position in the axial direction of the motor;

a plurality of first rotor salient poles arranged along a circumference of the rotor at the first position in the axial direction of the motor so as to be opposed to the first stator salient poles;

a plurality of second stator salient poles arranged along the circumference of the stator at a second position in the axial direction of the motor;

a plurality of second rotor salient poles arranged along the circumference of the rotor at the second position in the axial direction of the motor so as to be opposed to the second stator salient poles;

a stator-flux-passing magnetic path arranged along the circumference of the stator at a third position in the axial direction of the motor and formed to allow magnetic fluxes to pass through the stator;

a rotor-flux-passing magnetic path arranged along the circumference of the rotor at the third position in the axial direction of the motor and formed to allow the magnetic fluxes to pass through the rotor;

a stator back yoke magnetic path magnetically shared among the first stator salient poles, the second stator salient poles and the stator-flux-passing magnetic path;

a rotor back yoke magnetic path magnetically shared among the first rotor salient poles, the second rotor salient poles and the rotor-flux-passing magnetic path; and a plurality of substantially looped windings, one of the plurality of substantially looped windings being arranged between the first stator salient Doles and the stator-flux-passing magnetic path, and an other of the plurality of substantially looped windings being arranged between the second stator salient poles and the stator-flux-passing magnetic path, wherein each of the windings has substantially a looped shape which is wavy in a direction radial to the rotor shaft in response to an arrangement of the first and second stator salient poles of each phase and indents of the first and second stator salient poles in the direction radial to the rotor shaft.

8. An AC electric motor comprising:

a stator;

a rotor arranged to be opposed to the stator, the rotor having a shaft disposed in an axial direction of the motor about which the rotor rotates;

a plurality of first stator salient poles arranged along a circumference of the stator at a first position in the axial direction of the motor;

a plurality of first rotor salient poles arranged along a circumference of the rotor at the first position in the axial direction of the motor so as to be opposed to the first stator salient poles;

a plurality of second stator salient poles arranged along the circumference of the stator at a second position in the axial direction of the motor;

a plurality of second rotor salient poles arranged along the circumference of the rotor at the second position in the axial direction of the motor so as to be opposed to the second stator salient poles;

a stator-flux-passing magnetic path arranged along the circumference of the stator at a third position in the axial direction of the motor and fowled to allow magnetic fluxes to pass through the stator;

a rotor-flux-passing magnetic path arranged along the circumference of the rotor at the third position in the axial direction of the motor and formed to allow the magnetic fluxes to pass through the rotor;

a stator back yoke magnetic path magnetically shared among the first stator salient poles, the second stator salient poles and the stator-flux-passing magnetic path;

a rotor back yoke magnetic path magnetically shared among the first rotor salient poles, the second rotor salient poles and the rotor-flux-passing magnetic path; and a plurality of substantially looped windings, one of the plurality of substantially looped windings being arranged between the first stator salient poles and the stator-flux-passing magnetic path, and an other of the plurality of substantially looped windings being arranged between the second stator salient poles and the stator-flux-passing magnetic path, wherein the stator-flux-passing magnetic path and the rotor-flux-passing magnetic path each include a magnetic path arranged along the circumference of the stator and the rotor, respectively, and magnetically coupling the stator and the rotor;

each of the first and second stator salient poles include a first subset of stator salient poles arranged along the circumference of the stator so that portions having large magnetic resistance and portions having small magnetic resistance are substantially alternated;

each of the first and second rotor salient poles include a first subset of rotor salient poles arranged along a circumference of the rotor so that portions having large magnetic resistance and portions having small magnetic resistance are substantially alternated, the first subset of rotor salient poles being radially opposed to the first subset of stator salient poles;

the windings include a first winding arranged between the magnetic path arranged along the circumference of the stator and the rotor and the first subset of stator salient poles;

the first and second stator salient poles further include a second subset of stator salient poles arranged along the circumference of the stator so that portions having large magnetic resistance and portions having small magnetic resistance are substantially alternated, the second subset of stator salient poles being adjacent to the stator-flux-passing magnetic path and the rotor-flux-passing magnetic path;

the first and second rotor salient poles further include a second subset of rotor salient poles arranged along the circumference of the rotor so that portions having large magnetic resistance and portions having small magnetic resistance are substantially alternated, the second set of rotor salient poles being radially opposed to the second subset of stator poles; and the windings further include a second winding arranged between the first subset of stator salient poles and the second subset of stator salient poles, and the motor further comprises:
a third winding;
first, second, third and fourth power elements capable of on/off control of currents passing through the power elements; and
drive means for driving the power elements, wherein one end of each of the first power element and the third power element is connected to a positive terminal of a DC power source;

one end of each of the second power element and the fourth power element is connected to a negative terminal of the DC power source;

any one of the first, second and third windings is connected between the first power element and the second power element;

any other one of the first, second and third windings is connected between the third power element and the fourth power element;

any other one of the windings is connected between the first power element and the fourth power element; and the drive means drives the power elements such that, when torque is to be generated between the first subset of stator salient poles and the first subset of rotor salient poles, the two power elements connected with the first winding are driven for current supply, and at the same time, the two power elements connected with the second winding are driven for current supply; and when torque is to be generated between the second subset of stator salient poles and the second subset of rotor salient poles, the two power elements connected with the second winding are driven for current supply.

9. An AC electric motor comprising:

a stator;

a rotor arranged to be opposed to the stator, the rotor having a shaft disposed in an axial direction of the motor about which the rotor rotates;

a plurality of first stator salient poles arranged along a circumference of the stator at a first position in the axial direction of the motor;

a plurality of first rotor salient poles arranged along a circumference of the rotor at the first position in the axial direction of the motor so as to be opposed to the first stator salient poles;

a plurality of second stator salient poles arranged along the circumference of the stator at a second position in the axial direction of the motor;

a plurality of second rotor salient poles arranged along the circumference of the rotor at the second position in the axial direction of the motor so as to be opposed to the second stator salient poles;

a stator-flux-passing magnetic path arranged along the circumference of the stator at a third position in the axial direction of the motor and formed to allow magnetic fluxes to pass through the stator;

a rotor-flux-passing magnetic path arranged along the circumference of the rotor at the third position in the axial direction of the motor and formed to allow the magnetic fluxes to pass through the rotor;

a stator back yoke magnetic path magnetically shared among the first stator salient poles, the second stator salient poles and the stator-flux-passing magnetic path;

a rotor back yoke magnetic path magnetically shared among the first rotor salient poles, the second rotor salient poles and the rotor-flux-passing magnetic path; and a plurality of substantially looped windings, one of the plurality of substantially looped windings being arranged between the first stator salient poles and the stator-flux-passing magnetic path, and an other of the plurality of substantially looped windings being arranged between the second stator salient poles and the stator-flux-passing magnetic path, wherein the stator-flux-passing magnetic path and the rotor-flux-passing magnetic path each include a magnetic path arranged along a circumference of the stator and the rotor, respectively, and magnetically coupling the stator and the rotor;

the first and second stator salient poles include a first subset of stator salient poles arranged along the circumference of the stator so that portions having large magnetic resistance and portions having small magnetic resistance are substantially alternated;

the first and second rotor salient poles include a first subset of rotor salient poles arranged along a circumference of the rotor so that portions having large magnetic resistance and portions having small magnetic resistance are substantially alternated, the first subset of rotor salient poles being radially opposed to the first subset of stator salient poles;

the windings include a first winding arranged between the magnetic path arranged along the circumference of the stator and the rotor and the first subset of stator salient poles;

the first and second stator salient poles further include a second subset of stator salient poles arranged along the circumference of the stator so that portions having large magnetic resistance and portions having small magnetic resistance are substantially alternated, the second subset of stator salient poles being adjacent to the first subset of stator salient poles;

the first and second rotor salient poles further include a second subset of rotor salient poles arranged along the circumference of the rotor so that portions having large magnetic resistance and portions having small magnetic resistance are substantially alternated, the second subset of rotor salient poles being radially opposed to the second subset of stator salient poles; and the windings further include a second winding arranged between the first subset of stator salient poles and the second subset of stator salient poles, and the motor further comprises:
 a third winding;
 first, second, third and fourth power elements capable of on/off control of currents passing therethrough; and
 drive means for driving the power elements;

wherein one end of each of the first power element and the third power element is connected to a positive terminal of a DC power source;

one end of each of the second power element and the fourth power element is connected to a negative terminal of the DC power source;

the second winding is connected between the first power element and the second power element;

the third winding is connected between the third power element and the fourth power element;

the first winding is connected between the second power element and the fourth power element, or between the first power element and the third power element;

the drive means drives the power elements such that when torque is to be generated between the second subset of stator salient poles and the second subset of rotor salient poles, the first and second power elements are driven for current supply to the second winding; and when torque is to be generated between the first subset of stator salient poles and the first subset of rotor salient poles, the first and fourth power elements are driven for serial current supply to the first winding and the second winding.

10. An AC electric motor comprising:

a stator;

a rotor arranged to be opposed to the stator, the rotor having a shaft disposed in an axial direction of the motor about which the rotor rotates;

a plurality of first stator salient poles arranged along a circumference of the stator at a first position in the axial direction of the motor;

a plurality of first rotor salient poles arranged along a circumference of the rotor at the first position in the axial direction of the motor so as to be opposed to the first stator salient poles;

a plurality of second stator salient poles arranged along the circumference of the stator at a second position in the axial direction of the motor;

a plurality of second rotor salient poles arranged along the circumference of the rotor at the second position in the axial direction of the motor so as to be opposed to the second stator salient poles;

a stator-flux-passing magnetic path arranged along the circumference of the stator at a third position in the axial direction of the motor and formed to allow magnetic fluxes to pass through the stator;

a rotor-flux-passing magnetic path arranged along the circumference of the rotor at the third position in the axial direction of the motor and formed to allow the magnetic fluxes to pass through the rotor;

a stator back yoke magnetic path magnetically shared among the first stator salient poles, the second stator salient poles and the stator-flux-passing magnetic path;

a rotor back yoke magnetic path magnetically shared among the first rotor salient poles, the second rotor salient poles and the rotor-flux-passing magnetic path; and a plurality of substantially looped windings, one of the plurality of substantially looped windings being arranged between the first stator salient poles and the stator-flux-passing magnetic path, and an other of the plurality of substantially looped windings being arranged between the second stator salient poles and the stator-flux-passing magnetic path, wherein the stator-flux-passing magnetic path and the rotor-flux-passing magnetic path each include a magnetic path arranged along a circumference of the stator and rotor and magnetically coupling the stator and the rotor;

each of the first and second stator salient poles include a first subset of stator salient poles arranged along the circumference of the stator so that portions having large magnetic resistance and portions having small magnetic resistance are substantially alternated;

each of the first and second rotor salient poles include a first subset of rotor salient poles arranged along the circumference of the rotor so that portions having large magnetic resistance and portions having small magnetic resistance are substantially alternated, the first subset of rotor salient poles being radially opposed to the first subset of stator salient poles;

the windings include a first winding arranged between the magnetic path and the first subset of stator salient poles;

the first and second stator salient poles further include a second subset of stator salient poles arranged along the circumference so that portions having large magnetic resistance and portions having small magnetic resistance are substantially alternated, the second subset of stator salient poles being adjacent to the first subset of stator salient poles;

the first and second rotor salient poles further include a second subset of rotor salient poles arranged along the circumference so that portions having large magnetic resistance and portions having small magnetic resistance are substantially alternated, the second subset of rotor salient poles being radially opposed to the second subset of stator salient poles; and the windings further include a second winding arranged between the first subset of stator salient poles and the second subset of stator salient poles, and the motor further comprises:
 a third winding;
 first, second, third and fourth power elements capable of on/off control of currents passing therethrough; and
 drive means for driving the power elements, wherein one end of each of the first power element and the third power element is connected to a positive terminal of a DC power source;

one end of each of the second power element and the fourth power element is connected to a negative terminal of the DC power source;

the second winding is connected between the first power element and the second power element;

the third winding is connected between the third power element and the second power element;

the first winding is connected between the second power element and the fourth power element; and the drive means drives the power elements such that when torque is to be generated between the second subset of stator salient poles and the second subset of rotor salient poles, the first and second power elements are driven for current supply to the second winding; and when torque is to be generated between the first subset of stator salient poles and the first subset of rotor salient poles, the first and fourth power elements are driven for serial current supply to the first winding and the second winding.

* * * * *